Feb. 18, 1936.                    C. C. FARMER                    2,031,213
                              FLUID PRESSURE BRAKE
                              Filed May 20, 1932            7 Sheets-Sheet 1

INVENTOR.
CLYDE C. FARMER.
By Wm. M. Cady
ATTORNEY.

Feb. 18, 1936.  C. C. FARMER  2,031,213
FLUID PRESSURE BRAKE
Filed May 20, 1932  7 Sheets-Sheet 2

INVENTOR.
CLYDE C. FARMER.
By *Wm. M. Cady*
ATTORNEY.

Feb. 18, 1936.  C. C. FARMER  2,031,213
FLUID PRESSURE BRAKE
Filed May 20, 1932    7 Sheets-Sheet 3

INVENTOR.
CLYDE C. FARMER
By *Wm. M. Cady*
ATTORNEY.

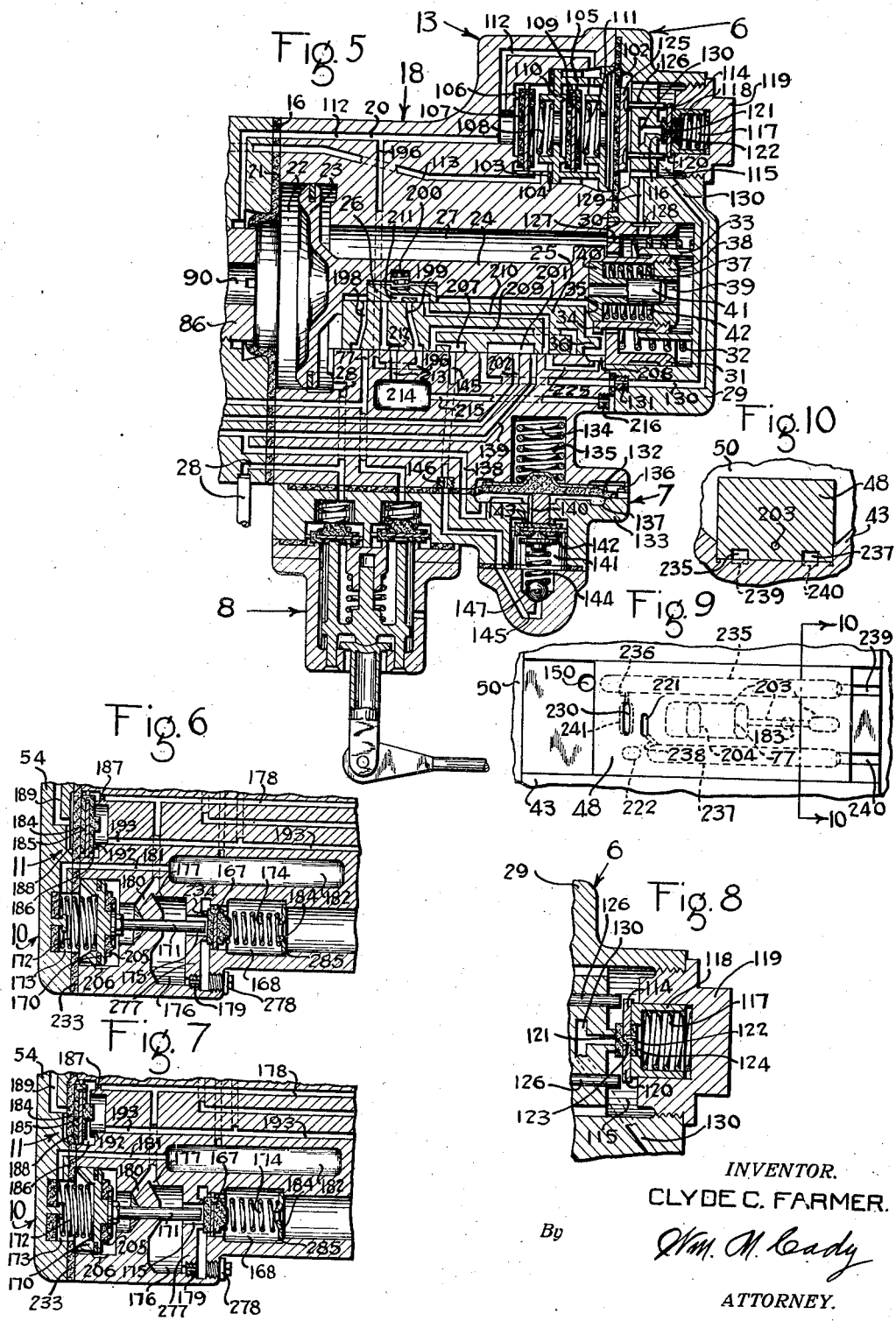

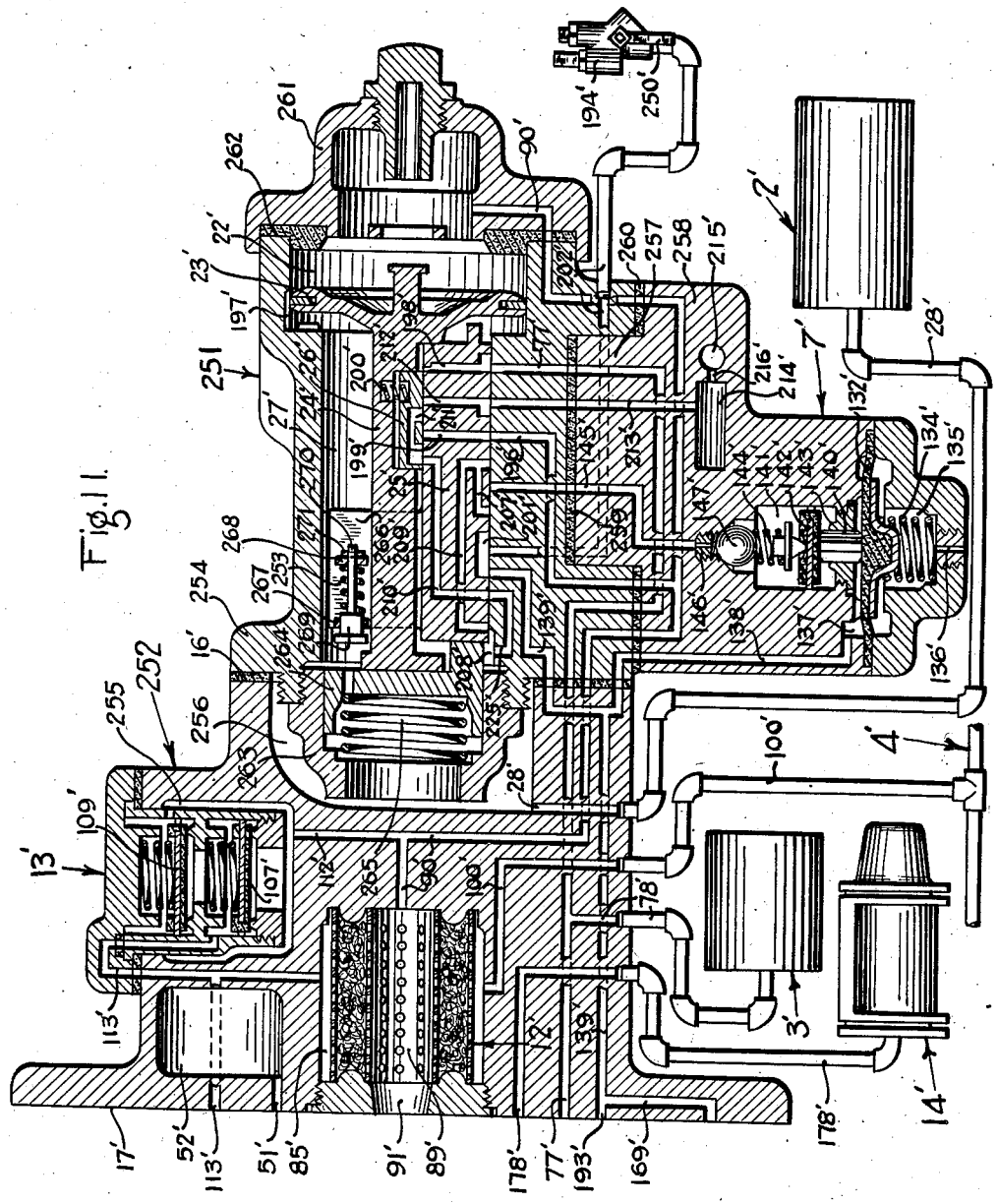
INVENTOR.
CLYDE C. FARMER
By Wm. M. Cady
ATTORNEY.

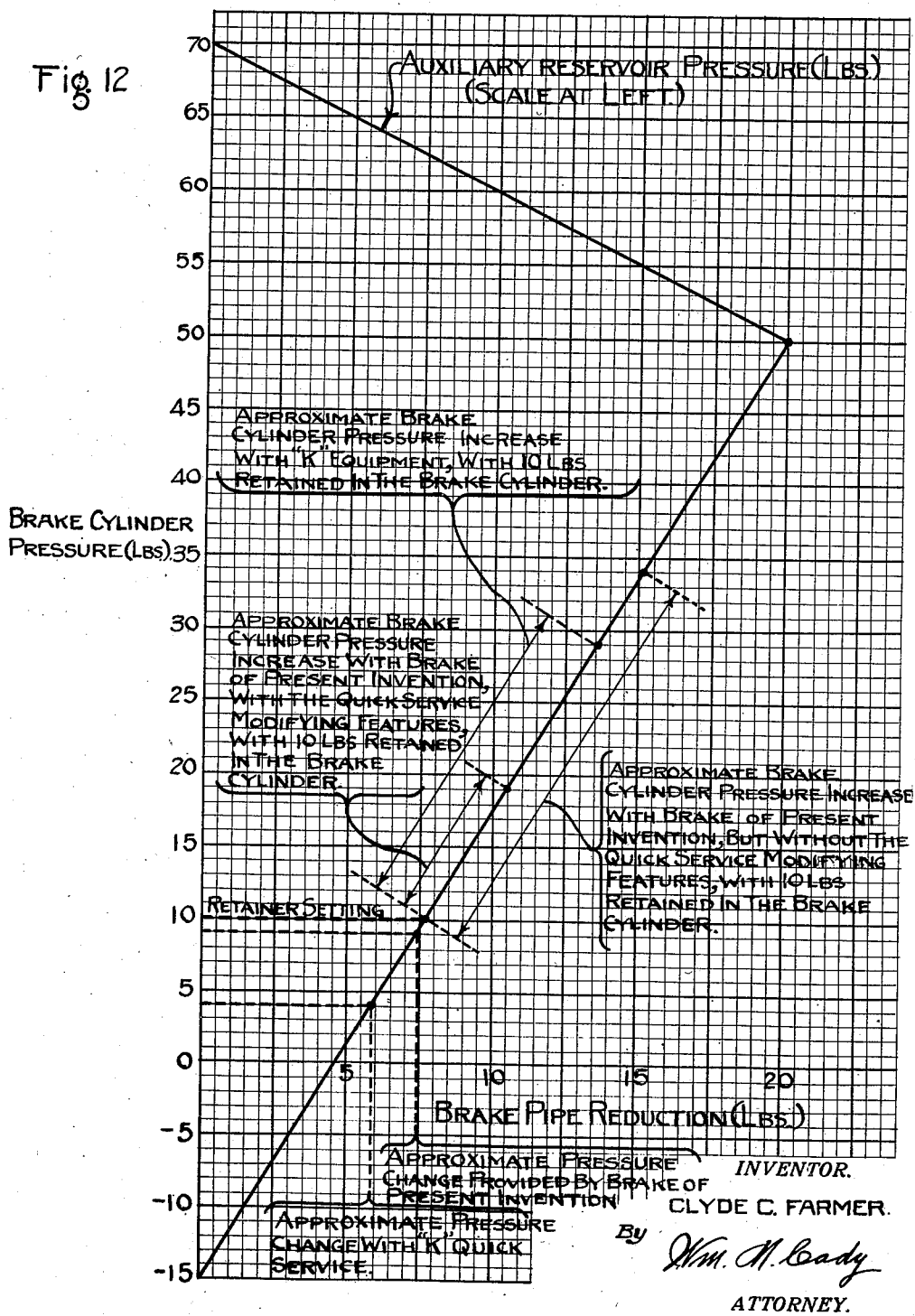

Patented Feb. 18, 1936

2,031,213

UNITED STATES PATENT OFFICE 2,031,213

FLUID PRESSURE BRAKE

Clyde C. Farmer, Pittsburgh, Pa., assignor to The Westinghouse Air Brake Company, Wilmerding, Pa., a corporation of Pennsylvania Application May 20, 1932, Serial No. 612,465
In Mexico January 9, 1931

323 Claims. (Cl. 303—35)

This invention relates to fluid pressure brakes, and more particularly to a fluid pressure brake equipment for controlling the application and release of the brakes on cars of a railway train, the present application being at least in part a continuation of my copending applications, identified as follows: Serial No. 473,323, filed August 6, 1930, Serial No. 487,988, filed October 11, 1930, Serial No. 526,015, filed March 28, 1931, Serial No. 579,887, filed December 9, 1931, and Serial No. 582,905, filed December 24, 1931.

The present standard fluid pressure brake equipment for railway cars was designed for handling trains of a length up to one hundred cars. In recent years, however, trains of more than one hundred cars have frequently been operated.

As a consequence of the increased length of trains, it has become increasingly difficult to so control the service application of the brakes, as to ensure that the brakes will be applied on all cars throughout the train; to secure the sure and prompt release of the brakes; to ensure that quick serial action will be propagated throughout the train both in service and emergency applications of the brakes, and with the desired rapidity; to ensure that the application of the brakes will be so controlled that the slack in the train will not run in with such force as to cause excessive shocks; and to ensure against the initiation of an emergency application of the brakes when not desired or intended, while making certainly available full emergency application at any time, even during or after service application of any degree.

For example, it has heretofore not only been difficult to ensure that the brakes will be applied on all the cars throughout a long train, but it has also been impossible to obtain uniformity of application on the various cars of the train. Furthermore, no equipment heretofore in use has been capable of propagating quick serial action through the train at a sufficiently rapid rate to prevent harsh running in of the slack at least under some operating conditions, and in fact, in long trains, especially with the brake pipe and hose connections in good condition, that is, free from leakage as at present available, it has been practically impossible to obtain propagation of the local quick service venting all the way through the train, since, in the absence of material leakage from the brake pipe, the air feeds forward from the rear part of the train, upon a service reduction at the front end of the train, and satisfies or over-balances the local brake pipe reduction and prevents its propagation to the rear of the train. Still further, the difficulties of releasing the brakes increases at a much greater ratio than the rate of increase in the number of cars, more nearly as the square of the number of cars. The difficulty of releasing, with present equipment, will be clear if it be understood that in the middle and rear portions of a 150 car train an increase of brake pipe pressure of about two and one-half or three pounds a minute is about all that is commonly attained, whereas as much as a four pound differential may be necessary to release some of the triple valves in the train.

With present day equipment, it is also well known that serious difficulties are encountered in grade operation; for instance, under certain conditions in descending a grade, with the retainer valves set to retain pressure in the brake cylinder and with the brakes being operated under a cycling operation in which the brakes are applied and released, as required to secure a relatively uniform train speed, the quick service action of the triple valves at the beginning of a brake application produces a degree of brake pipe reduction, and therefore an increase in brake cylinder pressure, which causes the train to be undesirably decelerated, even before all of the brakes of a train start to reapply, thus necessitating the start of brake release before the service application has reached the rear of the train. This tends to produce train slack action, because the brakes are being released at the front of the train while the brakes are applying in the rear portion of the train. The corrective measure commonly taken to overcome this is to cut out the retaining valves on a considerable number of the cars in the rear portion of the train. Under this condition, the brakes having the retaining valves cut out have substantially negligible value in controlling the train speed, and the work they should have done is added to the wheels of the cars in that portion of the train having the retaining valves in operation, thus undesirably increasing the temperature in those wheels and their brake shoes, which is detrimental to the wheels and greatly increases the destruction of brake shoe metal. Under this condition, a considerable number of retaining valves being cut out, the brakes of the cars having the retaining valves cut out will not aid in holding the train during the release and recharge period of the cycle, and therefore the rate of acceleration of the train will be greater than desired and the time interval available for recharging the brakes shortened, thus at times resulting in an inadequate recharge of the train brakes. To secure adequate time for recharging under these conditions, it is the practice to considerably reduce the train speed below that desired before a release is started and permit the train to accelerate to an undesirable and sometimes an unsafe speed before the next application is initiated. Further, air consumption is undesirably increased, because while the rear brakes consume as much air without as with the retaining valves operating, they are normally providing no aid in the control of the train speed. The result of this is that the brakes on the front cars must be applied with greater force, and therefore the air consumption by them is further increased beyond what should be required.

With my present invention the above difficulties are overcome by providing means which will ensure that all brakes in the train will be applied by a quick service action of the triple valve, and the degree of brake cylinder pressure developed as a result of this quick service action will be much less than that produced with the present brake and will be limited to a degree which will not cause the excessive rate of retardation which at present necessitates the release of the brakes before the train brakes can be applied.

One of the principal objects of my invention is to provide an improved fluid pressure brake equipment capable of controlling the application and release of the brakes, particularly on longer trains than can now be operated, with promptness, certainty, and dependability over a long period of service, and such that the above difficulties are avoided; and to improve materially the operation of the brakes on trains of present ordinary length.

Another object of my invention is to provide a fluid pressure brake equipment having an improved means for securing said quick service action and adapted to quickly and positively transmit quick service action throughout all the cars of the train, and also produce initially on each car of the train a predetermined brake cylinder pressure, and as a consequence, a predetermined, effective, but limited retarding force.

It will be obvious that as the differential required to accomplish release of the triple valve increases, the leakage past the triple valve packing ring will be increased, thereby charging the auxiliary reservoir at some rate, which in some cases approaches and in other cases equals the rise in brake pipe pressure. In either case where the triple valve packing ring leakage exceeds the normal, the failure to release is likely to and frequently does occur. Under the conditions cited, the rate of increase in brake pipe pressure is relatively slow, because all other brakes having release prior to the release of the one in question, the volumes of all other auxiliary reservoirs are added to the brake pipe, thus greatly slowing up the rate of rise of brake pipe pressure, because of the larger volume of air which must be flowed through the brake pipe to accomplish that increased rise of brake pipe pressure necessary to release the triple valve in question. It will be obvious that if all triple valves will release with the normal differential, the likelihood of failure of any triple valve to release will be greatly reduced.

Another object of my invention is to provide a fluid pressure brake equipment having means for controlling the build-up of brake cylinder pressure in effecting an emergency application of the brakes, and in such manner as to prevent the slack in the train from running in so harshly, as to cause excessive shocks.

Another object of my invention is to provide a fluid pressure brake equipment having means for facilitating the release of the brakes after a service as well as an emergency application of the brakes.

Another object of my invention is to provide a fluid pressure brake equipment having means for facilitating the release of the brakes after an emergency application of the brakes has been effected.

Another object of my invention is to provide a fluid pressure brake equipment having improved means for preventing the initiation of an emergency application of the brakes when not intended or desired.

Another object of my invention is to provide a fluid pressure brake equipment in which the above operating features are secured in a construction utilizing the parts of the present standard fluid pressure brake equipment so far as possible and at a minimum cost, so that the present fluid pressure brake equipment may readily be converted into an equipment having the characteristics and advantages of my improved fluid pressure brake equipment.

Another object of my invention is to provide a fluid pressure brake equipment having the improved operating characteristics, which will function satisfactorily in a mixed train, having some of the cars equipped with my improved fluid pressure brake equipment, and other cars equipped with the old type of fluid pressure brake equipment, and further improve operation of the old brakes.

Another object of my invention is to provide a fluid pressure brake equipment having the parts so grouped and interrelated, as to avoid interference with operation due to leakage.

Another object of my invention is to provide a fluid pressure brake equipment so constructed as to permit all external pipe connections to be of ample and rugged construction, which will be capable of resisting damage and leakage.

Another object of my invention is to provide a fluid pressure brake equipment in which the cost of maintenance is reduced to a minimum.

In general, the present invention contemplates the attainment of the foregoing and other objects and advantages, and the elimination or minimization of the aforementioned and other difficulties and disadvantages of brake mechanisms at present or heretofore in use, by a mechanism and in a manner which involve a novel and extremely advantageous coordination and cooperative functioning of service and emergency features, especially as will be more fully pointed out in the general summary at the end of this specification.

Additional objects and advantages will appear in the following more detailed description of the invention.

In the accompanying drawings; Fig. 1 is a diagrammatic view, mainly in section, of my improved brake equipment showing the various parts thereof in normal release position; Fig. 2 is a diagrammatic view similar to Fig. 1 but showing the various parts of the equipment in the position which they assume at the head end of a train upon a release of the brakes; Fig. 3 is a diagrammatic view similar to Fig. 1 but showing the various parts of the equipment in service application position; Fig. 4 is a further diagrammatic view similar to Fig. 1 but showing the various parts of the equipment in emergency application position; Fig. 5 is a diagrammatic view of a portion of the equipment showing the various parts of the triple valve device in a position just before the triple valve piston opens the feed groove in releasing the brakes; Figs. 6 and 7 are fragmentary diagrammatic sectional views of a portion of the equipment illustrating the operation of the timing valve device and inshot valve device; Fig. 8 is an enlarged detail sectional view of a portion of the release insuring valve device; Fig. 9 is a plan view of the main emergency slide valve and its seat, portions of the emergency valve casing being broken away and the auxiliary slide valve, piston stem and piston being omitted to more clearly illustrate certain features of my invention; and Fig. 10 is a sectional view of the same taken on the line 10—10 of Fig. 9.

Fig. 11 is a diagrammatic view, mainly in section, showing the manner in which the present standard type of triple valve device may be converted and used with other parts of my present equipment.

Fig. 12 is a graph, illustrative only (and not to be considered as limiting the scope of the invention mathematically, in any way) showing comparative operation of the present standard freight brake equipment and the improved equipment of the instant case, particularly as regards the operation in service application.

Fig. 13 is a fragmentary sectional diagrammatic view of the main and auxiliary slide valves of the triple valve portion of the equipment illustrating the auxiliary slide valve of the triple valve device in the position it will be in when in moving from lap toward application position, the stabilizing mechanism comes into action.

Figure 1:
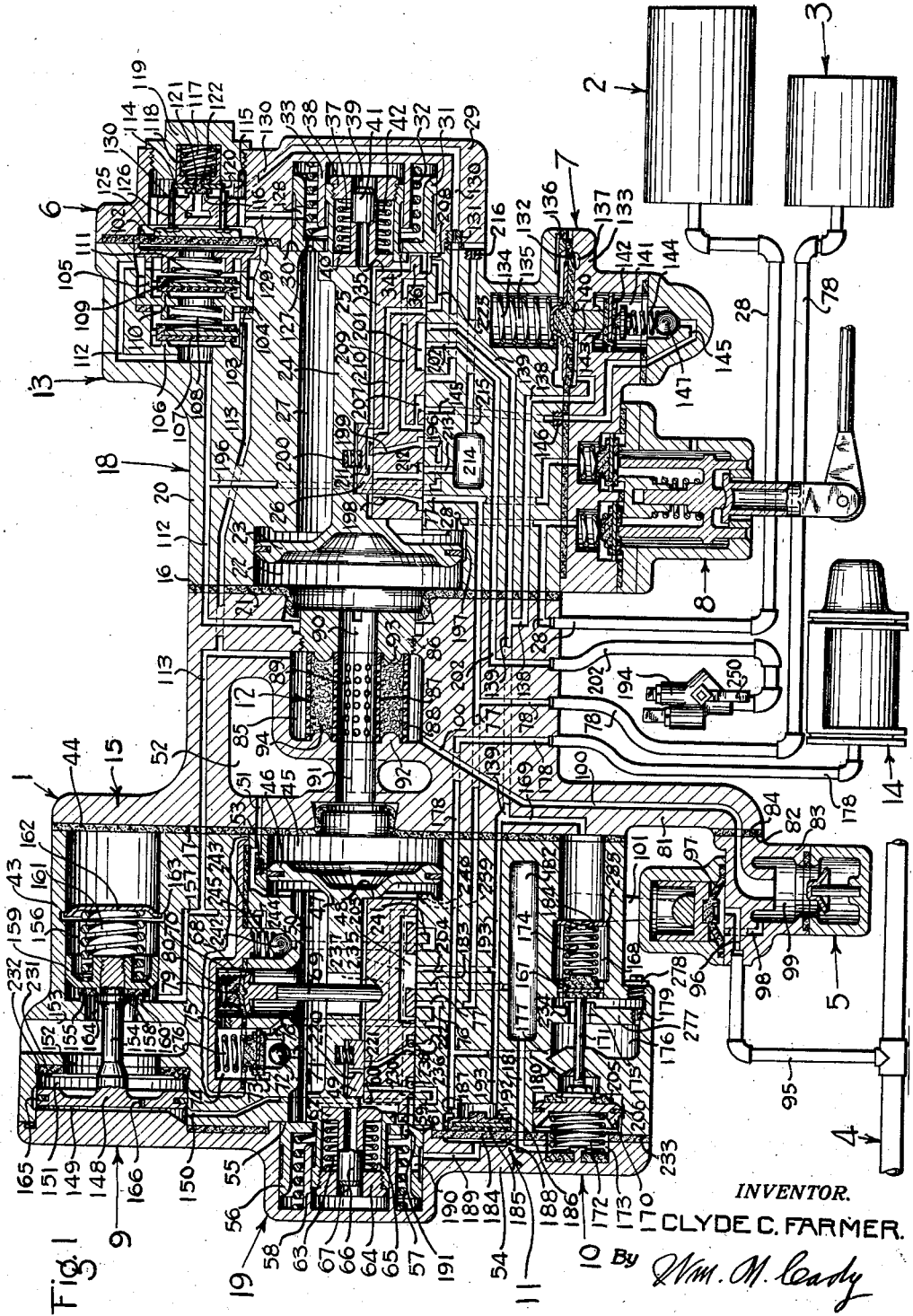

As shown in the accompanying drawings, my improved fluid pressure brake equipment comprises a brake controlling valve device 1, an auxiliary reservoir 2, an emergency reservoir 3, a brake pipe 4, a combined cut-out cock and centrifugal dirt collector 5, a release insuring valve device 6, a quick service modifying or limiting valve device 7, a reservoir release valve device 8, a quick action valve device 9, an emergency inshot valve device 10, a timing valve device 11, a strainer 12, a double check valve device 13 and a brake cylinder 14.

The brake controlling valve device 1 may comprise a pipe bracket 15 having gasket faces 16 and 17 disposed opposite each other and further comprises a triple valve device 18 and an emergency valve device 19.

The triple valve device 18 comprises a casing 20 which is clamped to the gasket face 16 of the pipe bracket in any desired manner, there being a gasket 21 interposed between the clamping face of the casing 20 and the face 16 of the pipe bracket. The triple valve casing has formed therein a piston chamber 22 containing a piston 23 having a stem 24 adapted to operate a main slide valve 25 and an auxiliary slide valve 26 contained in a valve chamber 27 which is connected to the auxiliary reservoir 2 through a passage and pipe 28.

The valve chamber 27 is closed by a cap 29 which is secured to the casing 20 in any desired manner and which has a recess formed therein which defines the rear end portion of the valve chamber 27. This recess is of greater diameter than that of the major portion of the valve chamber and due to this, the rear end of the casing 20 forms a stop shoulder 30 against which a stop member 31, slidably mounted in the cap 29, is adapted to abut to limit inward movement of the member 31. Interposed between and engaging the stop member 31 and the cap 29 is a spring 32 which at all times tends to move the member 31 toward the shoulder 30.

The rear end portion of the piston stem 24 extends through a central opening in the stop member 31 and is slidably guided in an annular lug 33 preferably formed integral with the cap 29 and extending into the valve chamber 27. This lug, besides serving to guide the rear end of the piston stem, also serves to maintain the spring 32 against undue movement from its centralized position in the cap 29. The piston stem, at a point located a short distance inwardly from its rear end, is provided with an operating collar or lug 34, one side of which is adapted to be engaged by the stop member 31 and the other side of which is adapted to operatively engage a rear end surface 35 of the main slide valve 25.

Figure 2:
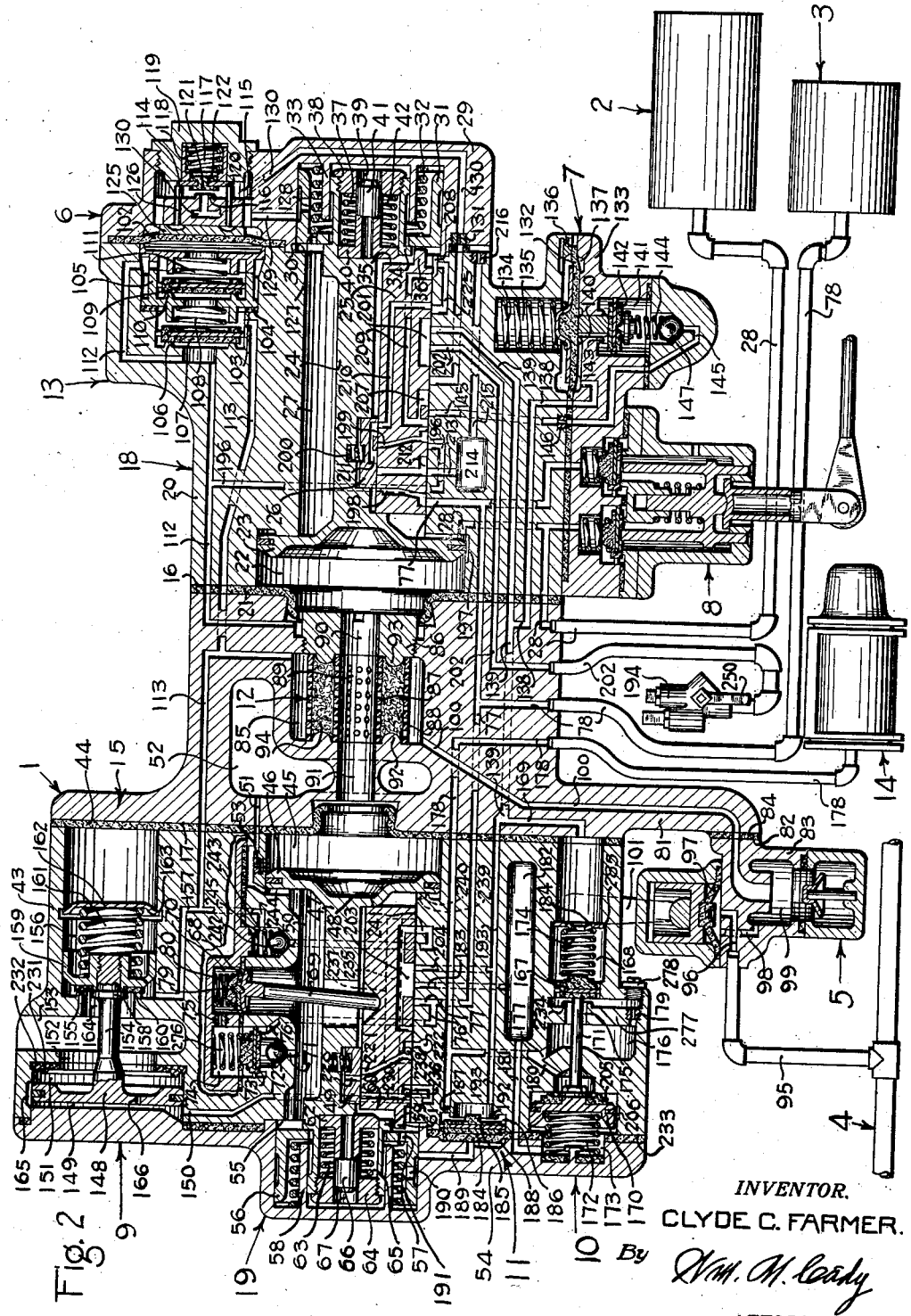

The main slide valve 25 is provided with a rearwardly extending lug 36 which is adapted to be engaged by the stop member 31 when, as will hereinafter appear, the triple valve parts are being moved from an inner release position to an outer or normal release position. As shown in Figs. 1 and 2 of the drawings there is a slight clearance between the end of the lug 36 and the member 31 when the lug 34 on the stem is in engagement with the member 31, so that when the triple valve parts are moved from their normal release position to the inner release position as shown in Fig. 2, the spring 32 does not act directly on the main slide valve to resist rearward movement of the piston but does act directly upon the piston stem. Due to this there can be no tendency of the spring to act to raise the main slide valve from its seat. It will also be seen that when the triple valve parts are being moved from the inner release position, the spring 32 acts to move the piston stem relative to the main slide valve until the slight clearance is taken up and then acts to move the stem and main slide valve in unison. It will thus be seen that the piston does not offer any resistance to the forward movement of the main slide valve so that there will be no tendency of the valve to rise from its seat, which tendency would be present if the piston were shifted through the medium of the valve.

The rear end portion of the piston stem 24 is provided with a bore 37 which is closed at one end by a plug 38 having screw-threaded connection with the stem, said plug being provided with a central bore 39. Below the lower surface of the major portion of the piston stem the other end of the bore 37 is open. The inner end wall of the bore forms a stop shoulder adapted to be engaged by a plunger 40 which is in slidable engagement with the stem within the bore 37. The plunger is provided with a stem 41 which is slidably guided by the plug 38 within the bore 39. Interposed between and engaging one side of the plunger 40 and plug 38 is a spring 42 which acts to normally maintain the plunger in engagement with the end wall of the bore 39. In this position, the face of the plunger will be closer to the rear face 35 of the main slide valve 25 than will be the outer face of the collar 34 of the piston stem, so that in effecting an application of the brakes the plunger will engage the main slide valve and yieldably resist relative movement of the piston and auxiliary slide valve before the collar 34 of the stem engages the main slide valve. The purpose of this is to stabilize the action of the triple valve parts, as will hereinafter more fully appear. This stabilizing mechanism also acts to assist in breaking the seal between the triple valve piston 23 and the gasket 21 in effecting the release of the brakes and further serves as a graduating spring for shifting the piston to service lap position.

The emergency valve device 19 comprises a casing 43 which is clamped to the gasket face 17 of the pipe bracket 15 in any desired manner, there being a gasket 44 interposed between the clamping faces of the casing and pipe bracket. The emergency valve casing has formed therein an emergency piston chamber 45 containing an emergency piston 46 having a stem 47 adapted to operate a main slide valve 48 and an auxiliary slide valve 49 contained in a valve chamber 50 which is connected through a passage 51 with a quick action reservoir 52 formed in the pipe bracket 15. The piston chamber 45 is normally open to the passage 51 through a choke plug 53.

The open end of the emergency valve chamber 50 is closed by a cap 54 which is secured to the casing 43 in any desired manner and which has a recess formed therein defining the rear end portion of the valve chamber 50. This recess is of greater diameter than that of the major portion of the valve chamber and, due to this, the rear end of the casing 43 forms a stop shoulder 55 against which a stop member 56, slidably mounted in the cap 54, is adapted to abut to limit inward movement of the member 56. Interposed between and engaging the member 56 is a spring 57 which at all times tends to move the member 56 toward the shoulder 55.

The rear end portion of the emergency piston stem 47 extends through a central opening in the member 56 and is slidably guided in an annular lug 58 preferably formed integral with the cap 54 and extending into the valve chamber 50. This lug besides serving to guide the rear end portion of the emergency piston stem, also serves to maintain the spring 57 against undue movement from its centralized position in the cap 54. The stem 47, at a point located a short distance inwardly from its rear end, is provided with an operating collar or lug 59, one side of which is adapted to be engaged by the member 56 and the other side of which is adapted to operatively engage a rear end surface 60 of the main slide valve 48.

The main emergency slide valve 48 is provided with a rearwardly extending lug 61 which is adapted to cooperate with the member 56 to insure the proper operation of the main slide valve 48, in substantially the same manner as the corresponding lug 36 on the main slide valve 25 of the triple valve device cooperates with the member 31 to insure the proper operation of the valve 25.

The rear end portion of the emergency piston stem carries a mechanism which in construction is quite similar to the stabilizing mechanism carried by the rear end of the triple valve piston stem 24 and comprises a plunger 62 which is subject to the pressure of a spring 63 interposed between and engaging the plunger and a plug 64 having screw-threaded connection with the stem 47. The plunger is slidably guided within a bore 65 provided in the piston and has a stem 66 which is slidably guided within a bore 67 provided in the plug 64. This mechanism is adapted to cooperate with the main slide valve 48 to shift the emergency piston 46 out of sealing engagement with the gasket 44 preparatory to releasing the brakes after an emergency application.

For the purpose of preventing fluid under pressure, acting on the under side of the main slide valve 48 of the emergency valve device 19, from raising the valve from its seat when the pressure of fluid in the emergency valve chamber 50 is reduced, a loading mechanism is provided. This mechanism may comprise a flexible diaphragm 68 which is mounted in the emergency valve casing and operatively engages a rocking pin 69 through which a loading force is adapted to be transmitted from the diaphragm to the main slide valve 48. The valve chamber 50 is open to the under side of the diaphragm and at the other side of the diaphragm there is a chamber 70 to which the valve chamber 50 is adapted to be connected by way of a passage 71, past check valves 72 and 73 which are arranged in series, a check valve chamber 74 and a choke plug 75. The check valve 73 is subject to the pressure of a spring 276 contained in the chamber 74. The check valve chamber 74 and consequently the chamber 70, are constantly connected with the emergency reservoir 3 through a passage 76, a passage 77 and a passage and pipe 78. It will thus be seen that the diaphragm is normally subjected to emergency reservoir pressure on one side, which is balanced by a corresponding fluid pressure in chamber 50 on the opposite side, so that the diaphragm does not act to exert downward presure on the main slide valve. Contained in the diaphragm chamber 70 and interposed between and engaging the emergency valve casing and a spring seat member 79, which is in operative engagement with the diaphragm 68, is a light coil spring 80, which acts to merely hold the main slide valve 48 to its seat when the valve device is being assembled or shipped, and is not intended to hold the slide valve to its seat against the action of fluid under pressure on the under side of the valve. Therefore, the action of this spring will not appreciably affect the operation of the slide valve.

The pipe bracket 15 is provided with an extension 81 having a clamping face 82 to which is secured the casing 83 of the combined centrifugal dirt collector and cut-out cock device 5, there being a gasket 84 interposed between the casing of the device 5 and the clamping face of the bracket.

Formed in the pipe bracket are a plurality of fluid conducting passages, which are open to the several clamping faces of the bracket where they are adapted to register with corresponding passages formed in the casings of the triple valve device 18, emergency valve device 19 and device 5.

There is also formed in the pipe bracket a chamber 85 open at one end and containing the strainer device 12, which is inserted through the open end of the chamber and which is secured to the bracket by means of a screw plug 86 having screw-threaded connection with the bracket. The strainer device 12 preferably comprises a perforated tubular retainer 87 and a perforated tubular retainer 88 which surrounds the retainer 87. The inner surface of the retainer 87 defines a passage 89, which is open to the triple valve piston chamber 22 through an opening 90 in the screw plug 86 and is also open to the emergency piston chamber 45 through a passage 91 in the pipe bracket. The inner end wall of the chamber 85 is provided with an annular rib 92 and the screw plug 86 is provided with a similar rib 93. When the strainer is clamped in place by the screw plug 86, the ribs 92 and 93 extend between the inner and outer ends, respectively, of the retainers 87 and 88 and maintain the retainers spaced apart and centralized in the bracket. The space between the retainers is packed with hair 94 or any other material suitable for separating dirt, moisture or the like from a fluid stream. In clamping the strainer device to the pipe bracket, the ribs 92 and 93 compress the hair 94 at the ends of the strainer, so as to insure the close engagement of the packed hair with the lugs. It will here be understood that in this construction the lugs 92 and 93, besides serving to compress the hair packing also serve as baffles for directing fluid, which may leak past the ends of the perforated retainer 88, into the packed hair, thus effectively guarding against the flow of uncleaned fluid to the passage 89 leading to the triple valve piston chamber 22 and to the emergency piston chamber 45.

The brake pipe 4 is normally open to the strainer chamber 85, exteriorly of the strainer device 12, through a pipe 95, a passage 96 in the casing 83 of the device 5, past a normally open cut-out valve 97 of the flexible diaphragm type, a passage 98, a fluid cleaning chamber 99 and a passage 100. The opening and closing of the cut-out valve 97 is controlled manually through the medium of the usual handle 101.

The double check valve device 13 is for the purpose of by-passing fluid around the strainer device 12 in case said strainer device becomes clogged, and as shown in the drawings, may comprise a casing which is preferably integral with the triple valve casing 20 and which is provided with an open ended recess which is closed by a flexible diaphragm 102 clamped between the triple valve casing and triple valve cap 29 and which constitutes a part of the release insuring valve device 6 hereinafter fully described. Within this recess the casing is provided with an annular shoulder 103 on which there is a gasket 104. Contained in this recess is a cage member 105, which is clamped between the gasket 104 and the flexible diaphragm 102 by means of the cap 29. The inner end wall of the recess formed in the casing is provided with an annular seat rib 106 against which a check valve 107 is normally held seated by the action of a light coil spring 108 interposed between and engaging the inner end portion of the cage member 105 and the check valve. A check valve 109 is contained in the cage member and is normally held seated against a seat rib 110 formed on the cage member, by a light coil spring 111, which is interposed between and engages the check valve and the inner surface of an outer annular lug formed on the cage member. The inner seated area of the check valve 107 and the spring side of the check valve 109 are connected through a passage 112 with the triple valve piston chamber 22. The inner seated area of the check valve 109 and the spring side of the check valve 107 are connected through a passage 113 to the pipe bracket chamber 85, exteriorly of the strainer device 12. It will be seen that, under normal conditions, the pressure on both sides of both check valves will be substantially equal, so that the springs 108 and 111 act to maintain the valves 107 and 109, respectively, seated. However, in the event of the strainer device becoming clogged, fluid under pressure supplied to the chamber 85 will flow therefrom through passage 113 to the inner seated area of the check valve 109 and cause the valve to be unseated against the opposing pressure of the spring 111. With the valve 109 unseated, fluid under pressure will flow past the unseated valve and through passage 112 to the triple valve piston chamber 22, and from the triple valve piston chamber fluid under pressure will flow by way of passages 90, 89 and 91 to the emergency piston chamber 45. If the strainer device should be clogged and a reduction in brake pipe pressure be effected, fluid under pressure in passage 112 leading from the triple valve piston chamber 22 to the inner seated area of the check valve 107 causes the check valve to be unseated against the opposing pressure of the light coil spring 108, so that fluid under pressure from the passage 112, and consequently from the triple valve piston chamber, flows past the unseated check valve and through passage 113 to the chamber 85 in the pipe bracket and from thence flows to the brake pipe by way of passage 100.

The release insuring valve device 6 is for the purpose of venting fluid under pressure from the auxiliary reservoir 2 when, as will be hereinafter fully described, brake pipe pressure is increased to effect the release of the brakes, so as to facilitate the movement of the triple valve piston 23 to release position. The release insuring valve device besides comprising the flexible diaphragm 102, also comprises a valve member 114 contained in a chamber 115 in the cap 29 of the triple valve device and adapted to be operated by said diaphragm, said valve member being normally urged into engagement with an annular seat rib 116 on the cap by means of a spring 117 acting through the medium of a plunger 118, which is slidably mounted in a cap nut 119 having screw-threaded connection with the cap 29 and closing the open end of the valve chamber, the spring 117 being interposed between and engaging the cap nut and the plunger. The valve member 114 is of novel construction, comprising a rigid plate 120, preferably of metal, carrying on one side a valve 121 and on the other side a centering lug 122, both of which are preferably made of a rubber composition and which are molded on the plate and which are integrally connected together by the rubber composition which extends through a comparatively small perforation 123 in the plate.

The centering lug 122 of the valve member 114 extends into an opening 124 formed in the end wall of the plunger 118 and within the opening 124 is in engagement with the plunger, so that the valve member is at all times maintained centralized.

The flexible diaphragm 102 controls the operation of the valve member 114 through the medium of a follower 125, which is in operative engagement with the diaphragm and a plurality of pins 126 which are preferably integral with the follower and which at their ends are adapted to operatively engage the valve side of the plate 120, said pins being slidably guided by the cap 29 within suitable guide openings.

The valve chamber 27 of the triple valve device and consequently the auxiliary reservoir are open to the valve chamber 115 of the release insuring valve device by way of passages 127 and 128 in the member 31 and a passage 129 in the cap 29. The inner seated area of the valve 121 of the release insuring valve device is connected to the seat of the main slide valve of the triple valve device through a passage 130, there being a choke plug 131 interposed in the passage 130 at the clamping face of the cap 29.

The quick service modifying or limiting valve device 7 is carried by the triple valve casing 20 and is for the purpose of limiting the local quick service reduction in brake pipe pressure according to a predetermined increase in brake cylinder pressure to insure the development of a predetermined but light brake cylinder pressure on each car of the train upon a light reduction in brake pipe pressure being effected through the medium of the usual brake valve device (not shown), so as to prevent the slack in the train from running in harshly. This device may comprise a flexible diaphragm 132 which is clamped between the triple valve casing 20 and a casing section 133 secured to the triple valve casing. The diaphragm is subject on one side to the pressure of a spring 134 contained in a chamber 135 open to the atmosphere through a passage 136. At the other side of the diaphragm there is a chamber 137 which is open, through a passage 138, to a brake cylinder passage 139 leading from the seat of the main slide valve 25 of the triple valve device. The chamber 137 is normally open through a passage 140 to a valve chamber 141 containing a valve 142, which is adapted to seat on a seat rib 143 to close communication through the passage 140, said valve being subject to the action of a coil spring 144 which tends to urge the valve toward its seat. Leading from the seat of the main slide valve 25 of the triple valve device to the valve chamber 141 is a passage 145 having a choke plug 146 interposed therein, and within the valve chamber 141 there is a ball check valve 147 which is adapted to prevent the back flow of fluid from the chamber to the passage 145. One end of the spring 144 seats on the ball check valve 147, and tends to maintain the check valve seated.

The reservoir release valve device 8 is carried by the casing 133 secured to the triple valve casing 20 and is manually operative to vent fluid under pressure from the auxiliary reservoir, or from both the auxiliary reservoir and the emergency reservoir, to effect the release of the brakes independently of the usual brake valve device under certain train operating conditions. This device may be of substantially the same construction and may function in substantially the same manner as the reservoir release valve device fully disclosed and claimed in Patent Nos. 2,012,717 and 2,012,718, issued August 27, 1935, and in view of this, a detailed description of the device here is deemed unnecessary.

The quick action device 9 is associated with the emergency valve device 19 and is mounted in the emergency valve casing 43. This device 9 may comprise a quick action piston 148, at one side of which is a piston chamber 149 to which fluid under pressure is adapted to be supplied by way of a passage 150 when, as will hereinafter be fully described, an emergency application of the brakes is initiated. At the other side of the piston there is a chamber 151 which is open to the atmosphere through an opening 152 and a passage 153 in the casing 43. The piston 148 is operatively connected by a stem 154 to a brake pipe vent valve 155 contained in a chamber 156 to which the brake pipe is connected by way of the strainer recess 85 in the pipe bracket 15, passage 113 and a passage 157. The vent valve 155 is clamped between an annular collar 158 carried by the stem 154 and a guide member 159 having screw-threaded connection with the end portion of the stem, said guide member being slidably guided within the chamber 156 by the emergency valve casing. The valve 155 is normally maintained seated on a seat rib 160 by the action of a coil spring 161 interposed between and engaging the guide member 159 and a spring seat 162 supported on an annular shoulder 163 formed on the casing, thus the valve closes off communication through a passage 164 from the chamber 156 to the atmospheric passage 153. With the quick action piston in its normal position as shown in Fig. 1, the piston chamber 149 is open to the atmosphere by way of a leakage groove 165 around the piston and also by way of a small port 166 through the piston. The purpose of the small port is to control the rate of flow of fluid from the emergency valve chamber and the connected quick action chamber 52 to the atmosphere so as to insure the vent valve remaining open until, as will hereinafter appear, fluid under pressure is substantially completely vented from the brake pipe. The leakage groove 165 provides for the fairly rapid discharge of fluid from the piston chamber 149, so that in the event of the leakage of fluid into the chamber by way of the passage 150, the development of sufficient pressure in said chamber to cause said piston to unintentionally move to its valve unseating position is prevented.

Also contained within the casing 43 of the emergency valve device 19 is the inshot valve mechanism 10 which is operative, when effecting an emergency application of the brakes, to provide an initial inshot of fluid to the brake cylinder until a predetermined brake cylinder pressure (about fifteen pounds) is developed and to then restrict the rate of flow of fluid to the brake cylinder, said mechanism comprising a poppet valve 167 contained in a chamber 168 which is constantly open to the brake cylinder passage 139 through a branch passage 169, and also comprises a valve piston 170 having a stem 171 secured thereto, through the medium of which the operation of the valve 167 is controlled. Normally, the valve piston 170 is maintained in sealing engagement with the casing by the action of a coil spring 172 contained in a chamber 173, and when in this position, the stem 171 maintains the valve 167 unseated against the action of a spring 174 tending to seat the valve. The spring 174 is interposed between and engages the valve 167 and a spring seat 184 seated on an annular shoulder 285 formed on the casing within the valve chamber 168. The choke plug 179 is removably mounted in an interior wall 277 of the casing of the inshot valve mechanism and is rendered readily accessible for removal and replacement and for cleaning from the exterior of the casing through an opening in the outer wall of the casing, said opening being normally closed by a removable plug 278 having screw-threaded connection with the latter wall.

With the poppet valve 167 unseated, the valve chamber 168 is open to the brake cylinder 14 by way of a passage 175, a chamber 176, a passage 177 and a passage and pipe 178, and is also open to the chamber 176 through a choke plug 179. The inner seated area of the valve piston 170 is open through a passage 180 to the passage 177. The chamber 173 at the opposite side of the valve piston is open through a passage 181 to a small chamber 182, which is open to the seat of the emergency main slide valve 48 through a passage 183.

The timing valve device 11 is also contained in the casing 43 of the emergency valve device and operates in effecting an emergency application of the brakes to supply a final inshot of fluid under pressure to the brake cylinder at a predetermined time after the valve device 10 operates to retard the flow of fluid to the brake cylinder. This device comprises a flexible diaphragm 184, which is adapted to control the operation of a valve 185 contained in a chamber 186 at one side of the diaphragm and connected to the brake cylinder through a restriction 187 and passage and pipe 178. At the other side of the diaphragm there is a chamber 188, which is connected to the emergency valve chamber 50 and consequently to the quick action chamber 52 by way of a passage 189, a passage 190 in the spring-pressed stop member 55 of the emergency valve device, and a passage 191 in member 56. The diaphragm is normally subject to the pressure of fluid supplied from the quick action chamber 52 to the diaphragm chamber 188 for holding the timing valve 185 seated on a seat rib 192. The inner seated area of the valve is connected through a passage 193 to the brake cylinder passage 139.

The equipment may also comprise a retaining valve device 194 of the usual well known construction, having a cut-out position in which fluid under pressure is adapted to be completely vented from the brake cylinder and also having a cut-in position in which it operates in the usual manner in releasing the brakes to retain a predetermined pressure in the brake cylinder.

The foregoing description has been limited more or less to the details of the several parts of the equipment and the following description will be directed more particularly to the functioning of said parts in controlling the brakes.

*Initial charging*

To initially charge the brake equipment, fluid under pressure is supplied to the brake pipe 4 in the usual well known manner and with the cut-out valve 97 in open position as shown in the drawings, fluid thus supplied to the brake pipe flows to the strainer chamber 85 in the pipe bracket 15 by way of pipe 95, passage 96 in the combined cut-out cock and dirt collector 5, past the open cut-out valve 97, passage 98, chamber 99, and passage 100. Normally, fluid thus supplied to the chamber 85 flows through the strainer device 12 to the passage 89 and from thence flows through passages 90 and 91 to the triple valve and emergency valve piston chambers 22 and 45, respectively. From the chamber 85 fluid flows through passage 113 to the inner seated area of the check valve 109 and to the spring side of the check valve 107 and also flows through passages 113 and 157 to the vent valve chamber 156 of the quick action valve device 9. Fluid under pressure supplied to the triple valve piston chamber 22 flows through passage 112 to the inner seated area of the check valve 107 and to the spring side of the check valve 109 and since the fluid pressures on both sides of both check valves are substantially equal the valves will be held seated by the action of their respective springs 108 and 111.

It will here be understood that in the event of the strainer device becoming clogged to such an extent that the increase in the pressure of fluid in the passage 112 and consequently on the spring side of the check valve 109 is at a slower rate than that of the pressure of fluid in the passage 113 and consequently on the inner seated area of the valve, said valve 109 will be unseated, so that fluid under pressure will be permitted to flow past the unseated valve to the passage 112 and consequently to the triple valve piston chamber 22. Fluid thus supplied to the chamber 22 flows from thence through passages 90, 89 and 91 to the emergency piston chamber 45.

Fluid under pressure supplied to passage 112 flows through a branch passage 196 to the seat of the main slide valve 25 of the triple valve device.

With the triple valve piston 23 in the normal or outer release position as shown in Fig. 1 of the drawings, fluid under pressure supplied to the piston chamber 22, flows therefrom through a feed groove 197 to valve chamber 27 and from thence through passage and pipe 28 to the auxiliary reservoir 2. From the valve chamber 27 fluid under pressure also flows to the emergency reservoir 3 by way of a restricted port 198 in the main slide valve 25, a passage 77 with which the port 198 registers at the seat of the main slide valve and a passage and pipe 78, so that both the auxiliary reservoir 2 and the emergency reservoir 3 are charged with fluid up to brake pipe pressure. The restricted port 198 retards the rate of flow of fluid to the emergency reservoir, so that more fluid will flow toward the rear of the train than would be the case if the flow of fluid to this reservoir were at a fast rate. Further, fluid under pressure flows from the valve chamber 27 through a passage 129 to the diaphragm chamber 115 of the release insuring valve device 6. Since the pressure of fluid on the check valve side of the flexible diaphragm 102 may be increased at a more rapid rate than it is increased in chamber 115, the diaphragm may flex inwardly and cause the valve 121 to be unseated against the opposing pressure of the spring 117 acting through the medium of the plunger 118, but the unseating of this valve will not result in the loss of fluid pressure from the valve chamber 27 and auxiliary reservoir 2 since, as will hereinafter be more fully described, the main slide valve 25 in both the outer and inner release positions laps the passage 130 to which the chamber 115 is open when the valve 121 is unseated. When the pressures on opposite sides of the diaphragm 102 becomes substantially equal, the spring 117 acts to seat the valve 121, thus closing the communication from the chamber 115 to the passage 130 leading to the seat of the main slide valve.

It will here be noted that with the triple valve device in the outer release position as shown in Fig. 1, fluid under pressure flows from the passage 196 by way of a port 199 in the main slide valve to the under side of the auxiliary slide valve 26. The pressure of fluid in the valve chamber 27 and the force of the spring 200, which is interposed between the triple valve piston stem 24 and the upper side of the auxiliary slide valve, exert a downward pressure on the auxiliary slide valve, which downward pressure is offset by the pressure of fluid acting on the under side of the valve, thus the frictional resistance of the valve to movement relative to the main slide valve 25 is less than would be the case if the under side of the slide valve were not subjected to fluid under pressure. If, for any reason, the pressure of fluid increases more rapidly in the piston chamber 22 than it does in the valve chamber 27, the triple valve piston 23 will be caused to move inwardly from its outer position against the opposing pressure of the spring 32 before the pressure of fluid from the piston chamber and acting on the under side of the auxiliary valve 26 is sufficient to raise the valve from its seat on the main valve. As the piston moves it shifts the main slide valve to the inner release position, in which communication from the passage 196 to the port 199 in the main slide valve is closed, thus the danger of raising the auxiliary valve from its seat on the main slide valve is entirely eliminated.

When, with the triple valve parts in the inner release position, the pressures of fluid in the piston chamber 22 and valve chamber 27 are substantially equal, the spring 32 acts through the medium of the movable member 31 to shift the piston and slide valves to the outer release position.

With the emergency piston 46 in release position as shown in Fig. 1 of the drawings, fluid under pressure supplied, as before described, to the piston chamber 45 flows therefrom through the choke plug 53 and passage 51 to the quick action chamber 52 and to the emergency valve chamber 50. From the valve chamber 50 fluid under pressure flows through passage 189 to the diaphragm chamber 188 of the timing valve device 11. If for any reason, the pressure of fluid builds up more rapidly in the emergency valve chamber 50 than it does in the emergency reservoir 3, fluid under pressure flows from said chamber to the emergency reservoir by way of passage 71, past the check valves 72 and 73, check valve chamber 74, passages 76 and 77 and passage and pipe 78. The check valve 73 is subject to the pressure of the light coil spring 276 which is provided for the purpose of seating said check valve upon the substantial equalization of pressures acting on the opposite sides thereof. From the check valve chamber 74 fluid under pressure flows through the choke plug 75 to the diaphragm chamber 70 of the emergency slide valve mechanism. The emergency valve chamber 50 being open to one side of the loading diaphragm 68 and the opposite side of the diaphragm being connected to the check valve chamber 74 and consequently to the emergency reservoir 3, the fluid pressures equalize on opposite sides of the diaphragm and only the pressure of the light coil spring 80 acts, through the medium of the diaphragm and rocking pin 69, on the main emergency slide valve 48. As before described, the spring 80 is for the purpose of holding the slide valve 48 to its seat when the emergency valve is being assembled or shipped and the load it imposes on the valve is negligible.

In either the outer or inner release position of the triple valve device 18, the brake cylinder 14 is open to the atmosphere through pipe and passage 178, passage 177, chamber 176 of the inshot valve device 10, past the inshot valve 167 which is maintained unseated by the action of the spring 172, through the inshot valve chamber 168, passages 169 and 138, a cavity 201 in the main slide valve 25 of the triple valve device, a passage and pipe 202 and finally through the retaining valve device 194 which is normally carried in the cut-out position, and in the following description, will be assumed to be in this position unless otherwise specified.

The small chamber 182 formed in the casing of the emergency valve device, and the inshot valve piston chamber 173, which is connected through passage 181 to the chamber 182, are open to the atmosphere through passage 183, a cavity 203 in the main emergency slide valve 48, a passage 204, passage 193, and passage 139 through which the brake cylinder 14 is open to the atmosphere. With the chamber 176 and consequently the inner seated area of the inshot valve piston 170 connected to the atmosphere, the spring 172 of the inshot valve device maintains said piston in its inner position, in which an annular rib on a gasket 205 carried by the piston seals against the casing. In this position, the outer seated area of the piston is connected to the piston chamber 173 and consequently to the atmosphere through a leakage groove 206 extending around the piston. The purpose of this groove is to permit fluid which may leak past the gasket 205, in effecting an emergency, application of the brakes, to flow to the atmosphere, so as to prevent the untimely operation of the inshot valve device to restrict the flow of fluid to the brake cylinder. This feature will be more fully described later in this specification.

The inner seated area of the timing valve 185 is connected to the atmosphere through passage 193 and the outer seated area is connected to the atmosphere through the choke 187, and brake cylinder passage 178. This permits fluid at quick action chamber pressure in diaphragm chamber 188, acting through the medium of the diaphragm 184, to maintain the valve in sealing engagement with the seat rib 192.

With the triple valve device in either the outer or inner release position, the diaphragm chamber 137 of the quick service modifying valve device 7 is open to the atmosphere through passage 138 and brake cylinder passage 139. With the diaphragm chamber thus open to the atmosphere, the spring 134 acting through the medium of the diaphragm 132 holds the valve 142 unseated, so that the quick service passage leading from the seat of the triple valve main slide valve 25 is at substantially atmospheric pressure.

*Service application*

A service application of the brakes is initiated by effecting a gradual reduction in brake pipe pressure in the usual well known manner. Since, as before described, the brake pipe 4 is in communication with the triple valve piston chamber 22 and with the emergency piston chamber 45, the pressure of fluid in these chambers gradually reduces with the brake pipe pressure.

Upon a predetermined, but light reduction in pressure in the triple valve piston chamber 22, the pressure of fluid in the triple valve chamber 27 causes the triple valve piston 23 to move outwardly in a direction toward the left hand, and through the medium of the piston stem 24, shifts the auxiliary slide valve 26 relative to the main slide valve 25. As the auxiliary slide valve is thus shifted, it laps the port 198 in the main slide valve, thus closing the communication between the valve chamber 27 and the emergency reservoir 3. At substantially the same time as the port 198 is closed by the auxiliary valve 26, the triple valve piston 23 closes the feed groove 197, so as to prevent back flow of fluid under pressure from the valve chamber 27 to the piston chamber 22. After the feed groove 197 is closed, the continued movement of the piston causes the rear end of the auxiliary slide valve 26 to open a service port 210 in the main slide valve 25, following which, the plunger 40, mounted in the rear end of the piston stem 24, engages the rear surface 35 of the main slide valve. The further outward movement of the auxiliary slide valve by the piston 23 and relative to the main slide valve is now resisted by the spring 42 acting through the piston stem 24. Now when a predetermined light reduction in brake pipe pressure has been effected, say for instance about one pound, a sufficient fluid pressure differential is created on the piston 23, so that the piston will be caused to move outwardly, overcoming the resistance offered by the spring 42, and shifting the auxiliary slide valve to initial quick service position. The piston 23 is very sensitive to pressure differentials and, therefore, quickly responds to a light but predetermined brake pipe reduction to move the auxiliary slide valve 26 relative to the main slide valve to close the port 198 and to open the service port 210, and to close the feed groove 197 and to then move the auxiliary slide valve to quick service position.

In the initial quick service position of the auxiliary slide valve 26, a cavity 211 in said valve connects port 199 in the main slide valve 25 to a port 212 also in the main slide valve. At the seat of the main slide valve 25, the port 199, as before described, is connected to the passage 196, which is at all times open to the brake pipe through a passage 112 and the port 212 is open to a passage 213 leading to a quick service bulb 214, which is constantly open to the atmosphere through a passage 215 and a choke plug 216 interposed in the latter passage. With the ports thus connected to each other, fluid under pressure is permitted to flow from the brake pipe 4 to the quick service bulb 214 and from thence is permitted to flow to the atmosphere by way of passage 215 and choke plug 216.

The initial local quick service flow of fluid from the brake pipe to the quick service bulb 214 is at a fast rate until the brake pipe pressure substantially equalizes into the bulb 214 and then continues at a slower rate as governed by the choke plug. The initial flow of fluid to the bulb 214 produces a sudden limited quick service reduction in pressure in the brake pipe 4 for initially hastening the operation of the triple valve device on the next car in a train. The triple valve device on said next car then operates in a similar manner, and in this way, a quick serial response to the brake pipe reduction is transmitted from one car to the next throughout the length of the train.

After this sudden limited reduction in brake pipe pressure has been effected by the flow of fluid to the quick service bulb 214, the quick service reduction is adapted to continue at a slower rate through the choke plug 216. This continued reduction is for the purpose of insuring movement of the local triple valve parts to service position. When the piston 23 and graduating valve 26 move to the initial quick service position, the lug 34 on the piston stem 24 engages the rear surface 35 of the main slide valve 25, so that upon further movement of the piston toward service position, the main slide valve will be shifted in the same direction. The quick service ports 199 and 212 in the main slide valve are provided with tail cavities which will continue the initial quick service venting of fluid from the brake pipe for a short period of time after the movement of the valve has been initiated. As the valve continues to move, it laps the passage 196, closing off the further quick service flow of fluid from the brake pipe to the atmosphere by way of bulb 214. At substantially the same time as the passage 196 is lapped, the service port 210, which has been previously uncovered by the auxiliary slide valve 26, is cracked open to the passage 139, so that fluid under pressure now starts to flow from the triple valve chamber 27 and connected auxiliary reservoir to the brake cylinder by way of port 213, passages 139 and 169, valve chamber 168 of the inshot valve device 10, past the open inshot valve 167, passage 175, chamber 176, passage 177 and passage and pipe 178. Immediately following this, the passage 196 is cracked open to the cavity 207 in the main slide valve, and since this cavity is in communication with the passage 145, fluid under pressure now flows at a slow rate from the brake pipe to the brake cylinder by way of passages 112 and 196, cavity 207, passage 145, choke plug 146, past the ball check valve 147 in the quick service modifying valve device, valve chamber 141, past the open quick service modifying valve 142, passage 140, diaphragm chamber 137, passages 138, 139 and 169, emergency inshot valve chamber 168, past the open inshot valve 167, passage 175, chamber 176, passage 177 and passage and pipe 178.

It will here be noted that the main slide valve 25 in its traverse toward service position cracks the service port open to the passage 139 leading to the brake cylinder at substantially the same time as it fully laps the passage 196 and just before it brings the cavity 207 into registration with said passage. The flow of fluid from the valve chamber 27 and connected auxiliary reservoir to the brake cylinder through the cracked open service port will be at such a slow rate that the effect of the resulting reduction in auxiliary reservoir pressure on the continued movement of the trippie valve piston 23 toward service position will be negligible. The reason for thus opening the service port to the brake cylinder before permitting the final quick service flow of fluid from the brake pipe to the brake cylinder is to effect a reduction in auxiliary reservoir pressure before the brake cylinder pressure is increased by the quick service flow of fluid to the brake cylinder. In this connection it will be understood that if the final quick service flow of fluid from the brake pipe to the brake cylinder were permitted to take place before the service port were opened and the triple valve parts should for any reason come to a stop before the service port is opened, the quick service flow of fluid from the brake pipe would build up the brake cylinder pressure, and since no reduction in auxiliary reservoir pressure could occur, the brakes could not be released upon an increase in brake pipe pressure. By my arrangement of ports a reduction in auxiliary reservoir pressure will occur before the final quick service flow of fluid to the brake cylinder takes place, so that the above referred to objectionable feature is not present in my equipment.

The triple valve piston 23 and slide valves 25 and 26 continue to move to service position, in which the piston seals against the gasket 21. With the main slide valve in service position, the passage 196 is open to the passage 145 and the service port 210 is fully open to the passage 139 leading to the brake cylinder.

Now when a predetermined brake cylinder pressure has been developed, say for instance nine pounds, fluid at brake cylinder pressure in diaphragm chamber 137 of the quick service modifying valve device 7 causes the diaphragm 132 to flex outwardly (that is, upwardly, as in Fig. 5) against the opposing pressure of the spring 134, which permits the spring 144 to act to seat the valve 142. With the valve 142 thus seated, the final quick service flow of fluid from the brake pipe to the brake cylinder is closed off.

Figure 3:
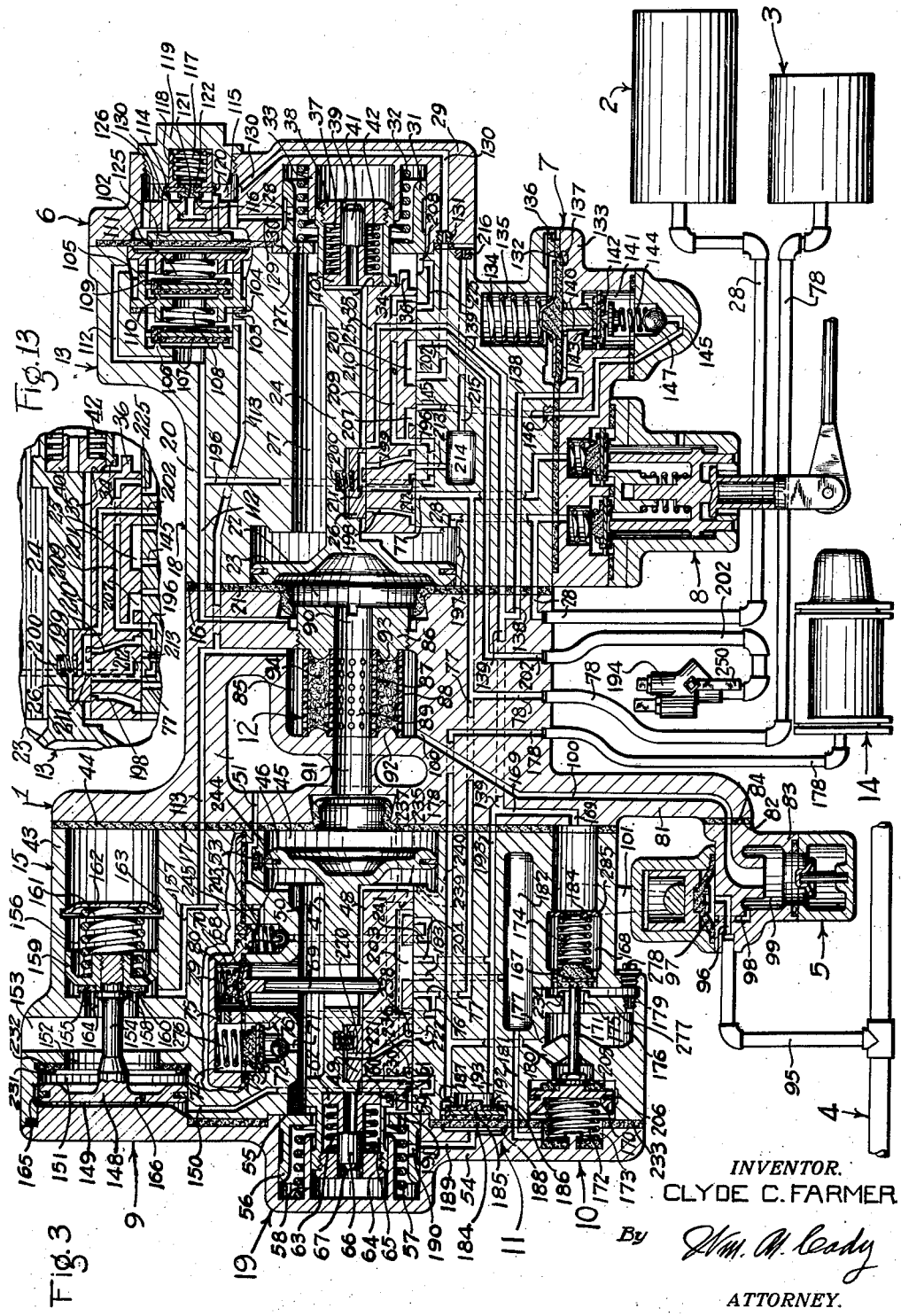
Figure 4:
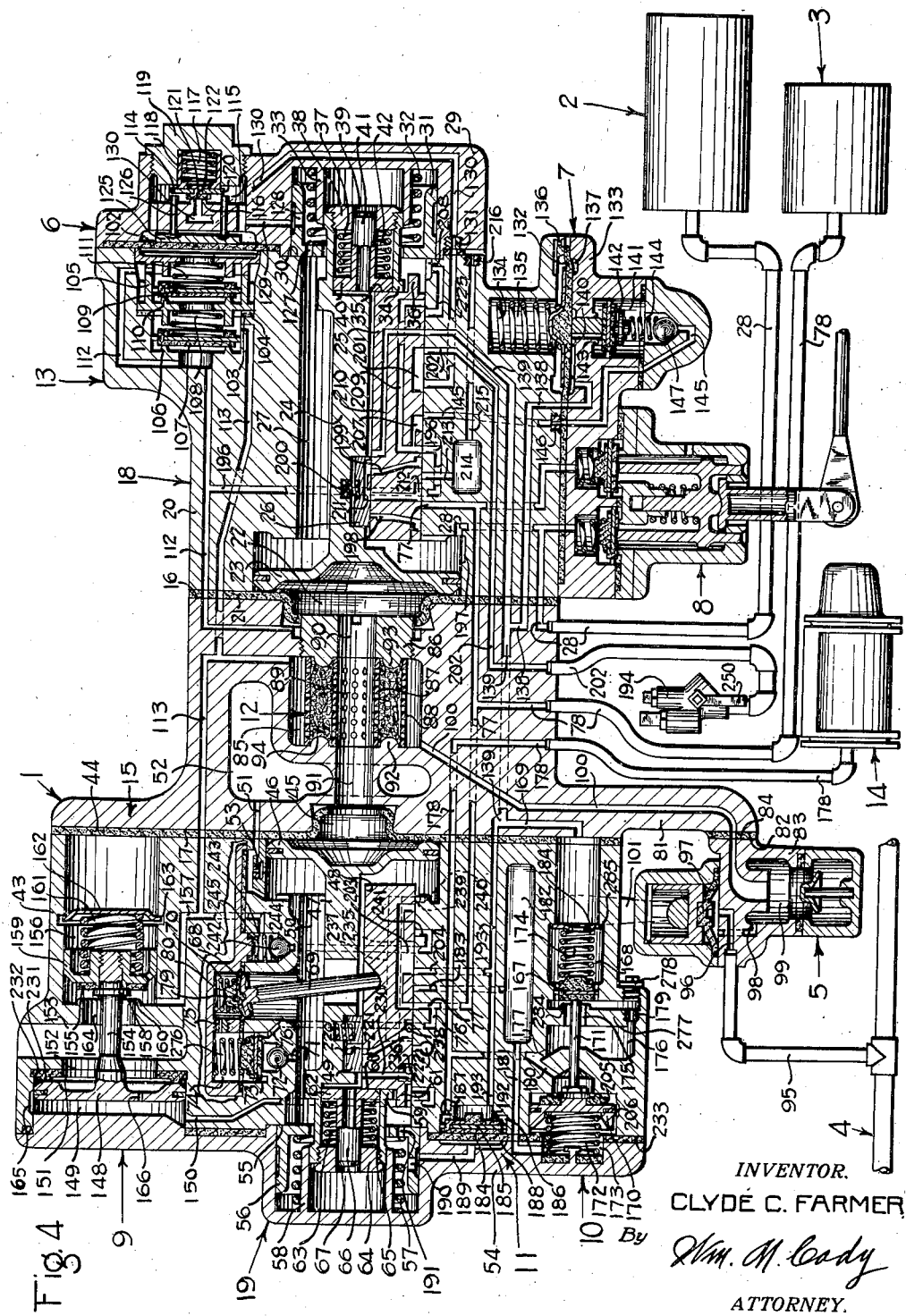

If, after a light application of the brakes has been effected the brake cylinder pressure on any car or cars of the train should reduce by leakage to a point slightly below the value of the spring 134 of the quick service modifying valve device 7, said spring will act to flex the diaphragm 132 inwardly to its normal position as shown in Fig. 3, unseating valve 142 against the opposing pressure of the spring 144, so that fluid under pressure will flow from the brake pipe to the brake cylinder by way of passage 196, cavity 207 in the main slide valve 25 of the triple valve device, passage 145, past the ball check valve 147 of the quick service modifying valve device, valve chamber 141, past the unseated valve 142, passage 143, chamber 137, passages 138, 139 and 169, chamber 168 in the inshot valve device 10, past the unseated inshot valve 167, passage 175, chamber 176, passage 177 and passage and pipe 178.

*Summary of quick service action*

It will be apparent from the foregoing description, that my equipment is capable of functioning to effect a local quick service reduction in brake pipe pressure in three stages after a light but predetermined reduction in brake pipe pressure has been effected through the medium of the usual brake valve device. The first stage of this local reduction is at a fast rate to the small quick service bulb 214, the amount of reduction on the local car being adequate to insure the movement of the triple valve device on the next car to initial quick service position, thus insuring the prompt propagation of quick service action throughout the train. The second stage of quick service reduction is due to the venting of fluid from the quick service bulb 214 to the atmosphere by way of the choke plug 216, consequently a slow venting of fluid from the brake pipe to the atmosphere takes place, so as to reduce the brake pipe pressure sufficiently to insure movement of the local triple valve device to service position. This second stage of reduction continues until closed off by the main slide valve 25 in its traverse toward service position. The third or final reduction is from the brake pipe to the brake cylinder or to any other suitable chamber and begins when the cavity 207 in the main slide valve 25 establishes communication from the passage 196 to the choked passage 145 leading to the brake cylinder by way of the quick service modifying valve device 7 and continues until closed off by the action of the quick service modifying valve device upon a predetermined increase in brake cylinder pressure. This final reduction in brake pipe pressure begins before the triple valve piston 23 and slide valves 25 and 26 are in service position and, therefore, contributes to the prompt movement of the parts to service position and is for the purpose of insuring the triple valve piston remaining in service position until the desired brake cylinder pressure (for example, nine pounds) is developed. It will here be noted that the final reduction is at a slow rate, so as to smooth out or dampen surges which may have been created in the fluid under pressure in the brake pipe.

One of the reasons why a much more rapid propagation of quick serial action in service throughout the train is secured by my apparatus, than has heretofore been obtained or considered possible, is that fluid can be vented from the brake pipe to a reservoir at a more rapid rate than heretofore. This rapid rate would not be permissible, if there were a possibility of this rate being of such duration as to cause an emergency operation. By making the volume of the reservoir so small that equalization of the brake pipe into the reservoir at a rapid rate will not cause an emergency rate of reduction of such duration as to produce an emergency operation, I have secured the advantage of a rapid transmission rate in service without danger of causing an emergency operation.

At the same time, if any triple valve device in the train fails to move to service position upon equalization of the brake pipe into the small reservoir, the restricted atmospheric port open to the reservoir causes a continued slow venting of fluid from the brake pipe at a service rate, until the brake pipe pressure has been reduced sufficiently to provide a differential pressure on the auxiliary reservoir side of the triple valve piston such as to cause its movement.

*Operation of the emergency portion in effecting a service application*

Fluid at the pressure supplied through passage 139 to the brake cylinder 14, flows from said passage to the small chamber or reservoir 182 by way of passages 193 and 204, cavity 203 in the emergency main slide valve 48, and passage 183, and from the chamber 182 flows by way of passage 181 to the inshot valve piston chamber 173. Fluid under pressure flows through the leakage groove 206 from the piston chamber 173 to the outer seated area of the piston. Since both sides of the piston 170 are subjected to the pressure of fluid from the passage 139, said piston will be balanced and the spring, therefore, acts to maintain the piston in its inner seated position as shown in Fig. 1, so that during a service application of the brakes the inshot valve 167 is not permitted to seat.

Upon a service reduction in pressure in the emergency piston chamber 45, the emergency piston 46 and auxiliary slide valve 49 are shifted outwardly, i. e., in the direction toward the right hand, relative to the main slide valve 48, by fluid in the emergency valve chamber 50 at quick action chamber pressure. As the piston is thus shifted it closes the communication between the emergency piston chamber 45 and the passage 51 leading to the quick action chamber 52 and emergency valve chamber 50, and at substantially the same time, a port 220 in the auxiliary slide valve 49 is brought into registration with a port 221 in the main slide valve 48, which latter port is connected through passage 238 and cavity 237 with a passage 222 open to the atmosphere. Fluid under pressure now flows through the registering ports passage and cavity from the emergency valve chamber 50 and connected quick action chamber 52 at a rate substantially equal to the service rate of reduction in the pressure of fluid in the emergency piston chamber 45, so that the operating pressure differential on the piston 46 is substantially destroyed. In the service position of the emergency piston, the plunger 62, carried by the piston stem 47, is adapted to just engage the rear end surface 60 of the main slide valve 48, so that unintentional further movement of the piston and auxiliary slide valve 49 toward the right hand is prevented by the pressure of the spring 63. When the pressure of fluid in the valve chamber 50 is reduced, fluid at emergency reservoir pressure present in the diaphragm chamber 70 exerts an inwardly directed force on the diaphragm 68 which is transmitted through the rocking pin 69 to the main slide valve 48 and which so loads the main slide valve as to eliminate the danger of the slide valve being raised from its seat by fluid under pressure being supplied through the cavity 203 to the small reservoir 182. This loading of the main slide valve also eliminates any tendency of the slide valve moving under the action of the spring 63 in the event of the piston moving a sufficient distance to effect a slight compression of the spring.

Limited service application of the brakes

In order to limit the degree of brake application, the brake pipe pressure is only reduced an amount sufficient to effect the desired service application. Then, when the auxiliary reservoir pressure in the triple valve chamber 27 is reduced, by the flow of fluid through the service port 210 and passage 139 to the brake cylinder 14, an amount substantially equal to the degree of brake pipe reduction in the triple valve piston chamber 22, the triple valve piston 23 and auxiliary slide valve 26 are moved rearwardly from service position to service lap position, in which the piston is brought to a stop by its engagement with the forward end of the main slide valve 25. This movement of the piston and auxiliary slide valve 26 is initiated by the action of the compressed spring 42, which cooperates with the piston stem and main slide valve 25 to force the piston away from the gasket 21, that is to say, to move the piston so that the seal between the piston and gasket is broken. After the piston seal is thus broken, the spring acts to continue the movement of the piston and slide valve 26 toward service lap position, but just before the service port 210 is fully lapped by the auxiliary valve, the end of the plunger 40 engages the piston stem so that the spring 42 will no longer act to move the piston and slide valve toward lap position. Now, a slight pressure differential on the piston, which will be caused by the pressure of fluid in the valve chamber 27 reducing slightly below the brake pipe pressure in piston chamber 22, moves said piston and thereby the auxiliary slide valve to lap position, in which the valve laps the service port 210 and thus closes off the further flow of fluid under pressure from the auxiliary reservoir 2 to the brake cylinder 14.

When the degree of brake pipe reduction is thus limited, the quick action chamber pressure in the emergency valve chamber 50 continues to reduce through the registering ports 220 and 221 in the auxiliary and main emergency slide valves until the pressure of fluid in said chamber is slightly below the brake pipe pressure in piston chamber 45, at which time the pressure differential created on the emergency piston 46 causes the piston and auxiliary slide valve 49 to return to full release position, in which position the ports 220 and 221 in the emergency slide valves are out of registration with each other, so that further reduction in the pressure of fluid in the emergency valve chamber 50 does not occur.

If, after a limited application of the brakes has been effected, it is desired to increase the brake cylinder pressure, a further reduction in brake pipe pressure is effected through the medium of the brake valve device, which causes the triple valve piston 23 to move from service lap position toward service position, shifting the auxiliary slide valve 26 to uncover the service port 210 as shown in Fig. 13, so that fluid under pressure again flows from the auxiliary reservoir to the brake cylinder. It will be noted that the movement of the piston and slide valve from service lap position to the position for opening the service port is unopposed by the spring 42. By reason of this the triple valve piston and auxiliary slide valve will promptly move to reapplication position upon a very light reduction in brake pipe pressure. If it be remembered, in conjunction with the foregoing, that the quick service brake pipe venting action is eliminated upon a succeeding reduction of one brake application (as compared with the initial reduction) and also modified or limited upon re-applications with pressure held in the brake cylinders by retainer valves, for example, and further that the brake cylinder pressure upon any initiation of a service application is automatically and definitely carried up to a predetermined point (for example nine pounds) sufficient to produce a retarding force and gather the slack, it will be evident that my improved equipment provides extremely flexible control of the service application, under all conditions of operation of the train, and make it possible to obtain the service braking pressure up to full service (or equalization) in a series of small increments or stages, for example five or six stages instead of the two or three stages obtainable with various prior equipments.

Loading and unloading of the triple valve slide valves

With the triple valve parts in either the outer or inner release position, the cavity 211 in the auxiliary slide valve 26 is open to the triple valve chamber 27 through a passage 225 and the service port 210 in the main slide valve 25, so that fluid under pressure is supplied to the underside of the auxiliary slide valve. Fluid under pressure thus supplied to the cavity acts to reduce the seating pressure of the auxiliary slide valve and consequently reduces the resistance of the valve to forward movement relative to the main slide valve.

In the outer release position of the triple valve parts, the cavity 201 in the main slide valve is open to the atmosphere by way of the brake cylinder exhaust passage 202 and the retaining valve device 194, and the cavities 207 and 209 are connected to the atmosphere by way of the passage 145, past the ball check valve 147, chamber 141 of the valve device 7, past the open valve 142, diaphragm chamber 137, passage 138 and 139 and cavity 201 in the main slide valve, all as shown in Fig. 1. This causes the seating pressure of the main slide valve on its seat to be increased and as a consequence the resistance of the slide valve to movement by the triple valve piston is increased, thus rendering the valve stable in its operation. The cavity 201 remains connected to the atmosphere during the full traverse of the slide valve from outer release position to application position and during the time the valve is in application position, and the cavities 207 and 209 remain vented until the slide valve moves into application position, at which time the cavity 207, which is connected with the cavity 209, is opened to the passage 196. Fluid at brake pipe pressure now flows from the passage 196 to the cavities 207 and 209 and acts on the slide valve to decrease the load thereon. It will here be noted that the load imposed on the slide valve during the traverse of the valve from its outer release position to application position prevents the spring 42, as it is compressed, from moving the valve forwardly and also prevents the valve, due to its momentum and the pressure of the spring 42 from moving beyond application position. When, with the slide valve in application position, fluid under pressure flows to the cavities 207 and 209 and the valve is thereby partially unloaded, the load imposed on the valve due to the cavity 201 being connected to the atmosphere is great enough to prevent the compressed spring 42 from moving the valve forwardly beyond application position. Due to the partial unloading of the slide valve in application position, the release movement of the valve is facilitated upon an increase in brake pipe pressure. This is especially desirable on cars at the rear end of the train where, in releasing the brakes, the rise in brake pipe pressure is slower than on the cars at the head end of the train.

In the inner release position of the triple valve parts, fluid under pressure is supplied from the triple valve chamber 27 to the cavity 207 in the main slide valve 25 by way of the groove 208 formed in the triple valve casing, and the port 209 in the valve. Fluid under pressure thus supplied to the cavity acts to reduce the loading effected by the connecting of the brake cylinder exhaust cavity 201 in the valve to the atmosphere by way of passage 202 and retaining valve device 194. This, of course, reduces the resistance offered by the valve to the forward movement of the triple valve parts, and insures the movement of said parts from the inner release position to the outer release position and the consequent full registration of the quick service port 199 with the passage 196 leading from the brake pipe.

*Release of the brakes*

To effect a release of the brakes after an application, fluid under pressure is supplied to the brake pipe 4 and flows therefrom to the triple valve piston chamber 22 and emergency piston chamber 45 in the same manner as has before been described in connection with the initial charging of the equipment.

To initiate the release of the brakes, it is customary to first turn the usual brake valve to release position, in which fluid under pressure is supplied directly from the main reservoir (not shown) to the brake pipe and then, after a desired predetermined interval of time has elapsed, the brake valve is turned to the usual running position, in which fluid at feed valve pressure is supplied to the brake pipe.

The initial supply of fluid at high pressure to the brake pipe rapidly increases the brake pipe pressure on the cars at the head end of the train and at or near the locomotive the brake pipe pressure may be increased to substantially that carried in the main reservoir. This high head of pressure at the front end of the train is adapted to cause a rapid flow of fluid under pressure to the rear of the train so as to accelerate the release of the brakes and the charging of the brake equipment on the cars at the rear end of the train.

The rapid increase in brake pipe pressure at the front end of the train creates a pressure differential on the triple valve piston 23 which causes the piston and thereby the valves 25 and 26 to promptly move to the outer release position, in which position the collar 34 on the piston stem 24 engages the movable stop member 31.

In normal or outer release position the feed groove 197 around the triple valve piston 23 is open, so that fluid under pressure is permitted to flow from the piston chamber 22 to the valve chamber 27, but the flow capacity of this feed groove is not great enough to permit fluid to flow therethrough at as fast a rate as fluid is supplied to the piston chamber on cars at the head end of the train. As a result, a sufficient pressure differential is created on said piston to cause the piston and slide valves 25 and 26 to move to the inner release position, as shown in Fig. 2, against the opposing pressure of the spring 32.

In either the outer or inner release position of the triple valve parts, fluid under pressure is supplied at a restricted rate from the triple valve piston chamber 22 through feed groove 197 to the valve chamber 27 and connected auxiliary reservoir 2. Fluid under pressure is also supplied to the chamber 27 and auxiliary reservoir from the fully charged emergency reservoir 3 by way of pipe and passage 78, passage 77 and restricted port 198 which has been uncovered by the auxiliary slide valve 26. Due to the restricting of the flow of fluid from the brake pipe to the auxiliary reservoir and to the supplying of fluid under pressure from the emergency reservoir 3 to the auxiliary reservoir the amount of fluid taken from the brake pipe will not be great and due to this, more fluid will flow toward the rear of the train, thus hastening the charging of the brake pipe on the cars at the rear end of the train.

The restricted port 198 in the main slide valve limits the rate at which fluid flows from the emergency reservoir 3 to the auxiliary reservoir 2 to such an extent that, after the engineer's brake valve is moved from release position to running position and the brake pipe pressure on the cars at the front end of the train drops to or below that supplied by the feed valve device at the locomotive, the auxiliary reservoir pressure in valve chamber 27 will be less than the brake pipe pressure in piston chamber 22 and thus prevents unintentional movement of the triple valve parts from a release position to quick service or service position in releasing the brakes. In this connection, it will also be understood that the feed groove 197 is preferably made of small capacity, so that in either outer or inner release position the rate of charge from the brake pipe to the valve chamber 27 and the connected auxiliary reservoir is relatively low, being substantially the equivalent, in feeding capacity, of the restricted re-charge port in brake mechanisms heretofore in use. This low rate of flow through the feed groove of the triple valve device is of particular advantage in the present mechanism, which is primarily intended to make possible the operation of much longer trains than heretofore, since it tends to prevent overcharge of the brake mechanisms at the head end of the train and to facilitate the release and recharge of the brake mechanisms toward the rear end of the train.

With the triple valve parts in either the outer or inner release position, the cavity 201 in the main slide valve 25 connects the passage 139 to the passage 202, so that fluid under pressure is released from the brake cylinder by way of pipe and passage 178, passage 177, chamber 176 of the inshot valve device 10, passage 175, past the open inshot valve 167, inshot valve chamber 168, passages 169 and 139, cavity 201, passage 202 and retaining valve device 194. It will be observed that in either the outer or inner release position the passages and porting connecting the brake cylinder through the exhaust to the retainer are the same, that is, there is no difference in such passage and porting as between what would usually be called full release and retarded release. While a retarded release port may be employed (to come into play when the triple valve is in the inner or over-travel position) I prefer to employ what amounts to a controlled release action in all release operations. The danger of excessive shocks from running out of the slack is thus avoided, under all operating conditions of the train. The inner or over-travel position of the triple valve mechanism, however, is employed to effect a cutting off of brake pipe passage 196 by the main valve 25, instead of having said passage blanked by the auxiliary valve 26 (as in normal release position) so as to prevent the raising of the auxiliary valve from its seat under the influence of brake pipe pressure, especially during release at the head end of the train, where such pressure may momentarily substantially exceed the pressure in the valve chamber 27.

With the passage 139 thus connected to the atmosphere, fluid under pressure in the small chamber 182 and piston chamber 173 of the inshot valve device 10 is vented to the atmosphere by way of passage 183, cavity 203 in the emergency main slide valve 48 and passages 204 and 193.

When the brake cylinder pressure in diaphragm chamber 137 of the quick service modifying valve device 7 reduces slightly below the pressure of the spring 134, said spring acts to deflect the diaphragm 132 inwardly, which causes the modifying valve 142 to be unseated against the opposing pressure of the spring 144.

With the triple valve main slide valve 25 in the inner release position, one end of the port 209 is open through the groove 208 in the triple valve casing to the triple valve chamber 27 and permits fluid under pressure to flow from the valve chamber to the cavity 207. By this means a predetermined area of the seating face of the main slide valve 25 is unloaded so as to reduce the load imposed upon the valve by the connecting of the brake cylinder exhaust cavity 201 to the atmosphere by way of passage 202. Now when the pressures of fluid acting on opposite sides of the triple valve piston 23 become substantially equal, the spring 32 acts to promptly shift the triple valve piston and slide valves 25 and 26 to the outer release position.

In the outer release position of the triple valve slide valves, fluid under pressure may continue to flow, through the restricted port 198 in the main slide valve 25, from the emergency reservoir 3 to the triple valve chamber 27 and auxiliary reservoir 2, but after equalization of pressures in both reservoirs, fluid under pressure supplied through the feed groove 197 to valve chamber 27 flows to both reservoirs, thus finally charging both reservoirs to the brake pipe pressure carried.

In releasing the brakes, the flow area of the choke 53, interposed between the emergency piston chamber 45 and the passage 51, is so small that the initial high brake pipe pressure at the head end of the train creates sufficient differential on the emergency piston 46 to move the piston and emergency slide valves 48 and 49 to their extreme inner positions as shown in Fig. 2. This operation of the emergency valve device has no effect upon the release of the brakes after service applications and is in fact merely incidental.

The volume of the quick action chamber 52 and the connected emergency slide valve chamber 50 is not great, and even though the choke 53 is small there would be a possibility, on cars at the head end of the train, of said chambers being charged to a pressure greater than that normally carried in the brake pipe, in which case the emergency valve device would tend to operate to effect an undesired emergency application of the brakes when the brake pipe pressure reduces to normal upon movement of the brake valve to running position. In order to prevent the chambers from becoming overcharged in releasing the brakes, the emergency valve chamber 50 is connected to the emergency reservoir 3 through passage 71, past the check valves 72 and 73, through check valve chamber 74, passages 76 and 77 and passage and pipe 78. This prevents the pressure of fluid in said chamber from ever exceeding emergency reservoir pressure which at no time becomes higher than the brake pipe pressure normally carried.

When, in releasing the brakes, the brake pipe pressure on one side of the flexible diaphragm 102 of the release insuring valve device exceeds the auxiliary reservoir pressure in the diaphragm chamber 115 by a predetermined amount as fixed by the value of spring 117, say about one and one-half pounds, said diaphragm will flex inwardly, actuating the follower 125 and thereby the pins 126 to unseat the valve 121. The triple valve piston 23 and slide valves 25 and 26 are intended to move from application position to release position when the brake pipe pressure in the piston chamber 22 exceeds the auxiliary reservoir pressure in the valve chamber 27 by about one and one-quarter pounds, so that the main slide valve 24 will lap the passage 130 before the release insuring valve 121 is unseated. With the passage 130 lapped, fluid under pressure will not be released from the auxiliary reservoir. If, however, a greater pressure differential is required to move the triple valve piston to release position than is required to unseat the valve 121, the valve will be opened before the triple valve piston moves from application position to release position, and since in the application position of the main slide valve, the passage 130 is open through cavity 201 in the main slide valve, passage 202 and retaining valve device 194, fluid under pressure will now flow from the triple valve chamber 22 and connected auxiliary reservoir 2 to the atmosphere by way of passage 129, diaphragm chamber 115, past the open valve 121 and passage 130, the choke 131 retarding the flow of fluid through the passage 130.

On the cars toward the rear end of the train where the rate of increase in brake pipe pressure will be slow, the triple valve parts have a tendency to be delayed in their movement from application toward release position, and in some cases, may have a tendency to remain in application position. However, these objectionable tendencies will be eliminated, for where the rise in brake pipe pressure above the auxiliary reservoir pressure exceeds the desired amount, fluid under pressure will be vented from the auxiliary reservoir to the atmosphere with the valve 121 unseated until a sufficient fluid pressure differential is created on the triple valve piston 23 to cause it to move the main slide valve 25 toward release position and into lapping relation with the passage 130, where the further venting of fluid from the auxiliary reservoir is cut off. The advantage of this release ensuring valve device will be readily appreciated if it be kept in mind that the release of the brakes, especially at the rear end of long trains, has been one of the greatest difficulties in railroad operation up to the present time.

As the triple valve parts are being moved from service application position toward release position, and the main slide valve 25 reaches the position in which it is shown in Fig. 5, said valve laps the auxiliary reservoir release passage 130, closing off the further release of fluid from the auxiliary reservoir. At substantially the same time as the main slide valve laps the passage 130 it uncovers the brake cylinder passage 139 to the cavity 201, so that fluid under pressure is released from the brake cylinder to initiate the release of the brakes. Further, as the main slide valve is moved to this position and at substantially the same time as the passage 130 is lapped and the brake cylinder passage 139 is opened to the atmosphere, the tail cavities of the ports 199 and 212 are brought into full registration with the passages 196 and 213 respectively. After the passage 130 is lapped, a further but slight movement of the piston opens the feed groove 197 so that fluid under pressure supplied from the brake pipe to the triple valve piston chamber now flows through the feed groove to the triple valve chamber 27 and auxiliary reservoir 2.

As the triple valve parts continue to move toward release position, the port 198 in the main slide valve, which has been previously uncovered by the auxiliary slide valve, is brought into registration with the passage 77, so that fluid under pressure flows from the emergency reservoir to the valve chamber 27 and auxiliary reservoir 2 as before described.

If, in releasing the brakes, the triple valve parts should, for any reason, come to a stop in the position in which they are shown in Fig. 5, the release of the brakes will be insured, due to the partial opening of the release passage 139, and due to the full registration of the quick service ports 199 and 212 with the quick service passages 196 and 213, respectively, the full initial quick service venting of fluid under pressure from the brake pipe will be insured, upon again effecting an application of the brakes.

On the cars at the rear end of the train the triple valve parts will be brought to a stop in the outer release position by the action of the stop member 31, the rate of flow of fluid through the feed groove 197 being fast enough to prevent the pressure of fluid, which is being supplied to the piston chamber at a slow rate, from creating a sufficient pressure differential on the triple valve piston 23, to cause the piston to compress the spring 32.

The slow rate of increase in brake pipe pressure on the cars at the rear end of the train has no operative effect upon the emergency piston 46, which is returned to release position after the quick action chamber pressure in valve chamber 50 is reduced to slightly below brake pipe pressure in effecting a service application of the brakes, for the reason that said quick action chamber and valve chamber charge through the choke 53 at substantially the same rate as the brake pipe pressure increases in the piston chamber 45.

*Summary of the operation of the release insuring valve device*

From the above description of the operation of the release insuring valve device 6, it will be seen that the main slide valve 25 of the triple valve device is adapted to control the opening and closing of the communication through which fluid under pressure is adapted to be discharged from the triple valve chamber 27 and connected auxiliary reservoir to the atmosphere, when the release insuring valve is open in releasing the brakes. Due to this control by the main slide valve, fluid under pressure is released from the chamber 27 and auxiliary reservoir only on the car or cars of the train where the pressure differential required to move the triple valve piston to release position exceeds the pressure differential required to flex the diaphragm 102 of the release insuring valve device to unseat the release valve 121. It will be understood that on the cars where the triple valve parts do not move promptly toward release position, the degree of reduction in the valve chamber 27 and auxiliary reservoir will vary according to the promptness with which the main slide valve 25 is moved into lapping relation with the passage 130 as shown in Fig. 5. It will be seen that by controlling the release of fluid under pressure from the chamber 27 and auxiliary reservoir 2 by means of the main slide valve 25, there will be no release of fluid from the chamber and reservoir if the triple valve moves on the normal differential, and on other cars the amount of fluid released will be limited to that required to secure the movement of the triple valve device to a release position. This, of course, results in a material saving of fluid pressure which, for obvious reasons, is very important and desirable.

*Emergency application*

To effect an emergency application of the brakes, fluid under pressure is suddenly vented from the brake pipe 4 and from the connected triple valve piston chamber 22 and emergency valve piston chamber 45 and upon said reduction the triple valve device operates, in the same manner as in effecting a service application of the brakes, to supply fluid under pressure from the auxiliary reservoir 2 through the slide valve chamber 27 and service port 210 to passage 139 which is open to the brake cylinder 14.

At substantially the same time as the triple valve device operates upon an emergency reduction in brake pipe pressure, fluid in the emergency valve chamber 50, acting on the inner face of the emergency piston 46 causes the piston to move and first shift the auxiliary slide valve 49 relative to the main slide valve 48 and then shift both slide valves in unison to emergency position, in which position, the piston engages the gasket 44. As the piston is thus moved, it closes the communication through the choke 53 from the emergency piston chamber 45 to the passage 51, after which the auxiliary slide valve 49 uncovers a port 230 in the main slide valve 48, which port, at the seat of the main slide valve is in open communication by way of passage 236 and cavity 235 with the passage 150, so that fluid under pressure now flows through the port and passage from the emergency valve chamber 50 and connected quick action chamber 52 to the quick action piston chamber 149.

After the port 230 has been uncovered, the collar 59 on the emergency piston stem 47 engages the rear end surface 60 of the main slide valve 48, so that the piston as it continues to move, shifts the main slide valve to emergency position. At the time the collar 59 engages the main slide valve, the spring 63 will have been compressed, the compression of the spring being started just prior to the auxiliary slide valve 49 opening the port 230.

Now as the main slide valve is moved toward emergency position, the end of the valve moves beyond the passage 150, so that fluid flows directly from the valve chamber 50 to the passage. It will here be noted that as the cavity 235 is being moved out of registration with the passage 150, the end of the main slide valve is uncovering the passage 150, so that there will be no interruption in the flow of fluid to the quick action piston chamber.

The pressure of fluid thus supplied to the quick action piston chamber 149 causes the quick action piston to move inwardly against the opposing pressure of the spring 161, into sealing engagement with the annular seat rib 231 of a gasket 232 mounted in the casing, in which position the piston will have closed the leakage groove 165. The piston 148 as it is thus moved, shifts the vent valve 155 out of sealing engagement with the seat rib 160, thereby opening the brake pipe passage 157 to the atmosphere by way of passages 164 and 153. With this communication established, fluid under pressure is suddenly vented from the brake pipe for the purpose of serially transmitting emergency action through the train in the usual well known manner.

If for any reason, the emergency piston 46 does not move the main slide valve 48 from release position in effecting an emergency application of the brakes, fluid under pressure supplied by way of the port 230 to the quick action piston chamber 149 will cause the quick action piston to operate to unseat the quick action vent valve 155, thus insuring an emergency application even though the main slide valve 48 is not moved from release position.

With the quick action piston in sealing engagement with the rib 231 of the gasket 232, fluid under pressure is gradually vented from the emergency slide valve chamber 50 and quick action chamber 52 to the atmosphere by way of the choke 166 in the quick action piston 148. When the quick action chamber pressure has been reduced to a predetermined degree by the flow of fluid through the choke 166, the spring 161 acts to close quick action valve 155 and also acts through the medium of the stem 154 to return the piston 148 to its extreme outer position in which it is shown in Fig. 1 of the drawings. The rate at which the quick action chamber pressure reduces through the choke 166 is slow enough to insure the quick action valve 155 remaining open until substantially the complete venting of fluid under pressure from the brake pipe has been accomplished.

The timing of the venting operation, as effected by the gradual exhaustion of the quick action chamber is such that the choke 166 through the quick action piston 148 must be made quite small. It is, therefore, apparent that if fluid should leak past the periphery of the piston to the atmosphere, the vent valve would be permitted to close prematurely. The seal between the piston and the gasket 232 prevents such leakage and thus ensures the vent valve remaining open for a definite predetermined period of time as governed entirely by the volume of the quick action chamber and emergency valve chamber and the rate of flow of fluid from said chambers through the choke.

The flow area of the choke 166 is so small that possible leakage from the emergency valve chamber 50 past the main slide valve 48 or auxiliary slide valve 49 might exceed the rate at which said leakage could flow to the atmosphere through the choke and cause the quick action piston to move and unintentionally unseat the vent valve. In order to prevent this from occurring, I provide the leakage groove 165 which, together with the choke 166, will permit fluid that may leak into the piston chamber 149, to flow to the atmosphere at a fairly fast rate, so as to prevent the development of a fluid pressure sufficient to cause the piston to operate to open the vent valve.

With the emergency slide valve 48 in emergency position, the cavity 203 in the valve connects the passage 77 to the passage 204, so that fluid under pressure now flows from the emergency reservoir to the passage 139 through which fluid under pressure is being supplied from the auxiliary reservoir by the triple valve device. Fluid under pressure thus supplied from the auxiliary reservoir 2 and emergency reservoir 3 to the passage 139 flows through passage 169 to the inshot valve chamber 168 and from thence flows past the open inshot valve 167, and in parallel, through the choke 179, to the brake cylinder by way of chamber 176, passage 177 and passage and pipe 178 and rapidly increases the brake cylinder pressure. From the passage 177 fluid under pressure flows through branch passage 180 to the inner seated area of the piston 170.

It will here be noted that the passage 183 leading from the small reservoir 182 to the seat of the emergency slide valve 48 is lapped by said valve, and since the passage 183 had been open to the atmosphere by way of the cavity 203 and vented passages 204 and 193 in the release position of the emergency valve device and triple valve device, the reservoir 182 and connected quick action piston chamber 148 are at substantially atmospheric pressure when an emergency application of the brakes is initiated in the manner before described. As a result, the inshot valve piston 170 is held in the position in which it is shown in Fig. 1 by the force of the spring 172.

If, in effecting an emergency application of the brakes, fluid under pressure should leak past the gasket 205 from the inner seated area of the piston 170 to the outer seated area, it will be permitted to flow through the leakage groove 206 to the other side of the piston. Due to this, fluid which may leak past the gasket 205 will have no tendency to cause the piston to move from its inner or normal position prematurely.

Now when the pressure of fluid being supplied to the brake cylinder 14 through passages 177 and 178 and acting on the inner seated area of the inshot valve piston 170, becomes great enough to overcome the opposing force of the spring 172, said valve piston starts moving outwardly. Upon the breakage of the seal between the gasket 205 and the casing, the entire rear face of the valve piston is subjected to fluid under pressure being supplied to the brake cylinder, and the valve piston is thereby rapidly moved outwardly against the opposing pressure of the spring 173 into sealing engagement with a gasket 233 interposed between the emergency valve casing 43 and the cap 54.

As the inshot valve piston is thus being moved, the spring 174 acts to seat the inshot valve 167 on a seat rib 234 as shown in Fig. 6 of the drawings, thereby closing off the rapid flow of fluid to the brake cylinder by way of the passage 175 of the inshot valve device. With the valve 167 thus seated, fluid under pressure continues to flow from the inshot valve chamber 168 to the brake cylinder by way of the choke 179, chamber 176, passage 177 and passage and pipe 178, the choke 179 forming a by-pass communication around the valve 167.

The pressure of fluid in passage 193 acts on the inner seated area of the timing valve 185 and the portion of the diaphragm and valve exposed to the pressure in chamber 186 is subjected to the pressure of fluid supplied through the choke 187 from passage 178, so that one side of the flexible diaphragm 184 is subjected to fluid at brake cylinder pressure and the pressure of fluid in chamber 186. The other side of this diaphragm is subjected to the reducing quick action chamber pressure in the emergency valve chamber 50. When the increasing pressure on the first mentioned side of the flexible diaphragm becomes sufficient to overcome the pressure of fluid in chamber 188 and acting on the other side of the diaphragm, said diaphragm is flexed outwardly, permitting fluid under pressure acting on the inner seated area of the valve to move the valve from the seat rib 192. The pressure of fluid acting on the inner seated area of the valve is greater than the fluid pressure in diaphragm chamber 186 due to the restriction offered to the flow of fluid by the choke 187, so that upon breaking the seal between the valve 185 and the seat rib 192, the whole surface of the flexing portion of the diaphragm is subjected to the higher pressure from passage 193, which results in the diaphragm being quickly flexed outwardly as shown in Fig. 7 of the drawings, permitting fluid under pressure from passage 193 to unseat the valve 185 with a snap-like action. With the valve unseated, fluid under pressure now flows from the passage 193, past the unseated valve 185 and through the choke 187 and passage and pipe 178 to the brake cylinder, since fluid under pressure continues to flow through the choke 179 in the inshot valve device to the brake cylinder this third stage of increase in brake cylinder pressure will be at a fairly fast rate. The brake cylinder pressure continues to build up to equalization with the pressure in said reservoirs.

Upon the substantially complete venting of fluid at quick action chamber pressure from the emergency valve chamber 50, the pressure of the compressed spring 63, acting through the medium of the emergency piston stem 47, causes the emergency piston 46 and thereby the auxiliary slide valve 49 to move relative to the main slide valve 48, but upon the engagement of the end of the plunger 62 and the piston stem, the spring 63 will no longer act to retract the piston and auxiliary slide valve and as a result of this, the rearward movement of the piston and slide valve ceases before the piston engages the front end surface of the main slide valve. As a consequence, the main slide valve 48 remains in emergency position and maintains the communication open from the emergency reservoir 3 to the brake cylinder 14 through pipe and passage 178, cavity 203 in the main slide valve 48, passages 204 and 193 and chokes 187 and 179. The communication from the auxiliary reservoir 2 to the brake cylinder 14 through the triple valve device is also maintained in emergency, so that if there is leakage from the brake cylinder, the volume of said reservoirs connected with the brake cylinder reduces the effect of such leakage and tends to maintain an effective brake cylinder pressure.

*Loading of the emergency main slide valve*

With fluid under pressure completely vented from the emergency valve chamber 50 in effecting an emergency application of the brakes, fluid under pressure in chamber 70 acts through the medium of the flexible diaphragm 68 and rocking pin 69 to impose a downward pressure on the main valve 48, which is adapted to prevent fluid under pressure in cavity 203 from raising the slide valve from its seat. The main slide valve 48 has formed therein, adjacent one of its side edges, a longitudinally extending cavity 235, which is connected through a transversely extending passage 236 to the port 230 and adjacent its other side edge has formed therein a longitudinally extending cavity 237, which is connected through a transversely extending passage 238 to the port 221. In the release position, the cavity 235 is open to the atmosphere by way of passage 158, quick action piston chamber 149, leakage groove 165 around the quick action piston 148 and choke 166 in said piston, and the cavity 237 is open to the atmosphere by way of passage 222. In the emergency position of the main slide valve 48 the cavities 235 and 237 are open to the emergency valve chamber 50 by way of grooves 239 and 240, respectively, formed in the casing 43 at the seat of the main slide valve. As shown in Figs. 9 and 10 of the drawings, the cavities 235 and 237 are open throughout their length to the slide valve seat and are arranged one at each side of the cavity 203, so that fluid under pressure which may leak from the cavity 203 will flow to the cavities 235 and 237 and from thence to the emergency piston chamber 50 from which fluid under pressure is being vented through the choke 166 in the quick action piston 148. By thus connecting the cavities 235 and 237 to the valve chamber 50, fluid under pressure, which may leak from the cavity 203, will not be permitted to build up a pressure in these cavities, so that the main slide valve will be held to its seat by the loading force exerted through the medium of the rocking pin 69.

*Summary as to the feature involving brake cylinder pressure build-up in emergency*

From the above description of the functioning of the equipment in effecting an emergency application of the brakes, it will be understood that, although the supply of fluid under pressure to the brake cylinder is continuous from the time the application is initiated until the full brake cylinder pressure is developed, the increase in brake cylinder pressure is in three distinct stages. First there is an initial quick inshot of fluid under pressure to the brake cylinder which is limited upon the seating of the inshot valve 167, then there is a slow increase in brake cylinder pressure through the choke 179 and finally there is a rapid increase in brake cylinder pressure through the choke 179 and past the unseated timing valve 185 and through choke 187. The initial inshot is such as to insure a predetermined light brake cylinder pressure being developed, say for instance about fifteen pounds, to set up a slight retardation on the cars to cause the slack in the train to start to gather gently. The following slow flow of fluid through the choke 179 may only increase the brake cylinder pressure by about six pounds, but is of such duration as to permit the train slack on an empty train to sufficiently gather as to prevent harsh shocks, after which the timing valve device 11 functions to increase the rate at which fluid flows to the brake cylinder. This final rapid flow of fluid to the brake cylinder is for the purpose of bringing the train to a stop promptly after the slack has gathered as just described.

On a loaded train the slack gathering period is of greater duration than on an empty train and due to this, the passage through the choke 187 is made of such a size as to so control the rate of increase in brake cylinder pressure that the gentle gathering of the train slack is insured after the timing valve opens.

If the brake pipe and brake equipment on a train were leak proof, the brake controlling devices throughout the length of the train would operate, in effecting an emergency application of the brakes, in the manner hereinbefore described, and the increase in brake cylinder pressure in three stages would be effected serially from the head end of the train toward the rear end of the train, so that the interval of time which would elapse between the operation of the equipment on the first and last car of the train would be equal to that required to transmit quick serial venting of the brake pipe from the head end of the train to the rear end. This operation would not be the most desirable, since it is better to obtain a more nearly synchronous increase in brake cylinder pressure on the cars at the head and rear of the train, so as to reduce to a minimum, the undesirable and often disastrous running in of the cars at the rear end of the train against those at the head end of the train, and my equipment has been designed for attaining this result in the following manner.

It is well known that the brake pipe on a train of cars is subject to leakage and if the brake pipe leakage on a train of say 150 cars does not exceed, for instance, seven pounds per minute, the brake pipe may be considered in operable condition. Since fluid under pressure is normally supplied to the brake pipe at only one end of the train, as at the locomotive, the brake pipe pressure at the head end of the train will be substantially equal to that supplied by the usual feed valve device. Due to leakage from the brake pipe on the train, however, the brake pipe pressure will drop, and at the rear of the train may be about 15 pounds lower than at the head end of the train. In other words, if the normal pressure supplied by the feed valve device is seventy pounds and there is a leakage of seven pounds per minute from the brake pipe, the brake pipe pressure at the head end of the train will remain seventy pounds, but at the rear end of the train, the brake pipe pressure will be about fifty-five pounds, and this difference in brake pipe pressure produces what is commonly called a "brake pipe gradient" through the train.

If the brake pipe pressure at the rear end of the train is increased to only fifty-five pounds, the brake equipments including the reservoirs and chambers will also be charged with fluid at substantially the same pressure. It is, therefore, obvious that the pressure of fluid in the timing valve diaphragm chamber 188 will also be substantially fifty-five pounds.

If an emergency application of the brakes is now effected under the above conditions, there will be an initial inshot of fluid under pressure to the brake cylinder by way of the open inshot valve 167 in the same manner as hereinbefore described. The amount of this inshot will be substantially the same at both the head and rear ends of the train due to its being governed by the pressure of the spring 173 acting on one side of the inshot valve piston 170, but the start of this inshot on the last car of the train will be possibly eight seconds after it is started on the first car of the train, eight seconds being the time required to transmit the quick venting of fluid from the brake pipe throughout a train of 150 cars. After the inshot valve 167 closes, the flow of fluid to the brake cylinder through the choke 179 will be slightly slower on the rear car of the train than will be the case on the head car of the train. At the head end of the train, when the brake cylinder pressure has been increased at the slow rate by flow through the choke 179 (which requires about fifteen seconds) to a point such that the brake cylinder pressure acting on one side of the timing valve diaphragm 184 will overpower the reducing quick action chamber pressure in chamber 188, the diaphragm 184 will be flexed outwardly. As the diaphragm is thus flexed, the fluid under pressure from the passage 193 maintains the timing valve 185 open, so that the final rapid flow of fluid to the brake cylinder is through the chokes 179 and 187 as hereinbefore described. At the head end of the train the quick action chamber pressure starts reducing from seventy pounds upon movement of the emergency valve device to emergency position, but at the rear end of the train the quick action chamber pressure starts reducing from about fifty-five pounds. At the rear of the train the initial inshot and slow increase of brake cylinder pressure are at substantially the same rate as at the head end of the train but occur about eight seconds later. However, since the quick action chamber pressure is lower on the cars at the rear end of the train, less brake cylinder pressure has to build up on the timing valve diaphragm 184 to cause it to flex to its outer or valve open position than is required on the cars at the head end of the train. Due to this, a shorter period of time elapses between the closing off of the initial inshot of fluid to the brake cylinder and the starting of the final rapid flow to the brake cylinder on the cars at the rear end of the train than on the cars at the head end of the train, with the result that final rapid increase in brake cylinder pressure, on the cars at the head and rear ends of the train, which produces the braking power for bringing the train to a stop, will be more nearly in synchronism.

If the brake pipe leakage is greater than fifteen pounds per minute, the period of time elapsing between the initial inshot of fluid to the brake cylinder and the final rapid flow to the brake cylinder is further shortened, with the result that the final increase in brake cylinder pressure on the cars at the rear end of the train may slightly precede that on the cars at the head of the train.

It will be observed from an inspection of Fig. 1 of the drawings that when the several parts of the equipment are in brake releasing position, the valve piston chamber 173 of the inshot valve mechanism 10 is open to the atmosphere by way of passage 181, chamber 182, passage 183, cavity 203 in the main slide valve of the emergency valve device, passages 204, 193 and 139, cavity 201 in the main slide valve of the triple valve device and passage and pipe 202, and that when, with the several parts of the equipment in release position, an emergency reduction in brake pipe pressure is initiated, the emergency slide valve in its movement to emergency position laps passage 183, so that the reservoir 182 and connected valve piston chamber 173 are at atmospheric pressure. With the chambers 182 and 173 at atmospheric pressure, the valve piston 170 is moved to its outer position when the brake cylinder pressure, acting on one side thereof, exceeds the pressure of the spring acting on the other side, as hereinbefore described.

If, however, an emergency application of the brakes is initiated on top of a service application of the brakes, fluid at brake cylinder pressure which has been supplied to chambers 182 and 173 with the several parts of the equipment in service position as shown in Fig. 3, is bottled up in these chambers when the emergency slide valve 48 moves to emergency position, so that brake cylinder pressure acting on the valve piston 170 within the rib of the gasket 205 must be increased to a correspondingly higher degree before the valve piston will be shifted to permit the inshot valve 167 to be closed. It will be noted that since, in effecting a service application of the brakes, the fluid pressures acting on opposite sides of the valve piston are substantially equal, the same degree of increase in brake cylinder pressure is required to move the valve piston to its outer position as is required when the several parts of the equipment are moved from release position to emergency position, so that the relative degree of inshot is substantially the same in effecting an emergency application on top of a service application as in effecting a straight away emergency application.

The chamber 182 is constantly open through passage 181 to the valve piston chamber 173 and is provided for, in effect, increasing the volume of chamber 173, so that any leakage of fluid past the gasket 205 and into chamber 173 cannot increase the pressure in said chamber to materially affect the operation of the valve piston 170 in its movement to permit the valve 167 to seat.

*Release of the brakes after an emergency application*

To effect a release of the brakes after an emergency application, fluid under pressure is supplied to the brake pipe 4 and flows to the triple valve piston chamber 22 and to the emergency piston chamber 45. Fluid in the valve chamber 27 of the triple valve device is at reduced auxiliary reservoir pressure and fluid in the valve chamber 50 of the emergency valve device is at atmospheric pressure, so that upon a slight increase in brake pipe pressure, the emergency piston will move to either the outer or inner release position before the triple valve piston is caused to move toward a release position. As before described, the rate of flow of fluid through the choke 53, forming the communication from the emergency piston chamber 45, to the passage 51, is inadequate to offset the rate at which the pressure of fluid in the piston chamber 45 is increased on the cars at the head end of the train, so that the emergency piston 46 is moved upon a slight increase in brake pipe pressure, say for instance seven pounds, to its inner or back dump position. The movement of the piston from its normal position to back dump position being opposed by the spring 57 acting through the medium of the movable stop 56 and the piston stem 47.

With the several parts of the emergency valve device in back dump position as shown in Fig. 2 of the drawings, the cavity 203 connects the passages 204, 183 and 241 together. Since the passage 204 is connected to the passage 193 which is in communication with the brake cylinder by way of pipe and passage 178, restriction 167 and past the unseated timing valve 185, fluid under pressure flows from the brake cylinder to the slide valve cavity 203 and from thence flows to the brake pipe by way of passage 241, past the ball check valve 242 through passages 244 and 113, strainer chamber 85 in the pipe bracket 15, passage 100, chamber 99 of the cut-out cock and dirt collector 5, passage 98, past the open valve 97, through passage 96 and pipe 95. From the cavity 203 fluid under pressure flows through passage 183, small volume reservoir 182 and passage 181 to the piston chamber 173 of the inshot valve device. When the pressure of fluid in chamber 173, together with the force of the spring acting on one side of the piston 170 slightly exceeds brake cylinder pressure and the pressure of the spring 174 acting on the opposite side, the spring acts through the medium of the piston and stem 171 to unseat the valve 167 so that fluid under pressure also flows from the brake cylinder passage 178 to the cavity 203 and consequently to the brake pipe by way of passage 177, chamber 176 of the inshot valve device, past the valve 167, valve chamber 168, and passages 169, 193 and 204. Passage 193 is also supplied with fluid under pressure from the auxiliary reservoir 2 through the triple valve device which is still in application position, and as a result of this there is a rapid flow of fluid under pressure from the auxiliary reservoir 2 to the brake pipe which accelerates the rate of recharge of the brake pipe. This action naturally occurs first at the head end of the train when the increase in brake pipe pressure is first effective, and the sudden increase in brake pipe pressure on one car causes the emergency valve device on the next car to function in the same manner, so that this back dump operation is rapidly transmitted serially from car to car throughout the length of the train. Further, this back dump action effects several desirable results; first, it serves to save fluid under pressure which would be otherwise lost; second, it suddenly increases the brake pipe pressure from zero to about forty pounds, and thus hastens the charging of the equipment on the train after an emergency application of the brakes; and further, by reducing auxiliary reservoir pressure to a low degree substantially to equalization with the brake pipe, it ensures movement of the triple valve device to effect a release of the brakes on the cars at the rear end of the train.

It will be understood that in effecting an emergency application of the brakes, if the normal brake pipe pressure is seventy pounds, the pressures of fluid in the auxiliary and emergency reservoirs equalize into the brake cylinder at approximately sixty pounds. If, in effecting the release of the brakes after an emergency application, the auxiliary reservoir pressure were not reduced as is done in the present equipment, the brake pipe pressure would have to be increased about sixty pounds in order to obtain a differential on the triple valve piston 23 for causing it, and thereby the slide valves 25 and 26, to move to release position. On the cars at the rear end of the train, the rate at which brake pipe pressure increases by the supply of fluid under pressure through the brake valve device is relatively slow and as it increases and approaches the pressure of the supply, the rate of increase reduces. It is thus obvious that the rate of increase at sixty pounds brake pipe pressure is slower than it is at say forty pounds, and at sixty pounds it would be more difficult to obtain the releasing differential on the triple valve piston 23, particularly against possible leakage past said piston, than it is with the present equipment where the auxiliary reservoir pressure in the triple valve chamber 27 is reduced.

After the brake pipe pressure is suddenly increased by the supply of fluid under pressure from the brake cylinder 14 and auxiliary reservoir 2, and the auxiliary reservoir pressure is reduced in the manner hereinbefore described, the charging of the brake pipe is continued in the usual manner. On the cars at the front end of the train, the supply of fluid under pressure to the brake pipe, through the medium of the brake valve device with the brake valve device in release position, moves the triple valve piston 23 and slide valves 25 and 26 to the inner release position, in which the release of fluid under pressure still remaining in the brake cylinder is released to the atmosphere in the same manner as before described in connection with the release of the brakes after a service application. On the cars at the rear end of the train, the triple valve piston 23 and slide valves 25 and 26 move inwardly to the outer release position, in which fluid is released from the brake cylinder in the same manner as described before in connection with the release of the brakes after a service application. With the triple valve parts in either the inner or outer release position, fluid at the reduced pressure in the emergency reservoir 3 flows back and equalizes into the auxiliary reservoir 2, after which both reservoirs are fully charged with fluid under pressure supplied from the brake pipe through the feed groove 197 extending around the triple valve piston 23. It is thus evident that the auxiliary reservoir, in charging, receives part of its supply initially from the emergency reservoir, which tends to avoid the robbing of brake pipe air by the flow of fluid from the brake pipe to the auxiliary reservoirs at the head end of the train, during releasing operation, and thus tends to assist the quick build-up of brake pipe pressure toward the rear of the train, which is also assisted by the back-dump of auxiliary reservoir and brake cylinder air into the brake pipe, whereby release of the brakes at the rear of the train is a practical certainty, especially as facilitated by the sensitive operation of the release ensuring valve which operates after an emergency application of the brakes as well as after a service application of the brakes and which is actuable by relatively small differential of brake pipe pressure over auxiliary reservoir pressure.

Upon moving the brake valve from release to running position, the triple valve parts, which are in the inner release position, are caused to move to the outer release position in the same manner as hereinbefore described in connection with the release of the brakes after a service application. The emergency valve devices on the cars at the head end of the train are initially moved to their back dump positions as before described, but after the quick action chamber 52 and emergency slide valve chamber 50 become charged with fluid under pressure, supplied from the brake pipe through choke 53, to within possibly three pounds of the brake pipe pressure in emergency piston chamber 45, the spring 57, acting through the medium of the stop member 56 and piston stem 47, moves the emergency valve parts to their normal release position, in which they are shown in Fig. 1. In this position, the emergency valve chamber 50 and quick action chamber 52 are charged, through choke 53, up to brake pipe pressure. When the emergency valve parts are in back dump position and the brake pipe pressure becomes higher than brake cylinder and auxiliary reservoir pressures, the check valve 242 prevents back flow of fluid from the brake pipe to the auxiliary reservoir.

The release of the brakes and recharging of the auxiliary and emergency reservoirs on the cars at the rear end of the train after an emergency application of the brakes is substantially the same as in releasing after a service application, except that the emergency valve devices are initially moved to the back dump position and are then returned to the normal or outer release position as before described. The triple valve devices on cars at the rear of the train are, however, not moved from application position to release position upon the sudden increase in brake pipe pressure effected through the operation of the emergency valve device. As before described, the brake pipe pressure is increased to about forty pounds, but this pressure may be less than that remaining in the auxiliary reservoir by an amount equal to the pressure exerted on the ball check valve 242 by the action of the spring 244. As a result, the brake pipe pressure has to be increased, by flow of fluid through the usual brake valve device, above that obtained in the brake pipe by the sudden back dump in order to obtain sufficient differential on the triple valve piston 23 to move it to release position. If the spring were not used and substantial equalization of pressures should occur in the brake pipe and auxiliary reservoir, then the pressure surges created in the fluid in the brake pipe by the sudden back dump of fluid under pressure from the auxiliary reservoir and brake cylinder into the brake pipe might cause the triple valve piston to shift the slide valves 25 and 26 back and forth between service and release positions, causing the alternate partial release and partial application of the brakes with a consequent drain and loss of fluid under pressure from the brake pipe, auxiliary reservoir and emergency reservoir. Besides the loss of fluid under pressure due to this undesirable action, the quick service action would be effective every time the triple valve parts are moved from release toward service position and in addition to this quick service action effecting an undesirable loss of fluid under pressure from the brake pipe, it would create additional surges in the brake pipe, which would, of course, aggravate the turbulent and therefore unstable brake pipe condition. It has been found that in some cases the triple valve device is not unstable and does not operate in the undesired manner as just described when the spring 244 is not used, but realizing the possibility of this unstable condition, the spring 244 is employed to prevent such undesirable action.

It will here be understood that, in releasing the brakes after an emergency application, the release insuring valve device functions in substantially the same manner to facilitate the release of the brakes as before described in connection with the release of the brakes after a service application. It has however, the added advantage of the back dump of air into the brake pipe to hasten the build-up of brake pipe pressure to a certain degree (for instance, about forty pounds) whereupon a few pounds additional pressure in the brake pipe brings the pressure of the latter promptly to a point where the release ensuring valve operates to bleed down auxiliary reservoir pressure.

*Control of brakes on a descending grade*

Preparatory to descending a grade, the retaining valve device 194 is set by turning the handle

250 thereof upwardly from the position in which it is shown in the drawings, to retain a predetermined pressure, for example ten pounds, in the brake cylinder when recharging the brakes after the initial application.

In controlling the train on a descending grade it is customary to cycle the brakes, i. e., effect an application of the brakes and then recharge the equipment while a partial release of the brakes is taking place through the retaining valve device which has been set, as just described, to retain a predetermined pressure in the brake cylinder, and alternately applying and releasing the brakes as often as is deemed necessary.

After the retaining valve device has been set to retain a predetermined pressure in the brake cylinder, the initial application of the brakes will be effected in substantially the same manner as before described.

In recharging the equipment after this initial application of the brakes has been effected, the various parts, with the exception of the quick service modifying valve device 7, will function in substantially the same manner as they do in effecting the release of the brakes after a service application. It will here be noted that since the retaining valve device functions to close off the release of fluid under pressure from the brake cylinder when the brake cylinder pressure has been reduced to about ten pounds, the quick service modifying valve 142 will be maintained closed, so that upon a succeeding application of the brakes, the third stage of the local quick service venting of fluid from the brake pipe to the brake cylinder will not take place.

When it is desired to completely release the brakes, the retaining valve handle is turned down to the position in which it is shown in the drawings, after which the release of the brakes and the full recharge of the equipment may be effected in the same manner as in releasing after a service application.

The functioning of my improved equipment when operating with the retainer valves set to retain any given predetermined pressure in the brake cylinders, as above described; as well as the functioning of my equipment on initial and succeeding brake pipe reductions for effecting a normal service application of the brakes (without the retainer valves being set up); and the operation of my equipment as compared with the operation of a standard K-triple valve equipment, will be very clear from inspection of Figure 12. Before discussing the graph of Figure 12, however, a few preliminary comments should be made, as follows:

In a normal brake equipment, the proportioning of the various parts, reservoirs, cylinders and other volumes, is such that for every pound of reduction in brake pipe pressure in a service application of the brakes, the brake cylinder pressure will be increased three and one-quarter pounds. However, since the initial brake pipe reduction of a brake application normally commences with the brake cylinder empty and the cylinder piston in full release position, the first effect of the initial brake pipe reduction must be to fill up the volume of the brake cylinder from absolute zero pressure as the piston is moved outwardly until the brake shoes come up against the wheels. With the normal piston travel of eight inches, this initial operation is the equivalent of bringing the brake cylinder pressure from absolute zero pressure up to atmospheric, or zero pounds brake cylinder pressure. In other words, to move the piston in the brake cylinder out to the full extent of its normal travel requires a volume of air equivalent to that volume which would produce fifteen pounds brake cylinder pressure if commenced with the piston already moved out and the cylinder filled with air at atmospheric pressure; and thus, at a ratio of three and one-quarter to one it will be seen from the graph that the first 4.6 pounds of brake pipe reduction result simply in filling the brake cylinder.

In addition to the foregoing, since the resistance of the piston spring must be overcome, as well as the friction of the piston itself, and the weight and friction of various parts of the foundation brake rigging, an actual cylinder pressure of approximately four pounds above atmospheric pressure is normally just about enough to bring the shoes against the wheels, with substantially no appreciable retarding or braking action.

Referring first to the operation of the ordinary standard K-triple valve, as shown on the graph of Fig. 12, disregarding any possible theoretical minimum, it will be seen that, in actual practice, especially in long trains and with the average run of triple valves (some in perfect condition and some not in perfect condition) the minimum initial or original brake pipe reduction, including the normal quick service action, will actually be in the vicinity of six pounds and the brake cylinder pressure will be approximately four pounds. Succeeding brake pipe reductions, intended to build up the brake cylinder pressure or increase the brake application by degrees, each result, therefore, in an increase in cylinder pressure amounting to approximately nineteen pounds. If, in grade operation, the retainer valves be set up, and the retainer pressure setting is ten pounds, as suggested in the graph, and a succeeding brake pipe reduction or a recharge and reapplication be effected (with the K-triple valve which is the present standard brake), then the brake cylinder pressure will go up to approximately twenty-nine pounds, since the minimum feasible brake pipe reduction in the actual operation of the K-triple valve is around six pounds. Figured in percentage of additional service braking force available above the retained cylinder pressure, any brake pipe reduction effected on top of retained cylinder pressure of ten pounds, with the K-triple valve, utilizes substantially fifty per cent of such additional braking power available. Excessive braking pressures thus commonly result when descending a grade; to compensate for which it is frequently the practice to set up the retainer valves on only a percentage, say forty or fifty per cent, of the cars of the train, the result of which is that those cars which have the retainer valve set up are performing almost all of the braking work. As previously mentioned in this specification, lack of flexibility in service operation of the brakes is one of the disadvantageous results of the normal practical operation of the present standard equipment, and it will now be apparent that the results of grade operation, as just now described, sometimes involve buckling of the train, hot brake shoes, damaged wheels or even wrecks.

With my improved equipment, the quick service venting mechanism results first in rapid propagation of quick serial action throughout the length of the train even prior to movement of the triple valve main slide valve, second, in a certain and prompt movement of the main slide valve to application position on every car; and third, in the continued venting of brake pipe air locally until fluid has been delivered to the cylinder long enough to build up a cylinder pressure of a predetermined amount (for example nine pounds as shown in the graph) which will positively take place on every car, regardless of variations in piston travel and other mechanical irregularities, and also regardless of the brevity of duration of the initial brake pipe reduction as effected by the engineer. Thus, once the engineer initiates a service brake pipe reduction, the local reduction as to each car automatically continues until the brake cylinder pressure on that car has reached the predetermined quantity. It will be understood, of course, that if desired the engineer, on an initial brake pipe reduction of any brake application, may continue the brake pipe reduction through the engineer's valve sufficiently to build up the initial cylinder pressure beyond the predetermined limit referred to, but the normal operation is for the engineer to initiate the application by the usual minimum brake pipe reduction, whereupon the brake controlling mechanisms on the individual cars automatically carry on the reduction until the said predetermined brake cylinder pressure is attained; and the setting of the quick service modifying mechanism 7 of my improved equipment is preferably made such that the predetermined minimum original brake cylinder pressure will be in the neighborhood of nine or ten pounds, which is about the maximum tolerable cylinder pressure without producing undesired shocks while still ensuring the gathering of the slack.

If the degree or extent of local brake pipe venting effected by my improved equipment on an initial brake pipe reduction were to be similarly carried on during succeeding reductions of the same application, or during an application on top of a retained cylinder pressure of ten pounds (as shown in the graph) the result would be an increase of twenty-four pounds in cylinder pressure. This undesirable possibility is obviated by the quick service modification feature of the present invention, which prevents the third stage of local quick service venting after a cylinder pressure of nine pounds or more is attained. Thus, on top of a retained cylinder pressure of ten pounds, it is possible with my equipment to increase the cylinder pressure as little as nine pounds. In obtaining these results with my equipment, it will also be understood that other features of the triple valve equipment cooperate with the quick service modifying feature. For example, on a succeeding reduction of a given application, the triple valve will be sensitive to move upon a very light brake pipe reduction, since in movement from service lap toward service position the movement of the piston and graduating valve relative to the main slide valve will be unopposed by the pressure of spring 42 until such time as the service port 210 is uncovered, thus an increase in brake cylinder pressure is insured upon a very light reduction in brake pipe pressure. When, in cycling the brakes, an application is initiated, with cylinder pressure retained, the triple valve parts move from release to application position and during this cycling movement, the very quick but limited quick service reduction to the chamber 214 followed by more gradual quick service venting through the choke 216 to atmosphere, also renders the triple valve sensitive to a slight brake pipe reduction initiated by the engineer's brake valve and ensures every triple valve in the train moving over to its application position. Combined with this is the improved action of my present equipment in closing the feed groove ahead of the small movement of the triple valve piston which is required to initiate the quick service venting to the bulb 214. This action makes it impossible for the auxiliary reservoirs to feed air back into the brake pipe through the feed grooves, which was a particularly troublesome difficulty, except on the forward cars of long trains, with brake mechanisms heretofore in use, which difficulty in such prior equipments prevented the propagation of quick serial action to the rear of the train, except upon the making of a very heavy or prolonged service reduction in brake pipe pressure through the engineer's brake valve. All of the features above described thus contribute toward very sensitive and flexible control of the service operations of the brakes, under all conditions.

*Utilizing a standard triple valve device in the improved equipment*

It may be desired to utilize, without excessive or costly alterations, the ordinary triple valve device now employed on railway cars, as a part of my improved equipment, so that in case the improved equipment is substituted for the equipment now in use, it will not be necessary to discard or scrap the old triple valve device and in Fig. 11, I have illustrated how this may be accomplished.

It will here be understood that when the ordinary triple valve device is employed in the improved equipment, the equipment will function to control the brakes in substantially the same manner as the equipment shown in Figs. 1 to 10 inclusive. In the equipment shown in Fig. 11 the release insuring valve device and reservoir release valve device have been omitted, but otherwise the parts employed correspond in a general way to the parts of the equipment shown in Figs. 1 to 7 inclusive, and Figs. 9 and 10. The arrangement of ports and passages of the equipment also corresponds generally with that of the ports and passages of the equipment shown in Figs. 1 to 6 inclusive.

Since the two equipments are so similar and for the purpose of simplifying the description, the several parts, passages and ports of the equipment shown in Fig. 11, which correspond to those of the equipment shown in Figs. 1 to 4 inclusive, will be indicated by reference characters similar to those of Figs. 1 to 4.

As shown in Fig. 11, the equipment comprises a salvaged triple valve device 251, a pipe bracket 252, a quick service modifying valve device 7', an auxiliary reservoir 2', an emergency reservoir 3', a brake pipe 4', a strainer device 12' and a check valve device 13'. Although not shown in Fig. 11, the equipment also comprises the same emergency portion of the equipment shown in Figs. 1 to 7 inclusive.

The pipe bracket 252 is provided at one side with a gasket face 16' to which the casing 254 of the triple valve device 251 is secured, and at the opposite side is provided with a gasket face 17' to which the casing 43 of the emergency portion shown in Figs. 1 to 4, inclusive, is secured, there being the usual gasket interposed between each of said casings and the pipe bracket. The pipe bracket is also provided with a quick action chamber 52', a chamber 85' for the reception of the strainer device 12', fluid conducting passages, a recess 255 for the reception of the check valve device 13' which, as will be understood, controls a by-pass communication around the strainer device 12', and is further provided with a recess 256 for the reception of the rear end portion of the salvaged triple valve device 251.

The triple valve device 251 is of the well known K type which has been adapted for use in my improved equipment. In adapting an old triple valve device, the check valve casing, quick action mechanism and emergency piston bushing are removed from the casing 254, leaving the chamber, which contained the quick action mechanism, open at one end. This chamber is filled by the portion 257 of a cap 258, which is a new part and which is secured to the triple valve casing 254, there being suitable gaskets 259 and 260 interposed between the cap and casing.

The old piston chamber cap 261, from which the graduating spring and stop have been removed, is secured to the casing 254, there being a new gasket 262 interposed between the cap and casing, said gasket having an annular thickened portion which extends into the triple valve piston chamber 22' and serves to prevent the triple valve piston 23' from moving outwardly to its old emergency position, in other words, serves to stop the piston in service position. This form of gasket and its functioning is not claimed in the present application but is claimed in my copending application Serial No. 582,905, filed December 24, 1931.

The triple valve piston 23' is used without change and has a stem 24' adapted to operate a main slide valve 25' and an auxiliary slide valve 26' contained in a valve chamber 27' of which the recess 256 in the pipe bracket forms a part. The two slide valves are new parts.

Contained in the old cage member 263, which has screw-threaded connection with the casing 254, is a retarded release stop 264 subject to the pressure of a spring 265 interposed between and engaging the stop and cage member, said stop and spring being salvaged from the old triple valve device and used without change.

The new main slide valve 25' is provided with an upwardly extending portion 266 having integral guide lugs 267 and 268 in which the head 269 and stem 270, respectively, of a plunger are slidably guided. Interposed between and operatively engaging the inner side of the head 269 and the inner side of the guide lug 268 is a coil spring 253, which tends to force the plunger outwardly toward the rear end of the piston stem. Outward movement of the plunger is limited by a pin 271, carried by the plunger stem 270 engaging the outer face of the guide lug 268. This plunger mechanism is for the same purpose as the stabilizing mechanism carried by the triple valve piston stem of the equipment shown in Figs. 1 to 4 inclusive and is specifically covered in my copending application, Serial No. 553,064, filed July 25, 1931.

The quick service modifying valve device 7' is contained in the cap 258 of the triple valve device. The details of this device are substantially the same as those of the corresponding device of the equipment shown in Figs. 1 to 4 inclusive.

Except for releasing fluid under pressure from the auxiliary reservoir to the atmosphere to insure the release of the brakes, the equipment in which the converted triple valve device is employed, will function to control the brakes in the same manner as the equipment shown in Figs. 1 to 4, and since the reference characters of Fig. 11 follow very closely the reference characters of the other figures, a detailed description of the equipment shown in Fig. 11 is deemed unnecessary.

General summary

From the foregoing detailed description of construction and operation of my improved brake equipment, it will be seen that, in general, the service controlling mechanism and the emergency controlling mechanism cooperate with each other in almost every important operation of the entire brake controlling valve; and in particular a few of said cooperative actions might be mentioned, as follows:

In charging, the strainer device protects practically all the parts of the controlling valve mechanism from foreign matter, and yet if the strainer device becomes clogged, suitable by-pass valves will open and, in addition, the quick action brake pipe vent connection by-passes the strainer, as well as the back-dumping connection operative in release after emergency; charging of the quick action chamber and associated apparatus is independent of the triple valve, while charging of the emergency reservoir as well as of the auxiliary reservoir is under the control of the triple valve; and the tendency to overcharge the quick action chamber is prevented by a flow from the chamber to the emergency reservoir.

In service operation, undesired emergency action and quick action venting are prevented by the functioning of various parts associated with the emergency valve mechanism, which mechanism also cooperates with the triple valve mechanism by conditioning the inshot mechanism in such manner that the service application will be under the full control of the triple valve mechanism and associated quick service devices including the quick service modifying mechanism. Additionally, the loading and unloading of seating pressures on the valves of the triple valve mechanism, and the cooperative actions of the various stabilizing and return springs of both the triple valve mechanism and the emergency valve mechanism, all tend toward proper service application operation as well as proper emergency application operation.

In releasing of the brakes, the previous action of the quick service modifying mechanism, which has assured at least a predetermined minimum brake cylinder pressure and thus at least a predetermined drop in auxiliary reservoir pressure, practically ensures the possibility of obtaining the necessary releasing differential on the triple valve piston even at the rear end of a long train, and if this is not sufficient then the release ensuring valve device makes the releasing action absolutely certain and substantially uniform throughout the length of the train. The train slack action is almost devoid of shocks, upon any releasing operation, since the venting rate from the cylinder is in my equipment a slow rate (in either the normal or over-travel triple valve position), substantially the equivalent of the usual retarded release rate. Overcharging release is practically eliminated, since the feed grooves are arranged to give only the equivalent of what would be normally termed restricted recharge. Release is also facilitated by virtue of the fact that emergency reservoir air aids the initial recharging of the auxiliary reservoir; and in release after an emergency application, all of these various functions are aided and their operation brought about more quickly, by the action of the emergency valve mechanism in dumping air back from the auxiliary reservoir and brake cylinder into the brake pipe.

In emergency applications, the triple valve mechanism and auxiliary reservoir cooperate with the emergency valve mechanism, emergency reservoir and quick action vent valve; and the brake cylinder build-up control mechanism, including inshot valve and timing valve, cooperate with all of the aforesaid mechanisms. A controlled build-up of cylinder pressure in emergency is thus obtained, with the possibility of obtaining maximum emergency pressure in the cylinder in a minimum amount of time consistent with smooth operation, and at any time in train operation, including during or after service application or during cycling operation. In this connection, it will be evident that quick action, as also quick service, is propagated rapidly through the train (for example in about seven to eight seconds through a 150-car train) ahead of the actual movement of the main slide valve, and further that the bleed off of quick action chamber pressure controls not only the quick action vent valve, which is held open for a period of time after all of the brake pipe air is exhausted, but also controls the final inshot or timing valve and further controls the latter valve in accordance with the brake pipe gradient, to obtain simultaneous final effective braking pressure, in emergency, from both reservoirs. The valve loading and unloading and stabilizing devices all cooperate properly with the several valve devices in emergency operation as well as in service operation.

The particularly effective and flexible operation of the present invention in service applications has been previously discussed in connection with Figure 12. Similar graphs could be made which would show equally advantageous results as to brake cylinder build-up control in emergency, the retarded release and restricted recharge operations characteristic of this mechanism, and other features, but it is evident from the disclosure of the drawings, the description of the construction and operation and from the various cooperative combinations as set forth in the claims, that the above and numerous other advantageous results are accomplished.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, the combination with a brake pipe and a triple valve device comprising a main valve, a graduating valve having a friction opposed movement relative to the main valve, and a piston operated upon a reduction in brake pipe pressure for operating said valves, of means operative upon movement of said graduating valve from release toward service position relative to the main valve for venting fluid under pressure from the brake pipe, and means for yieldingly opposing movement of said graduating valve by said piston to its brake pipe venting position.

2. In a fluid pressure brake, the combination with a brake pipe and a triple valve device comprising a main valve, a graduating valve having a friction opposed movement relative to the main valve, and a piston operated upon a reduction in brake pipe pressure for operating said valves, of means operative upon movement of said graduating valve relative to the main valve for venting fluid under pressure from the brake pipe, and means for opposing movement of said graduating valve by said piston to its brake pipe venting position and permitting such movement only upon a predetermined reduction in brake pipe pressure.

3. In a fluid pressure brake, the combination with a brake pipe and a triple valve device comprising a main valve, a graduating valve having a movement relative to the main valve, and a piston operated upon a reduction in brake pipe pressure for operating said valves, of means operative upon movement of said graduating valve from release toward service position relative to the main valve for venting fluid under pressure from the brake pipe and yielding resilient means for opposing such movement.

4. In a fluid pressure brake, the combination with a brake pipe and a triple valve device comprising a main valve, a graduating valve having a movement relative to the main valve, and a piston operated upon a reduction in brake pipe pressure for operating said valves, of means operative upon movement of said graduating valve relative to the main valve for venting fluid under pressure from the brake pipe and resiliently yielding means for opposing such movement, said yielding means being yieldable to permit such movement only when a predetermined reduction in brake pipe pressure is made on said piston.

5. In a fluid pressure brake, the combination with a brake pipe and a triple valve device comprising a main valve, a graduating valve having a movement relative to the main valve, and a piston operated upon a reduction in brake pipe pressure for operating said valves, of means operative upon movement of said graduating valve from release toward service position relative to the main valve for venting fluid under pressure from the brake pipe, and a spring for opposing movement of said piston and graduating valve relative to said main valve.

6. In a fluid pressure brake, the combination with a brake pipe and a triple valve device comprising a main valve, a graduating valve having a movement relative to the main valve, and a piston operated upon a reduction in brake pipe pressure for operating said valves, of means operative upon movement of said graduating valve relative to the main valve for venting fluid under pressure from the brake pipe, and a yielding member movable with said piston and engageable with said main valve to oppose movement of the graduating valve to its brake pipe venting position.

7. In a fluid pressure brake, the combination with a brake pipe and auxiliary reservoir, of a triple valve device comprising a main valve, a graduating valve having a movement relative to the main valve, and a piston operated upon a reduction in brake pipe pressure for operating said valves, said piston controlling a normally open feed groove around the triple valve piston and independent of the main slide valve through which fluid under pressure is supplied from the brake pipe to the auxiliary reservoir, means operative upon movement of said graduating valve by said piston relative to the main valve for venting fluid under pressure from the brake pipe, the feed groove being closed upon initial movement of said piston, and yielding means opposing movement of the graduating valve relative to the main valve.

8. In a fluid pressure brake, the combination with a brake pipe and auxiliary reservoir, of a triple valve device comprising a main valve, a graduating valve having a movement relative to the main valve, and a piston operated upon a reduction in brake pipe pressure for operating said valves, a normally open feed groove around said piston and independent of the main valve through which fluid under pressure is supplied from the brake pipe to the auxiliary reservoir and adapted to be closed upon initial movement of said piston, means operative upon a further movement of said piston and said graduating valve relative to said main valve for venting fluid under pressure from the brake pipe, and yielding means brought into action after the feed groove is closed for opposing movement of the graduating valve relative to the main valve.

9. In a fluid pressure brake, the combination with a brake pipe and auxiliary reservoir, of a triple valve device comprising a main valve, a graduating valve having a movement relative to the main valve, and a piston operated upon a reduction in brake pipe pressure for operating said valves, a feed groove around said piston through which fluid under pressure is supplied from the brake pipe to the auxiliary reservoir and adapted to be closed upon initial movement of said piston, means operative upon a further movement of said graduating valve by said piston relative to the main valve for venting fluid under pressure from the brake pipe, and resilient means for yieldingly opposing said further movement.

10. In a fluid pressure brake, the combination with a brake pipe and a triple valve device comprising a main valve, a graduating valve having a movement relative to the main valve, and a piston operated upon a reduction in brake pipe pressure for actuating said valves, of means operative upon movement of said graduating valve relative to said main valve for venting fluid under pressure from the brake pipe and means operative upon movement of the main valve by said piston for also venting fluid under pressure from the brake pipe.

11. In a fluid pressure brake, the combination with a brake pipe and a triple valve device comprising a main valve, a graduating valve having a movement relative to the main valve, and a piston operated upon a reduction in brake pipe pressure for actuating said valves, of two chambers, means operative upon relative movement of the graduating valve by said piston for venting fluid under pressure from the brake pipe to one of said chambers, and means operative upon movement of said main valve for venting fluid under pressure from the brake pipe to the other of said chambers.

12. In a fluid pressure brake, the combination with a brake pipe, auxiliary reservoir, and brake cylinder, of a triple valve device comprising a main valve, a graduating valve having a movement relative to the main valve, and a piston operated upon a reduction in brake pipe pressure for actuating said valves to effect the supply of fluid from the auxiliary reservoir to the brake cylinder to cause a service application of the brakes, two chambers, one of which chambers may be said brake cylinder, means operative upon movement of said graduating valve relative to the main valve for venting fluid under pressure from the brake pipe to one of said chambers, and means operative upon movement of said valves to service application position for venting fluid under pressure from the brake pipe to the other of said chambers.

13. In a fluid pressure brake, the combination with a brake pipe and a triple valve device comprising a main valve, a graduating valve having a movement relative to the main valve, and a piston operated upon a reduction in brake pipe pressure for actuating said valves, of means operative upon movement of said graduating valve relative to the main valve for venting fluid under pressure from the brake pipe, and means cooperating with said piston for yieldably opposing movement of the graduating valve relative to the main valve, communication through which fluid is vented from the brake pipe being closed upon movement of the main valve.

14. In a fluid pressure brake, the combination with a brake pipe, brake cylinder, and a triple valve device comprising a main valve, a graduating valve having a movement relative to the main valve, and a piston operated upon a reduction in brake pipe pressure for moving said valves to service position in which fluid under pressure is supplied to the brake cylinder, of a chamber, means operative upon movement of the graduating valve relative to the main valve for venting fluid under pressure from the brake pipe to said chamber, a second chamber which may be said brake cylinder, and means operative in the service application position of said valves for venting fluid from the brake pipe to said second chamber.

15. In a fluid pressure brake, the combination with a brake pipe, of a triple valve device comprising a piston subject to brake pipe pressure, a main valve and a graduating valve having a movement relative to the main valve, a piston stem carried by said piston for operating said valves, and a spring carried by said stem for urging said piston to move relatively to the main valve.

16. In a fluid pressure brake, the combination with a brake pipe, of a triple valve device comprising a piston subject to brake pipe pressure, a main valve and a graduating valve having a movement relative to the main valve, a piston stem carried by said piston for operating said valves, and a spring carried by said stem for opposing movement of said piston and graduating valve in one direction relatively to said main valve and for urging said piston to move in the opposite direction relative to said main valve.

17. In a fluid pressure brake, the combination with a brake pipe and a triple valve device comprising a main valve, a graduating valve having a movement relative to the main valve, and a piston operated upon a reduction in brake pipe pressure for actuating said valves, of means operative upon movement of said graduating valve relative to said main valve for venting fluid under pressure from the brake pipe and means operative upon movement of the main valve by said piston for continuing the venting of fluid from the brake pipe, so that the venting of fluid from the brake pipe is substantially uninterrupted during the movement of the main valve to service application position.

18. In a fluid pressure brake equipment, the combination with a brake pipe and a triple valve device comprising valve means and a piston operated upon a reduction in brake pipe pressure for operating said valve means to effect an application of the brakes, said valve means being operative upon initial movement toward application position for venting fluid under pressure from the brake pipe through one communication and operative in service application position for venting fluid under pressure from the brake pipe at a restricted rate through another communication.

19. In a fluid pressure brake, the combination with a brake pipe, of a triple valve device comprising a piston subject to brake pipe pressure, a main valve and an auxiliary valve having a movement relative to the main valve, a piston stem carried by said piston for operating said valves, and a spring carried by said stem for urging said piston to move relative to the main valve.

20. In a fluid pressure brake, the combination with a brake pipe, of a triple valve device comprising a piston subject to brake pipe pressure, a main valve and an auxiliary valve having a movement relative to the main valve, a piston stem carried by said piston for operating said valves, and a spring carried by said stem for opposing movement of said piston and auxiliary valve in one direction relatively to said main valve and for urging said piston to move in the opposite direction relative to said main valve.

21. In a fluid pressure brake, the combination with a brake pipe, of a valve device comprising a piston subject to brake pipe pressure, a main valve and an auxiliary valve having a movement relative to the main valve, a piston stem carried by said piston for operating said valves, and means cooperating with said piston stem and said main valve for urging said piston to move relative to said main valve.

22. In a fluid pressure brake, the combination with a brake pipe, of a valve device comprising a piston subject to brake pipe pressure, a main valve and an auxiliary valve having a movement relative to the main valve, a piston stem carried by said piston for operating said valves, and means cooperating with said piston stem and said main valve for opposing movement of said piston and auxiliary valve in one direction relatively to said main valve and for urging said piston to move in the opposite direction relative to said main valve.

23. In a fluid pressure brake, the combination with a brake pipe and auxiliary reservoir, of a triple valve device comprising a main valve, a graduating valve having a movement relative to the main valve, and a piston operated upon a reduction in brake pipe pressure for operating said valves, the initial movement of said piston upon a reduction in brake pipe pressure being adapted to close a communication through which fluid under pressure is supplied from the brake pipe to the auxiliary reservoir and a further movement of said piston being adapted to move the graduating valve to a position in which fluid under pressure is vented from the brake pipe, without moving said main valve, and yielding means for preventing such further movement of said graduating valve by said piston to said position by the reduction in brake pipe pressure unless the brake pipe pressure is reduced a predetermined amount.

24. In a fluid pressure brake, the combination with a brake pipe and a triple valve device comprising a main valve, a graduating valve having a movement relative to the main valve and a piston operated upon a reduction in brake pipe pressure for actuating said valves, of means operative upon movement of the graduating valve relative to said main valve for venting fluid under pressure from the brake pipe, and means included in the main valve operative upon movement of the main valve by said piston for also venting fluid under pressure from the brake pipe, the initial flow of fluid from the brake pipe being closed off by the main valve before the main valve is in position to vent fluid under pressure from the brake pipe.

25. In a fluid pressure brake, the combination with a brake pipe and a triple valve device comprising a main valve, a graduating valve having a movement relative to the main valve and a piston operated upon a reduction in brake pipe pressure for actuating said valves, of means included in the main valve and means included in the graduating valve cooperating upon movement of the graduating valve relative to the main valve for venting fluid under pressure from the brake pipe, and means included in the main valve operative upon movement of the main valve by said piston for also venting fluid under pressure from the brake pipe, the main valve closing off the initial flow of fluid from the brake pipe before the the means in the main valve is in position to vent fluid from the brake pipe.

26. In a fluid pressure brake, the combination with a brake pipe and a triple valve device comprising a main valve, a graduating valve having a movement relative to the main valve and a piston operated upon a reduction in brake pipe pressure for actuating said valves, of means included in the main valve and means included in the graduating valve cooperating upon movement of the graduating valve relative to the main valve for venting fluid under pressure from the brake pipe, and means included in the main valve operative upon movement of the main valve for also venting fluid under pressure from the brake pipe independently of the first venting.

27. In a fluid pressure brake, the combination with a brake pipe, of a triple valve device comprising a main valve having a port in communication with the brake pipe and having another port in communication with a passage to which fluid under pressure is adapted to be vented from the brake pipe, a graduating valve movable relative to the main valve and a piston operated upon a reduction in brake pipe pressure for actuating said valves, said graduating valve having a cavity for connecting the ports in the main valve when the graduating valve is moved relative to the main valve and thereby establishing a communication through which fluid under pressure is vented from the brake pipe, and means in the main valve operative upon movement of the main valve by said piston for also venting fluid under pressure from the brake pipe, the main valve closing said communication as the main valve is moved to effect the final venting of fluid from the brake pipe.

28. In a fluid pressure brake, the combination with a brake pipe, and a triple valve device having a service position and a service lap position, said triple valve device comprising a main valve, a graduating valve having a movement relative to the main valve from service lap position to service position and a piston operated upon a reduction in brake pipe pressure for shifting said graduating valve from service lap position toward service position, of means operative upon movement of the graduating valve from service lap position toward service position for establishing a communication through which fluid under pressure is supplied to increase the degree of brake application, and means carried by the piston for yieldably opposing movement of the piston and thereby the graduating valve toward service position only after said communication has been established.

29. In a fluid pressure brake, the combination with a brake pipe, and a triple valve device having a release position, a service position and a service lap position, said triple valve device comprising a main valve, a graduating valve having a movement relative to the main valve from service lap position to service position and a piston operated upon a reduction in brake pipe pressure for shifting said graduating valve from service lap position toward service position, of means operative upon movement of the graduating valve from service lap position toward service position for establishing a communication through which fluid under pressure is supplied to increase the degree of brake application, and means operative only after said communication has been established for yieldably opposing movement of the piston and thereby the graduating valve toward service position, said means being adapted to also yieldably oppose movement of the piston and graduating valve with the main slide valve in release position.

30. In a fluid pressure brake, the combination with a brake pipe, a brake cylinder, of a triple valve device comprising a main valve, a graduating valve having a movement relative to the main valve and a piston operated upon a reduction in brake pipe pressure for moving said valves to service position in which fluid under pressure is supplied to the brake cylinder, said graduating valve being movable relative to the main valve to service lap position by said piston for cutting off the supply of fluid to the brake cylinder and being movable relative to the main valve from service lap position toward service position by said piston upon a reduction in brake pipe pressure for supplying fluid to the brake cylinder, and means carried by the piston operative only after the graduating valve has been moved to supply fluid to the brake cylinder for yieldably opposing movement of the piston and thereby the graduating valve toward service position.

31. In a fluid pressure brake, the combination with a brake pipe, of valve means comprising a main valve having a port through which fluid under pressure is adapted to be supplied to effect an application of the brakes, an auxiliary valve having movement relative to the main valve for effecting the opening and closing of said port and a movable abutment for moving said auxiliary valve relative to the main valve and yielding means for opposing movement of said auxiliary valve by said abutment with the main valve in release position after communication has been established to said port.

32. In a fluid pressure brake, the combination with a brake pipe and a brake cylinder, of a triple valve device comprising a main slide valve having a port through which fluid under pressure is adapted to be supplied to the brake cylinder, a graduating slide valve having movement relative to the main valve for controlling the opening and closing of said port and a piston for actuating said valves, and yielding means opposing movement of said graduating valve relative to the main valve with the main valve in release position by said piston only after communication has been established to said port.

33. In a fluid pressure brake, the combination with a brake pipe and a brake cylinder, of a triple valve device comprising a main valve having a port through which fluid under pressure is adapted to be supplied to the brake cylinder, a graduating valve normally closing said port and having a movement relative to the main valve, and a piston for actuating said valves, said graduating valve being movable relative to the main valve by said piston with the main valve in release position to first open communication to said port and then establish communication through which fluid under pressure is vented from the brake pipe, and yielding resistance means for opposing movement of the graduating valve to the brake pipe venting position only after communication has been established to said port.

34. In a fluid pressure brake, the combination with a brake pipe and a brake cylinder, of a triple valve device comprising a main valve having a port through which fluid under pressure is adapted to be supplied to the brake cylinder, a graduating valve normally closing said port and having a movement relative to the main valve, and a piston for actuating said valves, said graduating valve being movable relative to the main valve by said piston with the main valve in release position to a position for establishing a communication through which fluid is adapted to be supplied to said port and then to a position for venting fluid under pressure from the brake pipe, and a yielding resistance means for opposing movement of the graduating valve by said piston after communication is established to said port.

35. In a fluid pressure brake, the combination with a brake pipe, of a quick service reservoir of a volume which is so limited as to permit approximate equalization of the brake pipe into said reservoir at a rapid rate without causing an emergency rate of reduction in brake pipe pressure of such duration as to cause an emergency operation, said reservoir having an atmospheric vent of a size to permit continued venting of fluid from the brake pipe at a service rate, and a brake controlling valve device having a quick service position for venting fluid under pressure from said brake pipe to said reservoir at a rapid rate, and operative upon a reduction in brake pipe pressure to effect an application of the brakes.

36. In a fluid pressure brake, the combination with a brake pipe, of a quick service reservoir of a volume which is so limited as to permit equalization of the brake pipe into said reservoir at a rapid rate without causing an emergency rate of reduction in brake pipe pressure of such duration as to cause an emergency operation, said reservoir having an atmospheric vent of a size to permit continued venting of fluid from the brake pipe at a service rate, and a brake controlling valve device having a quick service position for venting fluid under pressure from said brake pipe to said reservoir at a rapid rate, and operative upon a reduction in brake pipe pressure to effect an application of the brakes and to close communication through which fluid under pressure is vented from the brake pipe to said reservoir.

37. In a fluid pressure brake, the combination with a brake pipe, of a quick service reservoir of a volume which is so limited as to permit equalization of the brake pipe into said reservoir at a rapid rate without causing an emergency rate of reduction in brake pipe pressure of such duration as to cause an emergency operation, said reservoir having an atmospheric vent of a size to permit continued venting of fluid from the brake pipe at a service rate, and a brake controlling valve device having a quick service position for venting fluid under pressure from said brake pipe to said reservoir at a rapid rate, and operative upon a reduction in brake pipe pressure to effect an application of the brakes and upon an increase in brake pipe pressure to effect a release of the brakes and to close communication through which fluid under pressure is vented from the brake pipe to said reservoir.

38. In a fluid pressure brake, the combination with a brake pipe, of a quick service reservoir of a volume which is so limited as to permit equalization of the brake pipe into said reservoir at a rapid rate without causing an emergency rate of reduction in brake pipe pressure of such duration as to cause an emergency operation, said reservoir having an atmospheric vent of a size to permit continued venting of fluid from the brake pipe at a service rate, and a brake controlling valve device for establishing communication through which fluid under pressure is vented from said brake pipe to said reservoir to effect a quick service reduction in brake pipe pressure at a rapid rate and operative upon said quick service reduction in brake pipe pressure to effect an application of the brakes, said brake controlling valve device being operative upon an increase in brake pipe pressure to effect a release of the brakes.

39. In a fluid pressure brake, the combination with a brake pipe, an auxiliary reservoir, a brake cylinder and a quick service reservoir having an atmospheric vent, of a brake controlling valve device operative upon a reduction in brake pipe pressure to connect said brake pipe to said quick service reservoir for effecting a quick service reduction in brake pipe pressure and operative upon said quick service reduction in brake pipe pressure to close the communication to said quick service reservoir and establish communication from said brake pipe to said brake cylinder and to supply fluid under pressure from said auxiliary reservoir to said brake cylinder, and valve means controlled by the increase in pressure in said brake cylinder for closing the last mentioned communication.

40. In a fluid pressure brake, the combination with a brake pipe, a brake cylinder, and an auxiliary reservoir, of a quick service reservoir of a volume which is so limited as to permit equalization of the brake pipe into said reservoir at a rapid rate without causing an emergency rate of reduction in brake pipe pressure of such duration as to cause an emergency operation, and a triple valve device comprising a main valve, an auxiliary valve movable relative to said main valve and a piston subject to the opposing pressures of the brake pipe and auxiliary reservoir for moving said valves, said piston being operative to move said auxiliary valve relative to said main valve upon a light reduction in brake pipe pressure to vent fluid under pressure from said brake pipe to said quick service reservoir at a rapid rate and operative upon venting of fluid under pressure to said reservoir to move said main valve for supplying fluid under pressure from said auxiliary reservoir to said brake cylinder and for closing communication from said brake pipe to said quick service reservoir, said quick service reservoir having a restricted communication with the atmosphere through which fluid is vented from said reservoir to the atmosphere at a service rate.

41. In a fluid pressure brake, the combination with a brake pipe, a brake cylinder, and an auxiliary reservoir, of a quick service reservoir of a volume which is so limited as to permit equalization of the brake pipe into said reservoir at a rapid rate without causing an emergency rate of reduction in brake pipe pressure of such duration as to cause an emergency operation, and a triple valve device comprising a main valve, an auxiliary valve movable relative to said main valve and a piston subject to the opposing pressures of the brake pipe and auxiliary reservoir for moving said valves, said piston being operative to move said auxiliary valve relative to said main valve upon a light reduction in brake pipe pressure to vent fluid under pressure from said brake pipe to said quick service reservoir at a rapid rate and operative upon venting of fluid under pressure to said reservoir to move said main valve for supplying fluid under pressure from said auxiliary reservoir to said brake cylinder and for closing communication from said brake pipe to said quick service reservoir, said piston being operative upon an increase in brake pipe pressure to move said valves to a position for releasing fluid under pressure from said brake cylinder and in which said communication is maintained closed, said quick service reservoir having an atmospheric vent, and a choke in said vent for permitting the continued venting of fluid under pressure from said reservoir to the atmosphere at a service rate.

42. In a fluid pressure brake, the combination with a brake pipe, and a brake cylinder, of a quick service reservoir having an atmospheric vent, a brake controlling valve device operative upon a reduction in brake pipe pressure to connect said brake pipe to said quick service reservoir for effecting a quick service reduction in brake pipe pressure and being movable to close the communication from the brake pipe to the quick service reservoir, to establish a communication from the brake pipe to the brake cylinder for effecting a further reduction in brake pipe pressure and to establish a communication through which fluid under pressure is supplied to the brake cylinder to effect an application of the brakes, and means operative to close the communication from the brake pipe to the brake cylinder to limit the flow of fluid from the brake pipe to the brake cylinder.

43. In a fluid pressure brake, the combination with a brake pipe, and a brake cylinder, of a quick service reservoir having an atmospheric vent, a brake controlling valve device operative upon a reduction in brake pipe pressure to connect said brake pipe to said quick service reservoir for effecting a quick service reduction in brake pipe pressure and being movable to close the communication from the brake pipe to the quick service reservoir, to establish a communication from the brake pipe to the brake cylinder for effecting a further reduction in brake pipe pressure and to establish a communication through which fluid under pressure is supplied to the brake cylinder to effect an application of the brakes, and means responsive to a predetermined fluid pressure for closing the communication from the brake pipe to the brake cylinder to limit the flow of fluid from the brake pipe to the brake cylinder.

44. In a fluid pressure brake, the combination with a brake pipe, and a brake cylinder, of a quick service reservoir having an atmospheric vent, a brake controlling valve device operative upon a reduction in brake pipe pressure to connect said brake pipe to said quick service reservoir for effecting a quick service reduction in brake pipe pressure and being movable to close the communication from the brake pipe to the quick service reservoir, to establish a communication from the brake pipe to the brake cylinder for effecting a further reduction in brake pipe pressure and to establish a communication through which fluid under pressure is supplied to the brake cylinder to effect an application of the brakes, and means responsive to a predetermined brake cylinder pressure for closing the communication from the brake pipe to the brake cylinder.

45. In a fluid pressure brake, the combination with a brake pipe, a brake cylinder and a quick service reservoir, of a brake controlling valve device operative upon a reduction in brake pipe pressure to connect said brake pipe to said quick service reservoir for effecting a predetermined quick service reduction in brake pipe pressure at a certain rate, a restricted communication through which fluid supplied to the quick service reservoir is vented to continue the reduction in brake pipe pressure at a slower rate, said brake controlling valve device being operative upon said quick service reduction in brake pipe pressure to close communication from the brake pipe to the quick service reservoir, to establish a communication through which fluid under pressure is vented from the brake pipe to the brake cylinder and to establish a communication through which fluid under pressure is supplied to the brake cylinder to effect an application of the brakes, and means operative to limit the amount of fluid under pressure vented from the brake pipe to the brake cylinder.

46. In a fluid pressure brake, the combination with a brake pipe, a brake cylinder and a quick service reservoir, of a brake controlling valve device operative upon a reduction in brake pipe pressure to connect said brake pipe to said quick service reservoir for effecting a predetermined quick service reduction in brake pipe pressure at a certain rate, a restricted communication through which fluid supplied to the quick service reservoir is vented to continue the reduction in brake pipe pressure at a slower rate, said brake controlling valve device being operative upon said quick service reduction in brake pipe pressure to close communication from the brake pipe to the quick service reservoir, to establish a communication through which fluid under pressure is vented from the brake pipe to the brake cylinder and to establish a communication through which fluid under pressure is supplied to the brake cylinder to effect an application of the brakes, means for restricting the rate of flow of fluid under pressure from the brake pipe to the brake cylinder, and means operative to limit the amount of fluid under pressure vented from the brake pipe to the brake cylinder.

47. In a fluid pressure brake, the combination with a brake pipe, a brake cylinder and a quick service reservoir, of a brake controlling valve device operative upon a reduction in brake pipe pressure to connect said brake pipe to said quick service reservoir for effecting a predetermined quick service reduction in brake pipe pressure at a certain rate, a restricted communication through which fluid supplied to the quick service reservoir is vented to continue the reduction in brake pipe pressure at a slower rate, said brake controlling valve device being operative upon said quick service reduction in brake pipe pressure to close communication from the brake pipe to the quick service reservoir, to establish a communication through which fluid under pressure is vented from the brake pipe to the brake cylinder and to establish a communication through which fluid under pressure is supplied to the brake cylinder to effect an application of the brakes, and means operative upon a predetermined increase in brake cylinder pressure for closing off the flow of fluid from the brake pipe to the brake cylinder.

48. In a fluid pressure brake, the combination with a brake pipe, a brake cylinder and a quick service reservoir, of a brake controlling valve device operative upon a reduction in brake pipe pressure to connect said brake pipe to said quick service reservoir for effecting a predetermined quick service reduction in brake pipe pressure at a certain rate, a restricted communication through which fluid supplied to the quick service reservoir is vented to continue the reduction in brake pipe pressure at a slower rate, said brake controlling valve device being operative upon said quick service reduction in brake pipe pressure to close communication from the brake pipe to the quick service reservoir, to establish a communication through which fluid under pressure is vented from the brake pipe to the brake cylinder and to establish a communication through which fluid under pressure is supplied to the brake cylinder to effect an application of the brakes, means for restricting the rate of flow of fluid under pressure from the brake pipe to the brake cylinder, and means operative upon a predetermined increase in brake cylinder pressure for closing off the flow of fluid from the brake pipe to the brake cylinder.

49. In a fluid pressure brake, the combination with a brake pipe, and a brake cylinder, of a quick service reservoir having an atmospheric vent, a brake controlling valve device operative upon a reduction in brake pipe pressure to connect said brake pipe to said quick service reservoir for effecting a quick service reduction in brake pipe pressure, said reservoir and atmospheric vent providing for a quick service reduction in brake pipe pressure at different rates, said brake controlling valve device being movable to close the communication from the brake pipe to the quick service reservoir, to establish a communication through which fluid under pressure is vented from the brake pipe to the brake cylinder and a communication through which fluid is supplied to the brake cylinder to effect an application of the brakes, and means for restricting the flow of fluid from the brake pipe to the brake cylinder.

50. In a fluid pressure brake, the combination with a brake pipe, and a brake cylinder, of a quick service reservoir having an atmospheric vent, a brake controlling valve device operative upon a reduction in brake pipe pressure to connect said brake pipe to said quick service reservoir for effecting a quick service reduction in brake pipe pressure, said reservoir providing for an initial quick service reduction in brake pipe pressure at a fast rate and said vent providing for the retardation of the rate of said reduction, said brake controlling valve device being movable to close the communication from the brake pipe to the quick service reservoir, to establish a communication through which fluid under pressure is vented from the brake pipe to the brake cylinder and a communication through which fluid is supplied to the brake cylinder to effect an application of the brakes, and means for restricting the flow of fluid from the brake pipe to the brake cylinder.

51. In a fluid pressure brake, the combination with a brake pipe, and a brake cylinder, of a quick service reservoir having an atmospheric vent, a brake controlling valve device operative upon a reduction in brake pipe pressure to connect said brake pipe to said quick service reservoir for effecting a quick service reduction in brake pipe pressure, said reservoir providing for an initial predetermined quick service reduction in brake pipe pressure at a fast rate and said vent providing for the retardation of the rate of said reduction, said brake controlling valve device being movable to close the communication from the brake pipe to the quick service reservoir, to establish a communication through which fluid under pressure is vented from the brake pipe to the brake cylinder and a communication through which fluid is supplied to the brake cylinder to effect an application of the brakes, and means for restricting the flow of fluid from the brake pipe to the brake cylinder.

52. In a fluid pressure brake, the combination with a brake pipe, of a brake cylinder, means of local storage of fluid under pressure, movable means subject to operation under differential pressures of the brake pipe and storage means, and valve mechanism actuated by said movable means and adapted, upon movement of said movable means under the influence of brake pipe reduction, first to establish a local brake pipe venting connection, subsequently to open a small capacity communication from the storage means to the cylinder, and upon further movement to open communication from the brake pipe to the cylinder and to increase the communication capacity from the storage means to the cylinder.

53. In a fluid pressure brake, the combination with a brake pipe, of a brake cylinder, means of local storage of fluid under pressure, movable means subject to operation under differential pressures of the brake pipe and storage means, and valve mechanism actuated by said movable means and adapted, upon movement of said movable means under the influence of brake pipe reduction, first to establish a local brake pipe venting connection, subsequently to open a small capacity communication from the storage means to the cylinder, and upon further movement to open communication from the brake pipe to the cylinder and to increase the communication capacity from the storage means to the cylinder, and means operative under the influence of cylinder pressure to close off the communication from the brake pipe to the cylinder.

54. An air brake apparatus including, in combination, a brake pipe, a brake cylinder, an auxiliary reservoir, a triple valve device operative on brake pipe reduction to supply air from the reservoir to the cylinder, and means for initial quick service venting to a small volume chamber and subsequent local venting to the cylinder, successively controlled upon movement of the triple valve device from release position toward application position.

55. An air brake apparatus including, in combination, a brake pipe, a brake cylinder, an auxiliary reservoir, a triple valve device including a main valve and an auxiliary valve having the capacity for movement relative to the main valve, and means for initial quick service venting to a small volume chamber and subsequent local venting to the cylinder, upon movement of the triple valve device from release position toward application position, said auxiliary valve having means controlling the initial quick service venting prior to the movement of the main valve.

56. An air brake apparatus including, in combination, a brake pipe, a brake cylinder, an auxiliary reservoir, a triple valve device including a main valve and an auxiliary valve having the capacity for movement relative to the main valve, and means for initial quick service venting to a small volume chamber and subsequent local venting to the cylinder, successively controlled upon movement of the triple valve device from release position toward application position, both of said valve elements having means controlling said initial quick service venting.

57. An air brake apparatus including, in combination, a brake pipe, a brake cylinder, an auxiliary reservoir, a triple valve device including a main valve and an auxiliary valve having the capacity for movement relative to the main valve, and means for initial quick service venting to a small volume chamber and subsequent local venting to the cylinder, upon movement of the triple valve device from release position toward application position, said main valve having means controlling said local venting to the cylinder.

58. An air brake apparatus including, in combination, a brake pipe, a brake cylinder, an auxiliary reservoir, a triple valve device including a main valve and an auxiliary valve having the capacity for movement relative to the main valve, and means for initial quick service venting to a small volume chamber and subsequent local venting to the cylinder, successively controlled upon movement of the triple valve device from release position toward application position, together with a restricted brake pipe venting passage discharging from the chamber.

59. In a fluid pressure brake, the combination with a brake pipe and a brake cylinder, of a brake controlling valve device operative upon a reduction in brake pipe pressure in initiating a service application of the brakes to locally vent fluid under pressure from the brake pipe and to supply fluid under pressure to the brake cylinder to effect a service application of the brakes, and valve means subject to a substantially constant but light pressure and to the opposing pressure of the brake cylinder and operated when the brake cylinder pressure exceeds said light pressure to cut off and maintain cut off the local venting from the brake pipe as controlled by said valve means so long as the brake cylinder pressure is at or above said light pressure.

60. In a fluid pressure brake, the combination with a brake pipe and a brake cylinder, of a brake controlling valve device operative upon a reduction in brake pipe pressure in initiating a service application of the brakes to locally vent fluid under pressure from the brake pipe and to supply fluid under pressure to the brake cylinder to effect a service application of the brakes, and valve means subject to a substantially constant but relatively low pressure and to the opposing pressure of the brake cylinder for controlling local venting of fluid from the brake pipe and operated upon the brake cylinder pressure slightly exceeding said low pressure to cut off and maintain cut off the local venting controlled by said valve means so long as the brake cylinder pressure is at or above said low pressure.

61. In a fluid pressure brake, the combination with a brake pipe, an auxiliary reservoir normally charged with fluid under pressure and a brake cylinder, of a brake controlling valve device operative upon a reduction in brake pipe pressure in initiating a service application of the brakes to vent fluid under pressure from the brake pipe to effect a local reduction in brake pipe pressure and to supply fluid under pressure from said reservoir to the brake cylinder to effect a service application of the brakes, a spring, and valve means subject to brake cylinder pressure and the opposing pressure of said spring for continuing the reduction in brake pipe pressure until a predetermined brake cylinder pressure is obtained, and with the brake controlling valve device in position establishing communication to supply fluid from the reservoir to the brake cylinder, the flow of fluid from the auxiliary reservoir to the brake cylinder being independent of the flow of fluid from the brake pipe.

62. In a fluid pressure brake, the combination with a brake pipe and a brake cylinder, of a brake controlling valve device operative upon a reduction in brake pipe pressure in initiating a service application of the brakes to effect a local venting of fluid under pressure from the brake pipe and to supply fluid under pressure to the brake cylinder to effect a service application of the brakes, and valve means subject to brake cylinder pressure for controlling local venting of fluid from the brake pipe and means subjecting said valve means to a light pressure opposing the brake cylinder pressure, said valve means being operated upon an increase in brake cylinder pressure to a degree slightly exceeding said light pressure to cut off and maintain cut off the venting of fluid as controlled by said valve means so long as the brake cylinder pressure is at or above said light pressure.

63. In a fluid pressure brake, the combination with a brake pipe and a brake cylinder, of a brake controlling valve device operative upon a reduction in brake pipe pressure in initiating a service application of the brakes to establish a communication through which fluid under pressure is supplied to the brake cylinder to effect a service application of the brakes and to establish communication through which fluid under pressure is locally vented from the brake pipe, and means subject to a light substantially constant pressure and to the opposing pressure of the brake cylinder for permitting a continuance of the local venting of fluid from the brake pipe and operated when the brake cylinder pressure slightly exceeds said light pressure and independently of the operation of the brake cylinder for cutting off and maintaining cut off the local venting of fluid from the brake pipe which is controlled by said means so long as the brake cylinder pressure is at or above said light pressure.

64. In a fluid pressure brake, the combination with a brake pipe and a brake cylinder, of a brake controlling valve device operative upon a reduction in brake pipe pressure in initiating a service application of the brakes to establish a communication through which fluid under pressure is supplied to the brake cylinder to effect a service application of the brakes and to establish communication through which fluid under pressure is locally vented from the brake pipe, and valve means subject to a substantially constant but relatively low pressure and to the opposing pressure of the brake cylinder for permitting a continuance of the local venting of fluid under pressure from the brake pipe and operated when the brake cylinder pressure slightly exceeds said low pressure to cut off and maintain cut off the venting of fluid from the brake pipe which is controlled by said valve means so long as the brake cylinder pressure exceeds said low pressure, said brake controlling valve device continuing to supply fluid from the auxiliary reservoir to the brake cylinder until substantial equalization of the auxiliary reservoir with the reduced brake pipe pressure.

65. In a fluid pressure brake, the combination with a brake pipe, an auxiliary reservoir and a brake cylinder, of a brake controlling valve device operative to a brake applying position upon a reduction in brake pipe pressure in initiating a service application of the brakes to establish a communication through which fluid under pressure is supplied from the auxiliary reservoir to the brake cylinder to effect a service application of the brakes and to establish communication through which fluid under pressure is locally vented from the brake pipe, and means permitting the venting of fluid from the brake pipe to continue so as to insure the brake controlling valve device remaining in said brake applying position until a predetermined brake cylinder pressure is attained and for then cutting off and maintaining cut off the local venting so long as the brake cylinder pressure equals or exceeds said predetermined pressure.

66. In a fluid pressure brake, the combination with a brake pipe, an auxiliary reservoir and a brake cylinder, of a brake controlling valve device operative to a brake applying position upon a reduction in brake pipe pressure in initiating a service application of the brakes to establish a communication through which fluid under pressure is supplied from the auxiliary reservoir to the brake cylinder to effect a service application of the brakes and to establish communication through which fluid under pressure is locally vented from the brake pipe, a spring, and valve means subject to brake cylinder pressure and the opposing pressure of said spring and operative to continue the venting of fluid under pressure from the brake pipe until a predetermined brake cylinder pressure is obtained to prevent the brake controlling valve device from moving out of said brake applying position before said predetermined brake cylinder pressure is obtained.

67. In a fluid pressure brake, the combination with a brake pipe, an auxiliary reservoir and a brake cylinder, of a brake controlling valve device operative to a brake applying position upon a reduction in brake pipe pressure in initiating a service application of the brakes to establish a communication through which fluid under pressure is supplied from the auxiliary reservoir to the brake cylinder to effect a service application of the brakes and to establish communication through which fluid under pressure is locally vented from the brake pipe to effect a local reduction in brake pipe pressure at a greater rate than the rate at which auxiliary reservoir pressure is reduced by flow to the brake cylinder, and valve means permitting the continuance of the local venting of fluid from the brake pipe and operated at a predetermined brake cylinder pressure to cut off and maintain cut off the local venting of fluid from the brake pipe so long as the brake cylinder pressure is at or in excess of said predetermined pressure.

68. In a fluid pressure brake, the combination with a brake pipe and a brake cylinder, of a brake controlling valve device operative upon a reduction in brake pipe pressure in initiating a service application of the brakes to establish a communication through which fluid under pressure is supplied to the brake cylinder to effect a service application of the brakes and to establish communication through which a local venting of fluid under pressure from the brake pipe is adapted to be effected, and valve means subject to brake cylinder pressure for controlling the venting of fluid from the brake pipe by way of the brake pipe venting communication and valve means subject to a substantially constant but relatively low pressure and to the opposing pressure of the brake cylinder for controlling the venting of fluid from the brake pipe by way of the brake pipe venting communication, said valve means being operative when the brake cylinder pressure equals or exceeds said low pressure for cutting off the local venting of fluid through the brake pipe venting communication to thereby prevent further venting of fluid from the brake pipe by way of the brake pipe venting communication so long as the brake cylinder pressure equals or exceeds said low pressure.

69. In a fluid pressure brake, the combination with a brake pipe, an auxiliary reservoir and a brake cylinder, of a brake controlling valve device operative to a brake applying position upon a reduction in brake pipe pressure to establish a communication through which fluid under pressure is supplied from the auxiliary reservoir to the brake cylinder to effect an application of the brakes and to establish communication through which fluid under pressure is locally vented from the brake pipe to the brake cylinder to effect a greater rate of reduction in brake pipe pressure than the rate at which the auxiliary reservoir pressure is reduced by flow to the brake cylinder, and means operative when the brake controlling valve device is in said brake applying position for cutting off the local venting of fluid from the brake pipe upon the attainment of a predetermined brake cylinder pressure.

70. In a fluid pressure brake equipment having a brake pipe, a brake cylinder, and a local fluid pressure reservoir; a brake controlling mechanism under the influence of differential pressures of the brake pipe and reservoir and operative upon a reduction in brake pipe pressure to supply fluid under pressure to the cylinder to apply the brakes, and operative upon an increase in brake pipe pressure to vent fluid from the cylinder to release the brakes, said mechanism including valve means operative, upon one reduction in brake pipe pressure, to locally vent fluid from the brake pipe and to supply fluid to said cylinder to apply the brakes, and operative upon a succeeding brake pipe reduction of the same brake application to supply additional fluid to the cylinder, and valve means subject to brake cylinder pressure and operative under the influence of brake cylinder pressure for continuing the local reduction in brake pipe pressure until a predetermined brake cylinder pressure is obtained and for closing off the local vent during said succeeding reduction.

71. In a fluid pressure brake equipment having a brake pipe, a brake cylinder, and a local fluid pressure reservoir; a brake controlling mechanism under the influence of differential pressures of the brake pipe and reservoir and operative upon a reduction in brake pipe pressure to supply fluid under pressure to the cylinder to apply the brakes, and operative upon an increase in brake pipe pressure to vent fluid from the cylinder to release the brakes, said mechanism including valve means operative, upon one reduction in brake pipe pressure, to locally vent fluid from the brake pipe to said cylinder, and operative upon a succeeding brake pipe reduction, to supply additional fluid to the cylinder, and valve means subject to brake cylinder pressure and operative under the influence of brake cylinder pressure for continuing the local reduction in brake pipe pressure until a predetermined brake cylinder pressure is obtained and for closing off the local vent to said cylinder during said succeeding reduction.

72. In a fluid pressure brake equipment having a brake pipe, a brake cylinder and a local fluid pressure reservoir, a brake controlling mechanism under the influence of differential pressures of the brake pipe and reservoir and operative upon a reduction in brake pipe pressure to supply fluid under pressure to the cylinder to apply the brakes, and operative upon an increase in brake pipe pressure to vent fluid from the cylinder to release the brakes, said mechanism including valve means operative, upon one reduction in brake pipe pressure, to locally vent fluid from the brake pipe at a rapid rate to a small volume chamber and to supply fluid to said cylinder to apply the brakes, and operative upon a succeeding brake pipe reduction to supply additional fluid to the cylinder, and means closing off the local vent to said chamber during said succeeding reduction.

73. In a fluid pressure brake equipment having a brake pipe, a brake cylinder and a local fluid pressure reservoir, a brake controlling mechanism under the influence of differential pressures of the brake pipe and reservoir and operative upon a reduction in brake pipe pressure to supply fluid under pressure to the cylinder to apply the brakes, and operative upon an increase in brake pipe pressure to vent fluid from the cylinder to release the brakes, said mechanism including valve means operative, upon one reduction in brake pipe pressure, to first locally vent fluid from the brake pipe at a rapid rate and then at a slower rate, and to supply fluid to said cylinder to apply the brakes, and operative upon a succeeding brake pipe reduction to supply additional fluid to the cylinder, and means closing off the local vent during said succeeding reduction.

74. Fluid pressure brake equipment for cars of a train including, for each car equipped, in combination with a brake pipe, a brake cylinder, a local fluid pressure reservoir, a brake controlling mechanism under the influence of differential pressures of the brake pipe and reservoir and operative upon a reduction in brake pipe pressure to supply fluid under pressure to said cylinder to apply the brakes and upon an increase in brake pipe pressure to vent fluid from said cylinder to release the brakes, said mechanism incorporating brake controlling valve structure including valve means operative upon an initial brake pipe reduction to supply fluid under pressure to the cylinder from the reservoir and the brake pipe up to a substantially predeterminedly limited cylinder pressure, said valve means further being operative upon a succeeding brake pipe reduction to supply additional fluid under pressure from said reservoir to the brake cylinder to increase the brake application, the supply of fluid from the brake pipe to the brake cylinder being cut off when said limited brake cylinder pressure is obtained, whereby upon said succeeding brake pipe reduction, communication between the brake pipe and the cylinder is closed.

75. Fluid pressure brake equipment for cars of a train including, for each car equipped, in combination with a brake pipe, a brake cylinder, a local fluid pressure reservoir, a brake controlling mechanism under the influence of differential pressures of the brake pipe and reservoir and operative upon a reduction in brake pipe pressure to supply fluid under pressure to said cylinder to apply the brakes and upon an increase in brake pipe pressure to vent fluid from said cylinder to release the brakes, said mechanism incorporating brake controlling valve structure including means operative upon an initial brake pipe reduction to locally vent fluid from the brake pipe whereby to ensure rapid propagation of serial action throughout the length of the train, and valve means operative upon said initial brake pipe reduction to supply fluid under pressure from the reservoir and brake pipe to the cylinder up to a substantially predeterminedly limited cylinder pressure, said valve means further being operative upon a succeeding brake pipe reduction to supply additional fluid under pressure from said reservoir to the brake cylinder to increase the brake application, the communication through which fluid under pressure flows from the brake pipe to the brake cylinder being closed upon said limited brake cylinder pressure being obtained.

76. Fluid pressure brake equipment including, in combination, a brake pipe, a brake cylinder, a local fluid pressure reservoir, a brake controlling mechanism operative upon a reduction in brake pipe pressure to close communication between the reservoir and the brake pipe and to supply fluid from the reservoir to the cylinder to apply the brakes, and operative upon an increase in brake pipe pressure to vent fluid from the cylinder, means adapted to produce a local venting of the brake pipe upon a reduction in brake pipe pressure, and valve means subject to brake cylinder pressure and operative under the influence of brake cylinder pressure for continuing the local reduction in brake pipe pressure until a predetermined brake cylinder pressure is obtained and for maintaining the local vent closed during a succeeding reduction in brake pipe pressure.

77. Fluid pressure brake equipment including, in combination, a brake pipe, a brake cylinder, a local fluid pressure reservoir normally connected to the brake pipe, a brake controlling mechanism operative upon reduction in brake pipe pressure to first close communication between the reservoir and the brake pipe and to then supply fluid from the reservoir to the cylinder to effect a service application of the brakes, and operative upon an increase in brake pipe pressure to vent fluid from the cylinder, means adapted upon a reduction in brake pipe pressure to produce a local venting of the brake pipe with communication between the reservoir and brake pipe closed, and means operative upon initiation of a service brake application to assure the continuance of such local venting until a predetermined limited cylinder pressure is attained and then cut off the further venting of fluid from the brake pipe.

78. Fluid pressure brake equipment including, in combination, a brake pipe, a brake cylinder, a local fluid pressure reservoir, a brake controlling mechanism operative upon reduction in brake pipe pressure to close communication between the reservoir and the brake pipe and to supply fluid from the reservoir to the cylinder to apply the brakes, and operative upon an increase in brake pipe pressure to vent fluid from the cylinder, means adapted to produce a local venting of the brake pipe upon a reduction in brake pipe pressure, and means operative upon initiation of a brake application to assure the continuance of such local venting until a predetermined cylinder pressure is attained, and to then cut off the further venting as controlled by brake cylinder pressure whereby any local reduction effected by a succeeding brake pipe reduction when the brakes are already applied is independent of that which is controlled by brake cylinder pressure.

79. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means operative upon the initial brake pipe reduction of one brake application automatically to build up pressure in the cylinder to a predetermined value in a range sufficient to ensure gathering the slack of the train, and means automatically operative under the influence of cylinder pressure to normally build up cylinder pressure to a predetermined limit upon said initial reduction, said valve means further being operative upon succeeding reductions of said one brake application to admit additional fluid to the cylinder substantially without predetermined limitations.

80. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means operative upon the initial brake pipe reduction of one brake application to provide local venting of the brake pipe sufficient to ensure build-up of cylinder pressure to a predetermined value within a range which will cause the slack to gather, and means automatically operative under the influence of cylinder pressure to normally build up cylinder pressure to a predetermined limit upon said initial reduction, said valve means further being operative upon succeeding reductions of said one brake application to admit additional fluid to the cylinder substantially without predetermined limitations.

81. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means operative upon the initial brake pipe reduction of one brake application to supply fluid under pressure from the brake pipe to the cylinder and automatically to build up pressure in the cylinder to a predetermined value in a range sufficient to ensure gathering the slack of the train, and means automatically operative under the influence of cylinder pressure to normally build up cylinder pressure to a predetermined limit upon said initial reduction, said valve means further being operative upon succeeding reductions of said one brake application to admit additional fluid to the cylinder substantially without predetermined limitations.

82. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means operative upon the initial brake pipe reduction of one brake application first to locally vent fluid from the brake pipe to ensure rapid propagation of serial action and then automatically to build up pressure in the cylinder to a predetermined value in a range sufficient to ensure gathering the slack of the train, and means automatically operative under the influence of cylinder pressure to normally build up cylinder pressure to a predetermined limit upon said initial reduction, said valve means further being operative upon succeeding reductions of said one brake application to admit additional fluid to the cylinder substantially without predetermined limitations.

83. In a fluid pressure brake, the combination with a brake pipe and a brake cylinder, of a brake controlling valve device operative upon a reduction in brake pipe pressure to establish a communication through which fluid under pressure is supplied to the brake cylinder to effect an application of the brakes and to establish communication through which fluid under pressure is locally vented from the brake pipe, means for controlling the local venting of fluid under pressure from the brake pipe to the brake cylinder and operative upon a relatively light increase in brake cylinder pressure for cutting off and preventing the further venting of fluid from the brake pipe to the brake cylinder, and means operative to prevent back flow of fluid from the brake cylinder to the brake pipe in brake application position of the brake controlling valve device.

84. In a fluid pressure brake, the combination with a brake pipe and a brake cylinder, of a brake controlling valve device operative upon a reduction in brake pipe pressure to establish a communication through which fluid under pressure is supplied to the brake cylinder to effect an application of the brakes and to establish communication through which fluid under pressure is locally vented from the brake pipe, means for controlling the local venting of fluid under pressure from the brake pipe to the brake cylinder and operative upon a relatively light increase in brake cylinder pressure for cutting off and preventing the further venting of fluid from the brake pipe to the brake cylinder, and means operative to prevent back flow of fluid from the brake cylinder to the brake pipe by way of the first mentioned means in brake application position of the brake controlling valve device.

85. In a fluid pressure brake, the combination with a brake pipe and a brake cylinder, of a brake controlling valve device operative upon a reduction in brake pipe pressure to establish a communication through which fluid under pressure is supplied to the brake cylinder to effect an application of the brakes and to establish communication through which fluid under pressure is locally vented from the brake pipe, means for controlling the local venting of fluid under pressure from the brake pipe to the brake cylinder and operative upon a relatively light increase in brake cylinder pressure for cutting off and preventing the further venting of fluid from the brake pipe to the brake cylinder, and a check valve interposed between said brake controlling valve device and said means preventing back flow of fluid from the brake cylinder to the brake pipe by way of said means in brake application position of the brake controlling valve device.

86. In a fluid pressure brake, the combination with a brake pipe and a brake cylinder, of a brake controlling valve device operative upon a reduction in brake pipe pressure to first establish communication through which fluid under pressure is locally vented from the brake pipe at a fast rate and then operative to close said communication and to establish a communication through which fluid under pressure is locally vented from the brake pipe at a slower rate and to also establish communication through which fluid under pressure is supplied to the brake cylinder to effect an application of the brakes, and means for modifying the local venting of fluid under pressure from the brake pipe according to a predetermined brake cylinder pressure.

87. In a fluid pressure brake, the combination with a brake pipe and a brake cylinder, of a brake controlling valve device operative upon a reduction in brake pipe pressure to first establish communication through which fluid under pressure is locally vented from the brake pipe at a fast rate and then operative to close said communication and to establish a communication through which fluid under pressure is locally vented from the brake pipe to the brake cylinder at a slower rate and to also establish communication through which fluid under pressure is supplied to the brake cylinder to effect an application of the brakes, and means controlled according to a predetermined brake cylinder pressure to regulate the local venting of fluid under pressure from the brake pipe to the brake cylinder.

88. In a fluid pressure brake, the combination with a brake pipe and a brake cylinder, of a brake controlling valve device operative upon a reduction in brake pipe pressure to first establish communication through which fluid under pressure is locally vented from the brake pipe at a fast rate and then operative to close said communication and to establish a communication through which fluid under pressure is locally vented from the brake pipe at a slower rate and to also establish communication through which fluid under pressure is supplied to the brake cylinder to effect an application of the brakes, means for modifying the local venting of fluid under pressure from the brake pipe according to a predetermined brake cylinder pressure, and a check valve adapted to prevent back flow of fluid from the brake cylinder to the brake pipe by way of said means.

89. In a fluid pressure brake, the combination with a brake pipe, an auxiliary reservoir, a brake cylinder and a brake controlling valve device operative upon a reduction in brake pipe pressure in initiating a service application of the brakes to locally vent fluid under pressure from the brake pipe and to supply fluid under pressure from the auxiliary reservoir to the brake cylinder to effect a service application of the brakes, of a valve device for regulating the local flow of fluid from the brake pipe, said valve device comprising a casing having a passage through which fluid vented from the brake pipe is adapted to flow independently of the flow of fluid from the auxiliary reservoir to the brake cylinder, a valve controlling communication through said passage, and means operative upon a predetermined increase in brake cylinder pressure to effect the operation of said valve to cut off and maintain cut off the flow of brake pipe fluid through said passage so long as said predetermined increase in brake cylinder pressure is maintained.

90. In a fluid pressure brake, the combination with a brake pipe, an auxiliary reservoir, a brake cylinder and a brake controlling valve device operative upon a reduction in brake pipe pressure in initiating a service application of the brakes to locally vent fluid under pressure from the brake pipe and to supply fluid under pressure from the auxiliary reservoir to the brake cylinder to effect a service application of the brakes, of a valve device for regulating the local flow of fluid from the brake pipe, said valve device comprising a casing having a passage through which fluid vented from the brake pipe is adapted to flow independently of the flow of fluid from the auxiliary reservoir to the brake cylinder, a valve operative to control the flow of fluid through said passage, and a movable abutment subject to brake cylinder pressure and the opposing pressure of a spring for controlling the operation of said valve.

91. In a fluid pressure brake, the combination with a brake pipe and a brake cylinder, of a brake controlling valve device operative upon a reduction in brake pipe pressure in initiating a service application of the brakes to supply fluid under pressure to the brake cylinder to effect a service application of the brakes, means for locally reducing the brake pipe pressure, and means subject to a substantially constant but relatively low pressure and to the opposing pressure of the brake cylinder and adapted to permit the continuance of the reduction in an initial application of the brakes until the brake cylinder pressure has been increased to slightly exceed said low pressure and for preventing a further local reduction in brake pipe pressure in the initial application of the brakes so long as the brake cylinder pressure exceeds said low pressure.

92. In a fluid pressure brake, in combination, a brake pipe, a brake cylinder, a reservoir normally charged with fluid under pressure, a brake controlling valve device subject to the opposing pressures of the brake pipe and reservoir and operative to a brake applying position upon a reduction in brake pipe pressure to supply fluid under pressure from said reservoir to the brake cylinder and to effect a local reduction in brake pipe pressure at a rate exceeding the rate at which the reservoir pressure is reduced by the flow of fluid from the reservoir to the brake cylinder, and means operative upon a predetermined increase in brake cylinder pressure for terminating the local reduction in brake pipe pressure and for preventing a further local reduction in brake pipe pressure with the brake controlling valve device in said brake applying position in an initial application of the brakes so long as the brake cylinder pressure is at or above said predetermined pressure.

93. In a fluid pressure brake, the combination with a brake pipe and a triple valve device comprising a main valve, an auxiliary valve having a movement relative to the main valve and a piston operated upon a reduction in brake pipe pressure for actuating said valves, of means operative upon movement of the auxiliary valve relative to the main valve for venting fluid under pressure from the brake pipe, means operative upon movement of the main valve by said piston for also venting fluid under pressure from the brake pipe, and separate valve means for limiting the amount of fluid under pressure vented from the brake pipe.

94. In a fluid pressure brake, the combination with a brake pipe, a reservoir normally charged with fluid under pressure and a valve device operative upon a reduction in brake pipe pressure to vent fluid under pressure from said reservoir to effect an application of the brakes, said valve device comprising a casing having a wall, a valve operative to vent fluid under pressure from said reservoir, a piston for actuating said valve subject on one side to brake pipe pressure and on the other side to the pressure of fluid in said reservoir and movable into engagement with said wall upon a reduction in brake pipe pressure, a stem carried by said piston, and means carried by said stem and cooperating with said valve for moving said piston out of engagement with said wall upon substantial equalization of pressures in said reservoir and brake pipe.

95. In a fluid pressure brake, the combination with a brake pipe, a reservoir normally charged with fluid under pressure and a valve device operative upon a reduction in brake pipe pressure to vent fluid under pressure from said reservoir to effect an application of the brakes, said valve device comprising a casing having a wall, a valve operative to vent fluid under pressure from said reservoir, a piston for actuating said valve subject on one side to brake pipe pressure and on the other side to the pressure of fluid in said reservoir and movable into engagement with said wall upon a reduction in brake pipe pressure, a stem carried by said piston, and means at the rear of said stem for moving said piston out of engagement with said wall upon substantial equalization of pressures in said reservoir and brake pipe.

96. In a fluid pressure brake, the combination with a brake pipe, a reservoir normally charged with fluid under pressure and a valve device operative upon a reduction in brake pipe pressure to vent fluid under pressure from said reservoir to effect an application of the brakes, said valve device comprising a main valve, an auxiliary valve movable relative to said main valve, a stem for moving the auxiliary valve relative to the main valve, means carried by said stem for resisting such relative movement, a piston for operating said stem, a casing having a wall, said piston being subject on one side to brake pipe pressure and on the opposite side to the pressure of fluid in said reservoir and operable upon a reduction in brake pipe pressure to move said auxiliary valve relative to said main valve and movable into sealing engagement with said wall, said means being operative to break said sealing engagement upon substantial equalization of the fluid pressures acting on the opposite sides of said piston.

97. In a fluid pressure brake, the combination with a brake pipe, of a brake controlling valve device comprising a casing, a piston mounted in said casing and subject to brake pipe pressure and having a piston stem, valve means operated by said stem, a rearward extension carried by said stem, a yielding resistance means mounted in said extension, a flange carried by said stem, and a yielding resistance means adapted to engage said flange.

98. In a fluid pressure brake, the combination with a brake pipe, of a brake controlling valve device comprising a casing having a piston chamber and a valve chamber, a piston separating said chambers, a piston stem carried by said piston and having a rearwardly extending bearing portion, a cover plate closing the end of said valve chamber and provided with a chamber in which said bearing portion is mounted.

99. In a fluid pressure brake, the combination with a brake pipe, of a brake controlling valve device comprising a casing having a piston chamber and a valve chamber, a piston separating said chambers, a piston stem carried by said piston and having a rearwardly extending bearing portion, a cover plate closing the end of said valve chamber and provided with an annular wall, within which said bearing portion is mounted.

100. In a fluid pressure brake, the combination with a brake pipe, of a brake controlling valve device comprising a casing having a piston chamber and a valve chamber, a piston separating said chambers, a piston stem carried by said piston and having a rearwardly extending bearing portion, a cover plate closing the end of said valve chamber and provided with a wall, within which said bearing portion is mounted, and a yielding resistance element mounted on said wall for opposing movement of said piston stem.

101. In a fluid pressure brake, the combination with a brake pipe, of a brake controlling valve device comprising a piston cylinder having an end wall, a main valve, an auxiliary valve having a movement relative to the main valve, piston means operated upon a reduction in brake pipe pressure for actuating said valves to effect an application of the brakes, said piston means moving into sealing engagement with said end wall as said valves are moved to application position, and means cooperating with said piston means and main valve for yieldably resisting movement of the auxiliary valve relative to the main valve in effecting an application of the brakes and for moving said piston means out of sealing engagement with said wall.

102. In a fluid pressure brake, the combination with a brake pipe, of a brake controlling valve device comprising a piston cylinder having an end wall, a main valve, an auxiliary valve having a movement relative to the main valve, piston means operated upon a reduction in brake pipe pressure for actuating said valves to effect an application of the brakes, said piston means moving into sealing engagement with said end wall as said valves are moved to application position, and means interposed between and engaging said piston means and main valve for yieldably resisting movement of the auxiliary valve relative to the main valve in effecting an application of the brakes and for moving said piston means out of sealing engagement with said wall.

103. In a fluid pressure brake, the combination with a brake pipe, of a brake controlling valve device comprising a piston cylinder having an end wall, a main valve, an auxiliary valve having a movement relative to the main valve, piston means operated upon a reduction in brake pipe pressure for actuating said valves to effect an application of the brakes, said piston means moving into sealing engagement with said end wall as said valves are moved to application position, and means cooperating with said piston means and main valve for yieldably resisting movement of the auxiliary valve relative to the main valve in effecting an application of the brakes and for moving said piston means relative to the main valve out of sealing engagement with said wall.

104. In a fluid pressure brake, the combination with a brake pipe, of a brake controlling valve device comprising a piston cylinder having an end wall, a main valve, an auxiliary valve having a movement relative to the main valve, piston means operated upon a reduction in brake pipe pressure for actuating said valves to effect an application of the brakes, said piston means moving into sealing engagement with said end wall as said valves are moved to application position, and means for yieldably resisting only movement of the auxiliary valve relative to the main valve in effecting an application of the brakes and for moving said piston means out of sealing engagement with said wall.

105. Brake controlling equipment including a brake pipe, a brake cylinder, a reservoir, movable means subject to the opposing pressures of the brake pipe and reservoir and movable from an application position through an outer release position to an inner release position, a main valve actuable by said movable means, an auxiliary valve actuable by said movable means and having relative movement to said main valve, said valves being normally urged toward their seats by reservoir pressure, and means for at least partially unloading the auxiliary valve in both the outer and inner release positions.

106. Brake controlling equipment including a brake pipe, a brake cylinder, a reservoir, movable means subject to the opposing pressures of the brake pipe and reservoir and movable from an application position through an outer release position to an inner release position, a main valve actuable by said movable means, an auxiliary valve actuable by said movable means and having relative movement to said main valve, said valves being normally urged toward their seats by reservoir pressure, and means for at least partially loading the main valve in outer release position and during movement from said release position to application position, and means for at least partially unloading the main valve in inner release position.

107. Brake controlling equipment including a brake pipe, a brake cylinder, a reservoir, movable means subject to the opposing pressures of the brake pipe and reservoir and movable from an application position through an outer release position to an inner release position, a main valve actuable by said movable means, an auxiliary valve actuable by said movable means and having relative movement to said main valve, said valves being normally urged toward their seats by reservoir pressure, means for at least partially unloading the auxiliary valve in both the outer and inner release positions, and means for at least partially loading the main valve in outer release position and during movement from said release position to application position, and means for at least partially unloading the main valve in inner release position.

108. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means movable upon the initial brake pipe reduction of one brake application automatically to build up pressure in the cylinder to a predetermined value in a range sufficient to ensure gathering the slack of the train, means automatically operative under the influence of cylinder pressure to normally build up cylinder pressure to a predetermined limit upon said initial reduction, said valve means further being movable upon succeeding reductions of said one brake application to admit additional fluid to the cylinder substantially without predetermined limitations, and means associated with said valve means providing decreased resistance to valve movement on a succeeding reduction as compared with said initial reduction.

109. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir to effect service operations of the brakes, an emergency valve mechanism subject to opposing pressures of the brake pipe and quick action chamber to effect emergency operations of the brakes, a local brake pipe venting mechanism arranged to effect the build-up of a uniform predetermined cylinder pressure on initial service reduction in brake pipe pressure, and means operative during such service operation to bleed down quick action chamber pressure.

110. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir to effect service operations of the brakes, an emergency valve mechanism subject to opposing pressures of the brake pipe and quick action chamber to effect emergency operations of the brakes, a local brake pipe venting mechanism arranged to effect the build-up of a uniform predetermined cylinder pressure on initial service reduction in brake pipe pressure, said triple valve mechanism being arranged to initiate quick service venting of the brake pipe prior to effecting service application of the brakes, and means operative during such quick service venting to bleed down quick action chamber pressure.

111. In a fluid pressure brake, the combination with a brake pipe, of a brake controlling valve device comprising a valve having an outer brake releasing position, an inner brake releasing position, and a brake applying position, a piston operative according to variations in brake pipe pressure for actuating said valve, a loading cavity in said valve constantly open to the atmosphere, and a cavity in said valve supplied with fluid under pressure when the valve is in its inner release position for reducing the load on the valve effected by the loading cavity being connected to the atmosphere.

112. In a fluid pressure brake, the combination with a brake pipe, of a brake controlling valve device comprising a valve having an outer brake releasing position, an inner brake releasing position, and a brake applying position, a piston operative according to variations in brake pipe pressure for actuating said valve, a loading cavity in said valve constantly open to the atmosphere for loading the valve, and means operative in the inner brake releasing position of the valve for decreasing the load on said valve.

113. A triple valve device comprising a piston, a main slide valve and an auxiliary slide valve having a normal release position and operative by said piston to a brake applying position, said auxiliary slide valve being movable relative to the main slide valve, and means, in the release position of said valves, for supplying fluid under pressure to the under side of the graduating valve to reduce the resistance of the graduating valve to the movement by the piston toward application position.

114. A triple valve device comprising a piston, a main slide valve and an auxiliary slide valve having a normal release position and operative by said piston to a brake applying position, said auxiliary slide valve being movable relative to the main slide valve, means, in the release position of said valves, supplying fluid under pressure to the under side of the auxiliary valve to reduce the resistance of the auxiliary valve to the movement of the piston toward application position, and a resistance increasing cavity in the main valve which is connected to the atmosphere in said release position for causing said valve to resist movement from release position toward application position by said piston.

115. A triple valve device comprising a piston, a main valve operated by said piston and having a normal release position and an inner position, yielding resistance means for opposing movement of said valve from normal release position to the inner position, and a cavity in said valve which is supplied with fluid under pressure in said inner position for reducing the resistance of said valve to movement from the inner position to said release position by said yielding resistance means.

116. In a fluid pressure brake equipment, the combination with a brake pipe, of a brake controlling valve device for controlling the application and release of the brakes and comprising a main valve, an auxiliary valve and means operated upon an increase in brake pipe pressure for shifting said valves to either an outer brake releasing position or an inner brake releasing position, said main valve in the outer release position establishing a communication through which the auxiliary valve is subjected to fluid under pressure which tends to raise it from its seat and in the inner release position disestablishing said communication.

117. In a fluid pressure brake equipment, the combination with a brake pipe, of a brake controlling valve device for controlling the application and release of the brakes and comprising a main valve, an auxiliary valve and means operated upon an increase in brake pipe pressure for shifting said valves to either an outer brake releasing position or an inner brake releasing position, said main valve in the outer release position establishing a communication from the brake pipe to the under side of the auxiliary valve and in the inner release position disestablishing said communication.

118. In a fluid pressure brake equipment, the combination with a brake pipe, of a brake controlling valve device for controlling the application and release of the brakes and comprising a main valve, an auxiliary valve and means operated upon an increase in brake pipe pressure for shifting said valves to either an outer brake releasing position or an inner brake releasing position, said main valve in the outer release position establishing a communication from the brake pipe to the under side of the auxiliary valve and in the inner release position disestablishing said communication, means for yieldably resisting movement of the first mentioned means and valves to the inner release position and permitting the first mentioned means and valves to be moved to the inner release position before the brake pipe pressure is increased sufficiently to cause the auxiliary valve to be raised from its seat.

119. In a fluid pressure brake equipment, the combination with a brake pipe, of a brake controlling valve device for controlling the application and release of the brakes and comprising a main valve, an auxiliary valve and means operated upon an increase in brake pipe pressure for shifting said valves to either an outer brake releasing position or an inner brake releasing position, said main valve in the outer release position establishing a communication from the brake pipe to the under side of the auxiliary valve and in the inner release position closing said communication at the seat of the main valve.

120. In a fluid pressure brake equipment, the combination with a brake pipe, of a triple valve device comprising a main valve and an auxiliary valve having a movement relative to the main valve and a piston operated upon a reduction in brake pipe pressure for moving said valves to brake applying position and operated upon an increase in brake pipe pressure for moving said valves to either an outer brake releasing position or an inner brake releasing position, a port in said main valve in communication with the brake pipe and leading to the under side of the auxiliary valve when said valves are in the outer release position, said port being out of communication with the brake pipe when the main valve is in the inner release position, and a cavity in said auxiliary valve open to said port when the main valve is in the outer release position and the auxiliary valve has been moved relative to the main valve toward brake applying position, said port and cavity establishing a communication through which fluid under pressure is locally vented from the brake pipe.

121. In a fluid pressure brake, the combination with a brake pipe, an auxiliary reservoir, and a brake cylinder, of a brake controlling valve device comprising a movable abutment subject to the opposing pressures of the brake pipe and auxiliary reservoir, and a slide valve operated by said abutment upon a reduction in brake pipe pressure for first establishing a communication from the auxiliary reservoir to the brake cylinder and then establishing a communication from the brake pipe to the brake cylinder.

122. In a fluid pressure brake, the combination with a brake pipe and a brake cylinder, of a brake controlling valve device operative upon a reduction in brake pipe pressure to initially establish a communication through which fluid under pressure is locally vented from the brake pipe, to then establish a communication through which fluid under pressure is supplied to the brake cylinder to initiate an application of the brakes and to finally establish a communication through which fluid under pressure is locally vented from the brake pipe to the brake cylinder and to maintain the second mentioned communication open.

123. In a fluid pressure brake, the combination with a brake pipe and a brake cylinder, of a brake controlling valve device operative upon a reduction in brake pipe pressure to initially establish a communication through which fluid under pressure is locally vented from the brake pipe, to then crack open a communication through which fluid under pressure is supplied to the brake cylinder and after the last mentioned communication is cracked open to establish a communication through which fluid under pressure is locally vented from the brake pipe.

124. In a fluid pressure brake, the combination with a brake pipe, a brake cylinder and an auxiliary reservoir, of a quick service reservoir, and a brake controlling valve device operative upon a reduction in brake pipe pressure for initially venting fluid under pressure from the brake pipe to said quick service reservoir, for then supplying fluid under pressure from said auxiliary reservoir to the brake cylinder and for finally venting fluid under pressure from the brake pipe to the brake cylinder.

125. In a fluid pressure brake, the combination with a brake cylinder and brake pipe, of a normally open valve, a triple valve device and an emergency valve device operated upon a sudden reduction in brake pipe pressure for supplying fluid under pressure to the brake cylinder past said open valve, and means operated upon a predetermined increase in brake cylinder pressure for closing said valve.

126. In a fluid pressure brake, the combination with a brake cylinder and brake pipe, of a normally open valve, a triple valve device and an emergency valve device operated upon a sudden reduction in brake pipe pressure for supplying fluid under pressure to the brake cylinder past said open valve, means operated upon a predetermined increase in brake cylinder pressure for closing said valve, and means for restricting the flow of fluid to said brake cylinder when said valve is closed.

127. In a fluid pressure brake, the combination with a brake pipe, a brake cylinder and an emergency reservoir, of a triple valve device comprising a valve for controlling the charging of said reservoir with fluid under pressure, a piston for actuating said valve and an emergency valve device comprising a valve for controlling communication through which fluid under pressure is supplied from said reservoir to the brake cylinder in effecting an emergency application of the brakes, and a piston subject to the opposing pressures of the brake pipe and a chamber charged with fluid under pressure and operated upon a sudden reduction in brake pipe pressure for actuating the last mentioned valve.

128. In a fluid pressure brake, the combination with a brake cylinder, of an emergency reservoir from which fluid under pressure is adapted to be supplied to the brake cylinder in effecting an emergency application of the brakes, a triple valve device comprising a valve for controlling the charging of said reservoir with fluid under pressure, an emergency valve device comprising a valve having a cavity for establishing a communication through which fluid under pressure is supplied from said reservoir to the brake cylinder upon movement of the valve to a brake applying position, and a piston subject to the opposing pressures of the brake pipe and a chamber charged with fluid under pressure and operated upon a sudden reduction in brake pipe pressure for operating said valve.

129. In a fluid pressure brake, a fluid pressure chamber, a brake controlling valve mechanism movable under the influence of pressure in said chamber to a position for applying the brakes and venting fluid from said chamber and including a slide valve, means for maintaining said valve against its seat, when said chamber is vented, and means for venting fluid under pressure which may leak along the seated side of the 130. In a fluid pressure brake, the combination with a brake cylinder, of an emergency valve device comprising a valve having an emergency application position for establishing communication through which fluid under pressure is supplied to the brake cylinder, and means comprising a cavity at each side of the valve which, in the emergency position of said valve, establishes communication through which fluid under pressure which may leak from the first mentioned communication along the under side of said valve, is vented to the atmosphere.

131. In a fluid pressure brake, the combination with a brake cylinder, of an emergency valve device comprising a valve having an emergency application position for establishing communication through which fluid under pressure is supplied to the brake cylinder, and means comprising a cavity at each side of the valve and extending longitudinally of the valve for substantially its full length for venting to the atmosphere fluid under pressure which may leak along the under side of said valve.

132. In a fluid pressure brake, the combination with a brake cylinder, of an emergency valve device comprising a valve having an emergency application position for establishing communication through which fluid under pressure is supplied to the brake cylinder, and means in said valve comprising a cavity at each side of said communication extending longitudinally of the valve for substantially its full length and through which fluid under pressure which leaks from said communication and along the under side of the valve may flow.

133. In a fluid pressure brake, the combination with a brake cylinder, of an emergency valve device comprising a valve having an emergency application position for establishing communication through which fluid under pressure is supplied to the brake cylinder, and means in said valve comprising a cavity at each side of said communication vented to the atmosphere in the emergency position of the valve for conducting fluid under pressure, which may leak from said communication, from the under side of said valve.

134. In a fluid pressure brake, the combination with a brake cylinder, of an emergency valve device comprising a valve having an emergency application position for establishing communication through which fluid under pressure is supplied to the brake cylinder and means in said valve comprising a normally vented cavity arranged one at each side of the valve for receiving fluid under pressure which may leak under said valve from said communication, and means for venting the cavities in the emergency position of the valve.

135. In a fluid pressure brake, the combination with a brake cylinder, of an emergency valve device comprising a valve having an emergency application position for establishing communication through which fluid under pressure is supplied to the brake cylinder and means comprising a cavity in said valve for receiving fluid under pressure which may leak under said valve from said communication, and means for venting fluid under pressure from the cavity in the emergency position of the valve.

136. An air brake apparatus including a brake pipe, a cylinder, an auxiliary reservoir, a triple valve device controlling the admission of fluid from the auxiliary reservoir to the cylinder, an emergency reservoir, an emergency valve device controlling the admission of fluid from the emergency reservoir to the cylinder, a cylinder build-up control mechanism having a communication for delivering fluid to the cylinder, a fluid delivery passage from the triple valve device and communicating with the cylinder build-up control mechanism, and a fluid delivery passage from the emergency valve device also connected for delivery to said control mechanism.

137. In a fluid pressure brake, the combination with a brake cylinder, of a normally open valve past which fluid under pressure is adapted to be supplied to the brake cylinder in effecting an emergency application of the brakes, spring means tending to close said valve, a valve piston normally maintaining said valve open and having at one side an outer seated area and an inner seated area, said inner seated area of the valve piston being subjected to the pressure of fluid being supplied to the brake cylinder and said valve piston being operable upon a predetermined increase in the pressure of fluid acting on said inner seated area to permit said means to close said valve, and means preventing fluid under pressure which may leak from the inner seated area of the valve piston to the outer seated area from exerting an operating pressure on the outer seated area of the valve piston.

138. In a fluid pressure brake, the combination with a brake cylinder, of a normally open valve past which fluid under pressure is adapted to be supplied to the brake cylinder in effecting an emergency application of the brakes, spring means tending to close said valve, a valve piston normally maintaining said valve open and having at one side an outer seated area and an inner seated area, said inner seated area of the valve piston being subjected to the pressure of fluid being supplied to the brake cylinder and said valve piston being operable upon a predetermined increase in the pressure of fluid acting on said inner seated area to permit said means to close said valve, and a leakage groove around said valve piston for permitting fluid, which may leak from the inner seated area of the valve piston to the outer seated area, to flow to the other side of the valve piston.

139. In a fluid pressure brake, the combination with a brake cylinder, of a normally open valve past which fluid under pressure is adapted to be supplied to the brake cylinder in effecting an emergency application of the brakes, spring means tending to close said valve, a valve piston normally maintaining said valve open and having at one side an outer seated area and an inner seated area, said inner seated area of the valve piston being subjected to the pressure of fluid being supplied to the brake cylinder and said valve piston being operable upon a predetermined increase in the pressure of fluid acting on said inner seated area to permit said means to close said valve, a chamber at the other side of said valve piston at atmospheric pressure, and a leakage groove connecting the outer seated area of said valve piston to said chamber.

140. In a fluid pressure brake, the combination with a brake cylinder, of a normally open valve past which fluid under pressure is adapted to be supplied to the brake cylinder in effecting an emergency application of the brakes, spring means tending to close said valve, a valve piston normally maintaining said valve open and having at one side an outer seated area and an inner seated area, said inner seated area of the valve piston being subjected to the pressure of fluid being supplied to the brake cylinder and said valve piston being operable upon a predetermined increase in the pressure of fluid acting on said inner seated area to permit said means to close said valve, a chamber at the other side of said valve piston at atmospheric pressure, a leakage groove connecting the outer seated area of the valve piston to said chamber, and means for closing said communication when said valve piston is operated to permit said valve to close.

141. In a fluid pressure brake, the combination with a brake pipe, a brake cylinder and valve means operative upon a reduction in brake pipe pressure to supply fluid under pressure to said brake cylinder, of a valve device for controlling a communication through which fluid under pressure is supplied to the brake cylinder, said valve device comprising a normally open valve past which fluid under pressure flows to the brake cylinder, spring means tending to close said valve, an abutment normally maintaining said valve open and having a predetermined inner seated area subject to brake cylinder pressure and operative upon a predetermined increase in brake cylinder pressure to permit said means to close said valve, and means preventing fluid which may leak from the inner seated area of the valve piston from exerting an operating pressure on an outer seated area of the valve piston.

142. In a fluid pressure brake, the combination with a brake pipe, brake cylinder, and a triple valve device operated upon an emergency reduction in brake pipe pressure for supplying fluid under pressure to the brake cylinder, of an emergency reservoir, and an emergency valve device operated upon an emergency reduction in brake pipe pressure for supplying fluid under pressure from the emergency reservoir to the brake cylinder, said emergency valve device being operated after an emergency application of the brakes by an increase in brake pipe pressure to connect the brake cylinder with the brake pipe, so that fluid under pressure is supplied from the brake cylinder to the brake pipe to facilitate the release of the brakes.

143. In a fluid pressure brake, the combination with a brake pipe, brake cylinder, and an equalizing valve device operated upon a reduction in brake pipe pressure for supplying fluid under pressure to the brake cylinder, of an emergency valve device operated upon an emergency rate of reduction in brake pipe pressure for effecting an emergency application of the brakes, and operated upon an increase in brake pipe pressure after an emergency application of the brakes for connecting the brake cylinder to the brake pipe to permit flow of fluid from the brake cylinder to the brake pipe to facilitate the release of the brakes.

144. In a fluid pressure brake, the combination with a brake pipe, brake cylinder, auxiliary reservoir, and an equalizing valve device operated upon a reduction in brake pipe pressure for supplying fluid under pressure from the auxiliary reservoir to the brake cylinder, of an emergency reservoir, and an emergency valve device operated upon a sudden reduction in brake pipe pressure to supply fluid under pressure from the emergency reservoir to the brake cylinder to effect an emergency application of the brakes, and operated upon an increase in brake pipe pressure for connecting the brake cylinder and consequently the auxiliary reservoir to the brake pipe, to thereby increase the brake pipe pressure by flow from the brake cylinder and auxiliary reservoir and reduce the auxiliary reservoir pressure to facilitate the movement of the equalizing valve device to release position.

145. In a fluid pressure brake, the combination with a brake pipe and a brake cylinder, of an emergency valve device having a normal position and an inner position in which the brake cylinder is connected to the brake pipe and operated upon an emergency reduction in brake pipe pressure for supplying fluid under pressure to the brake cylinder, said emergency valve device being movable to its inner position upon an increase in brake pipe pressure after an emergency reduction in brake pipe pressure.

146. In a fluid pressure brake, the combination with a brake pipe and a brake cylinder, of an emergency valve device having a normal position and an inner position in which the brake cylinder is connected to the brake pipe and operated upon an emergency reduction in brake pipe pressure for supplying fluid under pressure to the brake cylinder, said emergency valve device being movable to its inner position upon an increase in brake pipe pressure after an emergency reduction in brake pipe pressure, and yielding means for opposing movement of said emergency valve device from its normal position to its inner position.

147. In a fluid pressure brake, the combination with a brake pipe and a brake cylinder, of an emergency valve device having a normal position and an inner position in which the brake cylinder is connected to the brake pipe and operated upon an emergency reduction in brake pipe pressure for supplying fluid under pressure to the brake cylinder, said emergency valve device being movable to its inner position upon an increase in brake pipe pressure after an emergency reduction in brake pipe pressure, and a spring for opposing movement of said emergency valve device to its inner position.

148. In a fluid pressure brake, the combination with a brake pipe and a brake cylinder, of an emergency valve device having a normal position and an inner position in which the brake cylinder is connected to the brake pipe and operated upon an emergency reduction in brake pipe pressure for supplying fluid under pressure to the brake cylinder, said emergency valve device being movable to its inner position upon an increase in brake pipe pressure after an emergency reduction in brake pipe pressure, and a spring for urging said emergency valve device from its inner position to its normal position.

149. In a fluid pressure brake, the combination with a brake pipe and brake cylinder, of an emergency valve device comprising a piston subject to brake pipe pressure and a valve operated by said piston upon an emergency reduction in brake pipe pressure for supplying fluid under pressure to the brake cylinder, said piston and valve having a normal position and an inner position in which the brake cylinder is connected to the brake pipe, and said piston and valve being movable to said inner position upon an increase in brake pipe pressure after an emergency reduction in brake pipe pressure.

150. In a fluid pressure brake, the combination with a brake pipe and brake cylinder, of an emergency valve device comprising a piston subject to brake pipe pressure and a valve operated by said piston upon an emergency reduction in brake pipe pressure for supplying fluid under pressure to the brake cylinder, said piston and valve having a normal position and an inner position in which the brake cylinder is connected to the brake pipe, and said piston and valve being movable to said inner position upon an increase in brake pipe pressure after an emergency reduction in brake pipe pressure, and yielding means for moving said piston and valve from the inner position to the normal position.

151. In a fluid pressure brake, the combination with a brake pipe and brake cylinder, of an emergency valve device comprising a piston subject to brake pipe pressure and a valve operated by said piston upon an emergency reduction in brake pipe pressure for supplying fluid under pressure to the brake cylinder, said piston and valve having a normal position and an inner position in which the brake cylinder is connected to the brake pipe, and said piston and valve being movable to said inner position upon an increase in brake pipe pressure after an emergency reduction in brake pipe pressure, and yielding means opposing the movement of said piston and valve from the normal position to the inner position and adapted to urge said piston and valve from the inner position to the normal position.

152. In a fluid pressure brake, the combination with a brake pipe and a brake cylinder, of an emergency valve device operated upon an emergency reduction in brake pipe pressure for supplying fluid under pressure to the brake cylinder and including a valve having a position in which communication is established from the brake pipe to the brake cylinder, said valve being movable upon an increase in brake pipe pressure after an emergency reduction in brake pipe pressure to said position for supplying fluid from the brake cylinder to the brake pipe, and a check valve for preventing at all times back flow from the brake pipe to the brake cylinder through said communication.

153. In a fluid pressure brake, the combination with a brake pipe, brake cylinder, auxiliary reservoir, and an emergency reservoir, of means operated upon an emergency reduction in brake pipe pressure for supplying fluid under pressure from the auxiliary reservoir and emergency reservoir to the brake cylinder, and means operated upon an increase in brake pipe pressure after an emergency application for supplying fluid from the brake cylinder and the auxiliary reservoir to the brake pipe with communication from the emergency reservoir to the brake pipe cut off.

154. In a fluid pressure brake, the combination with a brake pipe, brake cylinder, auxiliary reservoir, and an emergency reservoir, of means operated upon an emergency reduction in brake pipe pressure for supplying fluid under pressure from the auxiliary reservoir and emergency reservoir to the brake cylinder, means operated upon an increase in brake pipe pressure after an emergency application for first supplying fluid from the brake cylinder and the auxiliary reservoir to the brake pipe, and means for then supplying fluid from the emergency reservoir to the auxiliary reservoir in releasing the brakes.

155. In a fluid pressure brake, the combination with a brake pipe, brake cylinder, auxiliary reservoir, and an emergency reservoir, of a brake controlling valve device operated upon an emergency reduction in brake pipe pressure for supplying fluid under pressure from the auxiliary reservoir to the brake cylinder, and operated upon an increase in brake pipe pressure for establishing communication from the emergency reservoir to the auxiliary reservoir, and an emergency valve device operated upon an emergency reduction in brake pipe pressure for supplying fluid under pressure from the emergency reservoir to the brake cylinder and upon an increase in brake pipe pressure for supplying fluid from the brake cylinder to the brake pipe with communication from the emergency reservoir to the brake pipe cut off.

156. In a fluid pressure brake, the combination with a brake pipe, brake cylinder, auxiliary reservoir, and an emergency reservoir, of means operated upon an emergency reduction in brake pipe pressure for supplying fluid under pressure from the auxiliary reservoir and emergency reservoir to the brake cylinder, means operated upon an increase in brake pipe pressure after an emergency application for first supplying fluid from the brake cylinder and the auxiliary reservoir to the brake pipe, with communication from the emergency reservoir to the brake pipe cut off, and means for then supplying fluid from the emergency reservoir to the auxiliary reservoir in releasing the brakes.

157. In a fluid pressure brake, the combination with a brake pipe, brake cylinder, auxiliary reservoir, and an emergency reservoir, of means operated upon an emergency reduction in brake pipe pressure for supplying fluid under pressure from the auxiliary reservoir and emergency reservoir to the brake cylinder, means operated upon an increase in brake pipe pressure after an emergency application for first supplying fluid from the brake cylinder and the auxiliary reservoir to the brake pipe, and means for then supplying fluid from the emergency reservoir to the auxiliary reservoir in releasing the brakes.

158. In a fluid pressure brake, the combination with a brake pipe, brake cylinder, auxiliary reservoir, and an emergency reservoir, of means operated upon an emergency reduction in brake pipe pressure for supplying fluid under pressure from the auxiliary reservoir and emergency reservoir to the brake cylinder, said means including an emergency valve device operated upon an increase in brake pipe pressure after an emergency application for first supplying fluid from the auxiliary reservoir and the brake cylinder to the brake pipe, and also including a triple valve device operated upon an increase in brake pipe pressure for then supplying fluid from the emergency reservoir to the auxiliary reservoir.

159. In a fluid pressure brake, the combination with a brake pipe, brake cylinder, auxiliary reservoir, and an emergency reservoir, of means including an emergency valve device and a triple valve device operated upon a sudden reduction in brake pipe pressure for supplying fluid under pressure from the auxiliary reservoir and emergency reservoir to the brake cylinder and operated upon an increase in brake pipe pressure for effecting the release of the brakes, said emergency valve device being operated to release position to first supply fluid from the auxiliary reservoir and the brake cylinder to the brake pipe and said triple valve device being operated to release position for then supplying fluid from the emergency reservoir to the auxiliary reservoir.

160. In a fluid pressure brake, the combination with a brake pipe, brake cylinder, auxiliary reservoir, and an emergency reservoir, of means operated upon an emergency reduction in brake pipe pressure for supplying fluid under pressure from the auxiliary reservoir and emergency reservoir to the brake cylinder, said means including an emergency valve device operated upon an increase in brake pipe pressure after an emergency application for first establishing a communication through which fluid is supplied from the auxiliary reservoir and the brake cylinder to the brake pipe and also including a triple valve device operated upon an increase in brake pipe pressure for then establishing a communication through which fluid is supplied from the emergency reservoir to the auxiliary reservoir.

161. In a fluid pressure brake, the combination with a brake pipe, brake cylinder, auxiliary reservoir, and an emergency reservoir, of means operated upon an emergency reduction in brake pipe pressure for supplying fluid under pressure from the auxiliary reservoir and emergency reservoir to the brake cylinder, said means including an emergency valve device operated upon an increase in brake pipe pressure after an emergency application for first establishing a communication through which fluid is supplied from the auxiliary reservoir and the brake cylinder to the brake pipe and also including a triple valve device operated upon an increase in brake pipe pressure for then establishing a communication connecting said auxiliary reservoir and emergency reservoir.

162. In a fluid pressure brake, the combination with a brake pipe, a brake cylinder and an auxiliary reservoir, of an emergency valve device operated upon a sudden reduction in brake pipe pressure for supplying fluid under pressure to the brake cylinder, and operated upon an increase in brake pipe pressure after a sudden reduction in brake pipe pressure for supplying fluid under pressure from the brake cylinder and auxiliary reservoir to the brake pipe, and a valve operative to close off the flow of fluid from the auxiliary reservoir to the brake pipe before the auxiliary reservoir equalizes into the brake pipe.

163. In a fluid pressure brake, the combination with a brake pipe, a brake cylinder and an auxiliary reservoir, of an emergency valve device operated upon a sudden reduction in brake pipe pressure for supplying fluid under pressure to the brake cylinder, and operated upon an increase in brake pipe pressure after a sudden reduction in brake pipe pressure for supplying fluid under pressure from the brake cylinder and auxiliary reservoir to the brake pipe, and means operative automatically to prevent the auxiliary reservoir from equalizing into the brake pipe.

164. In a fluid pressure brake, the combination with a brake pipe, a brake cylinder and an auxiliary reservoir, of an emergency valve device operated upon a sudden reduction in brake pipe pressure for supplying fluid under pressure to the brake cylinder, and operated upon an increase in brake pipe pressure after a sudden reduction in brake pipe pressure for supplying fluid under pressure from the brake cylinder and auxiliary reservoir to the brake pipe, and means operative to prevent the auxiliary reservoir pressure from reducing to that of the brake pipe.

165. In a fluid pressure brake, the combination with a brake pipe, a brake cylinder and an auxiliary reservoir, of an emergency valve device operated upon a sudden reduction in brake pipe pressure for supplying fluid under pressure to the brake cylinder, and operated upon an increase in brake pipe pressure after a sudden reduction in brake pipe pressure for supplying fluid under pressure from the brake cylinder and auxiliary reservoir to the brake pipe, and a ball valve for preventing back flow of fluid from the brake pipe to the brake cylinder and auxiliary reservoir when the brake pipe pressure is higher than the auxiliary reservoir and brake cylinder pressures, and a spring for seating said valve to close off the flow of fluid from the auxiliary reservoir and brake cylinder to the brake pipe before the brake pipe pressure has increased to that of the auxiliary reservoir.

166. In a fluid pressure brake, the combination with a brake pipe and a brake cylinder, of an emergency valve device operated to emergency position upon an emergency reduction in brake pipe pressure for supplying fluid under pressure to the brake cylinder and operated to an over-travel position upon an increase in brake pipe pressure after an emergency reduction in brake pipe pressure for supplying fluid under pressure to the brake pipe, and means operative to prevent the operation of said device from said over-travel position to emergency position in the event of the device being in over-travel position and a gradual reduction in brake pipe pressure is made to effect a service application of the brakes.

167. In a fluid pressure brake, the combination with a brake pipe and a brake cylinder, of an emergency valve device comprising a piston subject to the opposing pressures of the brake pipe and a chamber and valve means operated by said piston upon an emergency reduction in brake pipe pressure for supplying fluid under pressure to the brake cylinder, said piston and valve means having a service position in which fluid under pressure in said chamber is exhausted to the atmosphere and having a normal position in which communication from the chamber to the atmosphere is closed and also having an over-travel position in which fluid under pressure is supplied from the brake cylinder to the brake pipe, said piston and valve means being movable to said over-travel position upon an increase in brake pipe pressure after an emergency reduction in brake pipe pressure, said valve means being operative by said piston upon a gradual reduction in brake pipe pressure to vent fluid under pressure from said chamber in the event of the valve means being unintentionally held in over-travel position when the brakes are released.

168. An air brake apparatus including a brake pipe, a cylinder, an auxiliary reservoir, a triple valve device operative by differential pressures of the brake pipe and auxiliary reservoir, an emergency reservoir, a quick action chamber, an emergency valve device operative by differential pressures of the brake pipe and quick action chamber and normally actuable to apply the brakes only upon brake pipe reduction at greater than a service rate, and means operative upon brake pipe increase after emergency to effect a quick serial build-up of brake pipe pressure by back-dumping pressure from the auxiliary reservoir to the brake pipe.

169. An air brake apparatus including a brake pipe, a cylinder, an auxiliary reservoir, a triple valve device, an emergency reservoir, said triple valve device being movable from application position through a release position to an inner release position, means for effecting a substantially uniform, slow rate of recharge of both reservoirs with said triple valve device in either its release or inner position, and means for effecting a substantially uniform, slow rate of release of pressure from the cylinder with said triple valve device in either its release or inner position.

170. In a fluid pressure brake, the combination with a brake pipe, a reservoir normally charged with fluid under pressure, and a valve device operative upon a reduction in brake pipe pressure to supply fluid under pressure from said reservoir for effecting an application of the brakes, said valve device comprising a slide valve, a movable abutment subject on one side to the pressure of fluid in said reservoir for exerting a seating pressure on said slide valve, and a choke for restricting the rate of supply of fluid under pressure from said reservoir to said abutment.

171. In a fluid pressure brake, the combination with a brake pipe, a brake cylinder, a reservoir normally charged with fluid under pressure and a chamber normally charged with fluid under pressure, of a valve device operated upon a reduction in brake pipe pressure by the pressure of fluid in said chamber for supplying fluid under pressure from said reservoir to said brake cylinder, and for venting fluid under pressure from said chamber, said valve device comprising a slide valve, a movable abutment adapted to press said slide valve into engagement with its seat and having a chamber at one side in communication with said reservoir, and a choke in said communication.

172. In a fluid pressure brake, the combination with a brake pipe and an emergency reservoir, of valve means subject to the opposing pressures of the brake pipe and a chamber, and having a passage permitting excess fluid under pressure from said chamber to flow to said reservoir, and a check valve in said passage for preventing back flow from said reservoir to said chamber.

173. In a fluid pressure brake, the combination with a brake pipe, of an emergency valve device subject to the opposing pressures of the brake pipe and a chamber adapted to be charged with fluid under pressure from the brake pipe, an emergency reservoir having a communication with said chamber, through which communication excess fluid under pressure is adapted to flow from said chamber to the emergency reservoir, and a check valve in said communication for preventing back flow from said reservoir to said chamber.

174. In a fluid pressure brake, the combination of a brake pipe, a cylinder, an auxiliary reservoir, an emergency reservoir, a triple valve mechanism operative on gradual brake pipe reduction to supply the cylinder from the auxiliary reservoir, an emergency valve mechanism operative on rapid brake pipe reduction to supply the cylinder from the emergency reservoir, charging connections for charging both reservoirs controlled by the triple valve mechanism, and supplemental charging connections for charging the emergency reservoir independently of the triple valve mechanism.

175. In a fluid pressure brake, the combination of a brake pipe, a cylinder, an auxiliary reservoir, an emergency reservoir, a triple valve mechanism operative on gradual brake pipe reduction to supply the cylinder from the auxiliary reservoir, an emergency valve mechanism operative on rapid brake pipe reduction to supply the cylinder from the emergency reservoir, charging connections for charging both reservoirs controlled by the triple valve mechanism, a quick action chamber associated with the emergency valve mechanism, and a supplemental charging connection from the quick action chamber to the emergency reservoir adapted to minimize overcharge of the quick action chamber.

176. In combination, a brake pipe, a brake cylinder, an auxiliary reservoir, an emergency reservoir, a brake controlling valve mechanism movable to application position, release position and inner release or overtravel position, said brake controlling valve mechanism being movable upon higher than the normal rate of increase in brake pipe pressure to its over-travel position, means operative when the valve mechanism is in either release position to open a restricted charging communication from the brake pipe to the auxiliary reservoir and to open a restricted communication between said emergency reservoir and said auxiliary reservoir, whereby during releasing action a brake controlling mechanism at the head end of a train first passes fluid from the emergency reservoir to said auxiliary reservoir and draws upon brake pipe pressure only slightly to ensure rapid build-up of brake pipe pressure toward the rear of the train, and then effects charging of both reservoirs from the brake pipe.

177. In combination, a brake pipe, an emergency reservoir, a quick action chamber, an emergency valve mechanism movable between application position and release position and subject to opposing pressures of brake pipe and quick action chamber, a restricted charging port providing communication from the brake pipe to the quick action chamber in release position of the emergency mechanism, and a uni-directional communication from quick action chamber to emergency reservoir through which an excess of fluid pressure is adapted to flow from said chamber to said reservoir and adapted to prevent reverse flow, whereby overcharging of quick action chamber is minimized by flow from said chamber to said reservoir.

178. In a fluid pressure brake, the combination with a brake pipe and a chamber charged with fluid under pressure, of an equalizing valve device subject to the opposing pressures of the brake pipe and said chamber and movable to a brake applying position upon a reduction in brake pipe pressure and to a release position upon a subsequent increase in brake pipe pressure, the movable parts of the equalizing valve device making their full traverse in effecting either a service or an emergency application of the brakes, and valve means operated separately from the equalizing valve device upon an increase in brake pipe pressure in effecting the release of the brakes after either a service or an emergency application for venting fluid under pressure from said chamber for effecting movement of said equalizing valve device to release position, said equalizing valve device controlling communication through which fluid is vented from said chamber.

179. In a fluid pressure brake, the combination with a brake pipe and a chamber charged with fluid under pressure, of an equalizing valve device subject to the opposing pressures of the brake pipe and said chamber and movable to a brake applying position upon a reduction in brake pipe pressure and to a release position, upon a subsequent increase in brake pipe pressure, the movable parts of the equalizing valve device making their full traverse in effecting either a service or an emergency application of the brakes, and valve means operated separately from the equalizing valve device upon an increase in brake pipe pressure in effecting the release of the brakes after either a service or an emergency application for venting fluid under pressure from said chamber for effecting movement of said equalizing valve device to release position, said equalizing valve device controlling communication through which fluid is vented from said chamber and operative upon movement to release position to close said communication.

180. In a fluid pressure brake, the combination with a brake pipe and a chamber charged with fluid under pressure, of an equalizing valve device subject to the opposing pressures of the brake pipe and said chamber and movable to a brake applying position upon a reduction in brake pipe pressure and to a release position upon a subsequent increase in brake pipe pressure, the movable parts of the equalizing valve device making their full traverse in effecting either a service or an emergency application of the brakes, a valve separate from the equalizing valve device for venting fluid under pressure from said chamber for effecting movement of said equalizing valve device to release position, and a movable abutment operated separately from the equalizing valve device upon an increase in brake pipe pressure in effecting the release of the brakes after either a service or an emergency application for effecting the operation of said valve, said equalizing valve device controlling communication through which fluid is vented from said chamber.

181. In a fluid pressure brake, the combination with a brake pipe and a chamber charged with fluid under pressure, of an equalizing valve device subject to the opposing pressures of the brake pipe and said chamber and movable to a brake applying position upon a reduction in brake pipe pressure and to a release position upon a subsequent increase in brake pipe pressure, the movable parts of the equalizing valve device making their full traverse in effecting either a service or an emergency application of the brakes, a valve for venting fluid under pressure from said chamber for effecting movement of said equalizing valve device to release position, and a movable abutment separate from the equalizing valve device operated upon an increase in brake pipe pressure in effecting the release of the brakes after either a service or an emergency application for effecting the operation of said valve, and constant pressure means opposing the operation of said valve, said equalizing valve device controlling communication through which fluid is vented from said chamber by the operation of said valve.

182. In a fluid pressure brake, the combination with a brake pipe, an auxiliary reservoir from which fluid under pressure is supplied in effecting an application of the brakes, and a triple valve device constantly subject to the opposing pressures of the auxiliary reservoir and brake pipe, of valve means separate from the triple valve device and constantly subject to the brake pipe pressure and operative by an increase in brake pipe pressure in releasing the brakes after either a service or an emergency application for venting fluid under pressure from the auxiliary reservoir, said triple valve device being operative to control communication through which said valve means vents fluid from the auxiliary reservoir.

183. In a fluid pressure brake, the combination with a brake pipe, an auxiliary reservoir from which fluid under pressure is supplied in effecting an application of the brakes, and a triple valve device at all times subject to the opposing pressures of the auxiliary reservoir and brake pipe, of valve means separate from the triple valve device and operative by a small increase in brake pipe pressure over auxiliary reservoir pressure for venting fluid under pressure from the auxiliary reservoir in effecting the release of the brakes after either a service or an emergency application, said triple valve device controlling communication through which said valve means vents fluid from the auxiliary reservoir and being operative upon movement to release position to cut off said communication.

184. In a fluid pressure brake, the combination with a brake pipe, an auxiliary reservoir from which fluid under pressure is supplied in effecting an application of the brakes and a triple valve device constantly subject to the opposing pressures of the brake pipe and auxiliary reservoir, of valve means separate from the triple valve device and constantly subject to the opposing pressures of the brake pipe and auxiliary reservoir and operative by an increase in brake pipe pressure in effecting the release of the brakes after either a service or an emergency application for establishing a communication through which fluid under pressure is adapted to be vented from the auxiliary reservoir, and means included in the triple valve device operative to control the flow of fluid through said communication.

185. In a fluid pressure brake, the combination with a brake pipe, an auxiliary reservoir and a triple valve device subject to the opposing pressures of the brake pipe and auxiliary reservoir, operative upon a reduction in brake pipe pressure to effect an application of the brakes and operative upon an increase in brake pipe pressure to effect the release of the brakes, the moving parts of the triple valve device making their full traverse in effecting either a service or an emergency application of the brakes, of valve means separate from the triple valve device and constantly subject to the opposing pressures of the brake pipe and auxiliary reservoir and operative by an increase in brake pipe pressure in effecting the release of the brakes after either a service or an emergency application for establishing a communication through which fluid is adapted to be released from the auxiliary reservoir, and means included in said triple valve device operative to control said communication.

186. In a fluid pressure brake, the combination with a brake pipe, an auxiliary reservoir and a triple valve device subject to the opposing pressures of the brake pipe and auxiliary reservoir, operative upon a reduction in brake pipe pressure to effect an application of the brakes and operative upon an increase in brake pipe pressure to effect the release of the brakes, the moving parts of the triple valve device making their full traverse in effecting either a service or an emergency application of the brakes, of valve means separate from the triple valve device and subject to the opposing pressures of the brake pipe and auxiliary reservoir and operative by an increase in brake pipe pressure in effecting the release of the brakes after either a service or an emergency application for establishing a communication through which fluid under pressure is adapted to be released from the auxiliary reservoir, and a slide valve included in said triple valve device for controlling said communication.

187. In a fluid pressure brake, the combination with a brake pipe, an auxiliary reservoir and a triple valve device subject to the opposing pressures of the brake pipe and auxiliary reservoir, operative upon a reduction in brake pipe pressure to effect an application of the brakes and operative upon an increase in brake pipe pressure to effect a release of the brakes, the moving parts of the triple valve device making their full traverse in effecting either a service or an emergency application of the brakes, a passage through which fluid is adapted to be released from the auxiliary reservoir in releasing the brakes, valve means separate from the triple valve device and subject to the opposing pressures of the brake pipe and auxiliary reservoir and operative upon an increase in brake pipe pressure after either a service or an emergency application for establishing a communication from the auxiliary reservoir to said passage, and means included in said triple valve device operative to control the opening and closing of said passage to the atmosphere.

188. In a fluid pressure brake, the combination with a brake pipe, an auxiliary reservoir and a triple valve device subject to the opposing pressures of the brake pipe and auxiliary reservoir, operative upon a reduction in brake pipe pressure to effect an application of the brakes and operative upon an increase in brake pipe pressure to effect the release of the brakes, the moving parts of the triple valve device making their full traverse in effecting either a service or an emergency application of the brakes, a passage through which fluid is adapted to be released from the auxiliary reservoir in releasing the brakes, means included in said triple valve device for establishing a communication from said passage to the atmosphere when the triple valve device is in position to effect an application of the brakes and for closing said communication when the triple valve device is in a position to release the brakes, and valve means separate from the triple valve device and subject to the opposing pressures of the brake pipe and auxiliary reservoir operative upon an increase in brake pipe pressure in releasing the brakes after either a service or an emergency application for establishing a communication from the auxiliary reservoir to said passage.

189. In a fluid pressure brake, the combination with a brake pipe, an auxiliary reservoir and a triple valve device subject to the opposing pressures of the brake pipe and auxiliary reservoir, operative upon a reduction in brake pipe pressure to effect an application of the brakes and operative upon an increase in brake pipe pressure to effect the release of the brakes, the moving parts of the triple valve device making their full traverse in effecting either a service or an emergency application of the brakes, a passage through which fluid is adapted to be released from the auxiliary reservoir in releasing the brakes, means included in said triple valve device for establishing a communication from said passage to the atmosphere when the triple valve device is in position to effect an application of the brakes and for closing said communication when the triple valve device is in a position to release the brakes, and valve means separate from the triple valve device and operative upon an increase in brake pipe pressure over auxiliary reservoir pressure greater than that normally required to effect the operation of the triple valve device to release position after either a service or an emergency application for establishing a communication from said auxiliary reservoir to said passage.

190. In a fluid pressure brake, the combination with a brake pipe, an auxiliary reservoir and a triple valve device subject to the opposing pressures of the brake pipe and auxiliary reservoir, operative upon a reduction in brake pipe pressure to effect an application of the brakes and operative upon an increase in brake pipe pressure to effect the release of the brakes, the moving parts of the triple valve device making their full traverse in effecting either a service or an emergency application of the brakes, a passage through which fluid is adapted to be released from the auxiliary reservoir in releasing the brakes, a slide valve included in said triple valve device having a cavity for establishing a communication from said passage to the atmosphere when the triple valve device is in a brake applying position, said valve being operative to close said communication upon the operation of said triple valve device to release the brakes, and a valve device separate from the triple valve device and subject to the opposing pressures of the brake pipe and auxiliary reservoir and operative by an increase in brake pipe pressure after either a service or an emergency application for establishing communication from the auxiliary reservoir to said passage.

191. In a fluid pressure brake, the combination with a brake pipe, an auxiliary reservoir and a triple valve device subject to the opposing pressures of the brake pipe and auxiliary reservoir, operative upon a reduction in brake pipe pressure to effect an application of the brakes and operative upon an increase in brake pipe pressure to effect the release of the brakes, the moving parts of the triple valve device making their full traverse in effecting either a service or an emergency application of the brakes, a passage through which fluid is adapted to be released from the auxiliary reservoir in releasing the brakes, a slide valve included in said triple valve device for establishing a communication through which fluid under pressure is released to effect a release of the brakes when the triple valve device is in brake releasing position and for establishing a communication from said passage to the atmosphere when the triple valve device is in a brake applying position, and valve means separate from the triple valve device and operative upon an increase in brake pipe pressure in effecting the release of the brakes after either a service or an emergency application for establishing a communication from the auxiliary reservoir to said passage.

192. In a fluid pressure brake, the combination with a brake pipe, an auxiliary reservoir, a brake cylinder, and a triple valve device operative upon a reduction in brake pipe pressure to effect an application of the brakes and operative upon an increase in brake pipe pressure for effecting the release of the brakes, the moving parts of the triple valve device making their full traverse in effecting either a service or an emergency application of the brakes, valve means separate from the triple valve device operative by an increase in brake pipe pressure in releasing the brakes after either a service or an emergency application of the brakes for establishing a communication through which fluid under pressure is adapted to be vented from the auxiliary reservoir, a passage through which fluid under pressure vented from the auxiliary reservoir by said valve means flows, and means included in said triple valve device operative in the brake applying position of the triple valve device to establish a communication through which fluid under pressure is supplied to the brake cylinder to effect an application of the brakes and to establish a communication from said passage to the atmosphere and in the brake releasing position to close the last mentioned communication and to establish a communication through which the brake cylinder is open to the atmosphere.

193. In a fluid pressure brake, the combination with a brake pipe, an auxiliary reservoir, a brake cylinder, and a triple valve device operative upon a reduction in brake pipe pressure to effect an application of the brakes and operative upon an increase in brake pipe pressure for effecting the release of the brakes, the moving parts of the triple valve device making their full traverse in effecting either a service or an emergency application of the brakes, valve means separate from the triple valve device operative by an increase in brake pipe pressure in releasing the brakes after either a service or an emergency application of the brakes for establishing a communication through which fluid under pressure is adapted to be vented from the auxiliary reservoir, a passage through which fluid under pressure vented from the auxiliary reservoir by said valve means flows, and a slide valve included in said triple valve device having a cavity which, in the application position of the triple valve device, establishes a communication from said passage to the atmosphere and which in the release position of the triple valve device establishes communication from the brake cylinder to the atmosphere.

194. In a fluid pressure brake, the combination with a brake pipe, an auxiliary reservoir, a brake cylinder, and a triple valve device operative upon a reduction in brake pipe pressure to effect an application of the brakes and operative upon an increase in brake pipe pressure for effecting the release of the brakes, the moving parts of the triple valve device making their full traverse in effecting either a service or an emergency application of the brakes, valve means separate from the triple valve device operative by an increase in brake pipe pressure in releasing the brakes after either a service or an emergency application of the brakes for establishing a communication through which fluid under pressure is adapted to be vented from the auxiliary reservoir, a passage through which fluid under pressure vented from the auxiliary reservoir by said valve means flows, and a slide valve included in said triple valve device having a cavity which, in a release position of the triple valve device connects the brake cylinder to the atmosphere and which in the application position of the triple valve device connects said passage to the atmosphere.

195. In a fluid pressure brake, the combination with a brake pipe, an auxiliary reservoir, a brake cylinder, and a triple valve device operative upon a reduction in brake pipe pressure to effect an application of the brakes and operative upon an increase in brake pipe pressure for effecting the release of the brakes, the moving parts of the triple valve device making their full traverse in effecting either a service or an emergency application of the brakes, valve means separate from the triple valve device operative by an increase in brake pipe pressure in releasing the brakes after either a service or an emergency application of the brakes for establishing a communication through which fluid under pressure is adapted to be vented from the auxiliary reservoir, a passage through which fluid under pressure vented from the auxiliary reservoir by said valve means flows, and a slide valve included in said triple valve device which in the release position of the triple valve device establishes a communication through which the brake cylinder is open to the atmosphere and laps said passage, and which as the triple valve device is operated to application position and from application position toward release position establishes a communication from said passage to the atmosphere.

196. In a fluid pressure brake, the combination with a brake pipe, an auxiliary reservoir, a brake cylinder, and a triple valve device operative upon a reduction in brake pipe pressure to effect an application of the brakes and operative upon an increase in brake pipe pressure for effecting the release of the brakes, the moving parts of the triple valve device making their full traverse in effecting either a service or an emergency application of the brakes, valve means separate from the triple valve device operative by an increase in brake pipe pressure in releasing the brakes after either a service or an emergency application of the brakes for establishing a communication through which fluid under pressure is adapted to be vented from the auxiliary reservoir, a passage through which fluid under pressure vented from the auxiliary reservoir by said valve means flows, and a slide valve included in said triple valve device having a cavity which, in the release position of the triple valve device connects the brake cylinder to the atmosphere and which in the application position of the triple valve device connects said passage to the atmosphere.

197. In a fluid pressure brake equipment, a reservoir, a brake pipe, a brake cylinder, a brake controlling mechanism having a main valve and an auxiliary valve, movable from application position to release position and adapted upon increase in brake pipe pressure to charge said reservoir, said mechanism being subject to the opposing pressures of the brake pipe and the reservoir, and communications successively controlled as follows by said controlling mechanism during movement from application position to release position: a venting communication from the cylinder adapted to be opened by the controlling mechanism, a feed communication to the reservoir adapted to be opened upon further movement of said control mechanism, and a communication from auxiliary reservoir to a seating pressure unloading device for the main valve of the controlling mechanism adapted to be opened upon final movement of the controlling mechanism.

198. In a fluid pressure brake equipment, a reservoir, a brake pipe, a brake cylinder, a brake controlling mechanism having a main valve and an auxiliary valve, movable from application position to release position and adapted upon increase in brake pipe pressure to charge said reservoir, said mechanism being subject to the opposing pressures of the brake pipe and the reservoir, and communications successively controlled as follows by said controlling mechanism during movement from application position to release position: a venting communication from the cylinder adapted to be opened by the controlling mechanism, a feed communication to the reservoir adapted to be opened upon further movement of said control mechanism, and a communication from the brake pipe to the seat of the auxiliary valve of the controlling mechanism adapted to be closed upon final movement of the controlling mechanism.

199. In a fluid pressure brake, the combination with a brake pipe, brake cylinder, auxiliary reservoir, and a brake controlling valve device operated upon a reduction in brake pipe pressure for supplying fluid under pressure from the auxiliary reservoir to the brake cylinder, of a valve device operated upon a reduction in brake pipe pressure for controlling a braking operation and operated upon a subsequent increase in brake pipe pressure for venting fluid from the auxiliary reservoir to facilitate the movement of the brake controlling valve device to release position.

200. In a fluid pressure brake, the combination with a brake pipe, brake cylinder, auxiliary reservoir, and a brake controlling valve device operated upon a reduction in brake pipe pressure for supplying fluid under pressure from the auxiliary reservoir to the brake cylinder, of a valve device operated upon a sudden reduction in brake pipe pressure for initiating an emergency braking action and operated upon a subsequent increase in brake pipe pressure for venting fluid from the auxiliary reservoir to facilitate the release movement of the brake controlling valve device.

201. In a fluid pressure brake, the combination with a brake pipe, brake cylinder, auxiliary reservoir, and a brake controlling valve device operated upon a reduction in brake pipe pressure for supplying fluid under pressure from the auxiliary reservoir to the brake cylinder, of a valve device operated upon a sudden reduction in brake pipe pressure for initiating an emergency braking action and operated upon a subsequent increase in brake pipe pressure for venting fluid from the auxiliary reservoir to facilitate the release movement of the brake controlling valve device, and means operated upon a predetermined increase in brake pipe pressure over auxiliary reservoir pressure for also venting fluid from the auxiliary reservoir.

202. Fluid pressure brake equipment including, in combination with a brake pipe, a brake cylinder, a local fluid pressure reservoir, a brake controlling mechanism under the influence of differential pressures of the brake pipe and reservoir and operative upon a reduction in brake pipe pressure to supply fluid under pressure to the cylinder to apply the brakes and operative upon an increase in brake pipe pressure to vent fluid from the cylinder to release the brakes, and means for facilitating operation of said mechanism in releasing the brakes comprising means for effecting a local build up of brake pipe pressure and means for effecting a local reduction of reservoir pressure below the brake pipe pressure.

203. Fluid pressure brake equipment including, in combination with a brake pipe, a brake cylinder, a local fluid pressure reservoir, a brake controlling mechanism under the influence of differential pressures of the brake pipe and reservoir and operative upon a reduction in brake pipe pressure to supply fluid under pressure to the cylinder to apply the brakes and operative under an increase in brake pipe pressure to vent fluid from the cylinder to release the brakes, and means for facilitating operation of said mechanism in releasing the brakes comprising means for delivering fluid under pressure from the reservoir to the brake pipe to facilitate local build-up of brake pipe pressure and means for venting air from the reservoir to atmosphere to ensure the necessary differential pressure.

204. Fluid pressure brake equipment including, in combination with a brake pipe, a brake cylinder, a local fluid pressure reservoir, a brake controlling mechanism under the influence of differential pressures of the brake pipe and reservoir and operative upon a reduction in brake pipe pressure to supply fluid under pressure to the cylinder to apply the brakes and operative upon an increase in brake pipe pressure to vent fluid from the cylinder to release the brakes, and means for facilitating operation of said mechanism in releasing the brakes comprising means for delivering fluid from the cylinder to the brake pipe to produce a local build up of brake pipe pressure and means for venting fluid from the reservoir to ensure the necessary differential pressure.

205. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir and adapted to effect service operations of the brakes, an emergency valve mechanism subject to opposing pressures of the brake pipe and quick action chamber and adapted to effect emergency operations of the brakes, and release ensuring mechanism operative upon brake pipe increase to bleed down auxiliary reservoir pressure.

206. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir and adapted to effect service operations of the brakes, an emergency valve mechanism subject to opposing pressures of the brake pipe and quick action chamber and adapted to effect emergency operations of the brakes, and release ensuring means included in the emergency valve mechanism operative upon a brake pipe pressure increase after an emergency application to bleed down auxiliary reservoir pressure into the brake pipe and means operative upon a further increase in brake pipe pressure to then vent auxiliary reservoir pressure to the atmosphere, whereby to facilitate release.

207. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir and adapted to effect service operations of the brakes, an emergency valve mechanism subject to opposing pressures of the brake pipe and quick action chamber and adapted to effect emergency operations of the brakes, and release ensuring mechanism operative upon a brake pipe increase after service or emergency applications to vent auxiliary reservoir pressure to the atmosphere and means included in the emergency valve mechanism operative upon the brake pipe increase after emergency to vent auxiliary reservoir pressure into the brake pipe prior to the release insuring mechanism operating to vent fluid from the auxiliary reservoir to the atmosphere.

208. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir and adapted upon brake pipe reduction at either a service or emergency rate to admit fluid from the auxiliary reservoir to the cylinder, an emergency valve mechanism subject to opposing pressures of the brake pipe and quick action chamber and adapted upon brake pipe reduction only at an emergency rate to admit fluid from the emergency reservoir to the cylinder, and release ensuring mechanism operative upon brake pipe increase to bleed down auxiliary reservoir pressure.

209. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir and adapted upon brake pipe reduction at either a service or emergency rate to admit fluid from the auxiliary reservoir to the cylinder, an emergency valve mechanism subject to opposing pressures of the brake pipe and quick action chamber and adapted upon brake pipe reduction only at an emergency rate to admit fluid from the emergency reservoir to the cylinder, and release ensuring mechanism including means operative upon brake pipe increase after emergency application to vent auxiliary reservoir pressure to the brake pipe with the emergency reservoir cut off and means operative upon brake pipe increase after service or emergency application to vent auxiliary reservoir pressure to the atmosphere.

210. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir and adapted upon brake pipe reduction at either a service or emergency rate to admit fluid from the auxiliary reservoir to the cylinder, an emergency valve mechanism subject to opposing pressures of the brake pipe and quick action chamber and adapted upon brake pipe reduction only at an emergency rate to admit fluid from the emergency reservoir to the cylinder, and mechanism for facilitating release operations including means operative upon an emergency application automatically to bleed down the quick action chamber pressure and means operative upon a brake pipe increase to bleed down auxiliary reservoir pressure.

211. In a valve device comprising a casing having an inlet passage and an outlet passage, and valve means operative to open and close communication from said inlet passage to said outlet passage, said valve means comprising a substantially rigid member, a valve carried by said member, a seat for said valve, a movable plunger operatively engaging said member, means acting through the medium of said plunger and member for normally maintaining said valve seated to close communication from the inlet passage to the outlet passage, means operative to unseat said valve, and means carried by said member and operatively engaging said plunger for maintaining said member and valve against lateral movement relative to the valve seat and plunger.

212. In a valve device comprising a casing having an inlet passage and an outlet passage, and valve means operative to open and close communication from said inlet passage to said outlet passage, said valve means comprising a substantially rigid member, a valve carried by said member, a seat for said valve, a movable plunger slidably guided in said casing operatively engaging said member, means acting through the medium of said plunger and member for normally maintaining said valve seated, means operative to unseat said valve, and means carried by said member and interlocking with said plunger to maintain said member and valve against lateral movement relative to said valve seat and plunger.

213. In a valve device comprising a casing having an inlet passage and an outlet passage, and valve means operative to open and close communication from said inlet passage to said outlet passage, said valve means comprising a substantially rigid member, a valve on one side of said member and carried by the member, a seat for said valve, a movable plunger slidably guided in said casing operatively engaging the other side of said member, means acting through the medium of said plunger and member for normally maintaining said valve seated, means operative to unseat said valve to open communication from the inlet passage to the outlet passage, and means on said other side of said member carried by the member and interlocking with said plunger to maintain said valve and member against lateral movement relative to said seat.

214. In a valve device comprising a casing having an inlet passage and an outlet passage, and valve means operative to open and close communication from said inlet passage to said outlet passage, said valve means comprising a substantially rigid member, a valve on one side of said member and carried by the member, a seat for said valve, a movable plunger slidably guided in said casing operatively engaging the other side of said member, means acting through the medium of said plunger and member for normally maintaining said valve seated, means operative to unseat said valve to open communication from the inlet passage to the outlet passage, and means on said other side of said member integrally connected with said valve and engaging with said plunger to maintain the valve and member against lateral movement relative to the valve seat and plunger.

215. In a valve device comprising a casing having an inlet passage and an outlet passage, and valve means operative to open and close communiation from said inlet passage to said outlet passage, said valve means comprising a substantially rigid member, a valve on one side of said member and carried by the member, a seat for said valve, a movable plunger slidably guided in said casing operatively engaging the other side of said member, means acting through the medium of said plunger and member for normally maintaining said valve seated, means engaging said member beyond the outer edge of said valve operative to move said member to unseat said valve, to open communication from the inlet passage to the outlet passage, and means on said other side of the member extending into an opening in the end of said plunger and cooperating with said plunger to maintain said valve and member against lateral movement relative to the valve seat.

216. In a fluid pressure brake, the combination with a brake pipe and a brake cylinder, of valve means having a release position and an application position and movable upon a reduction in brake pipe pressure from release position to application position for establishing a communication through which fluid under pressure is supplied to the brake cylinder and movable upon an increase in brake pipe pressure from application position to release position to establish a communication through which fluid under pressure is vented from the brake cylinder to the atmosphere, said valve means comprising a main slide valve having two quick service ports through which, in effecting an application of the brakes, fluid under pressure is adapted to be vented from the brake pipe before the first mentioned communication is established, one of said ports in the normal release position of the valve being in communication with the brake pipe and the other of said ports being in communication with a passage through which fluid vented from the brake pipe flows, said ports being out of communication with said brake pipe and passage when said valve is in application position and during the traverse of said valve toward release position being brought into full registration with the brake pipe and passage at substantially the same time as the second mentioned communication is cracked open.

217. In a fluid pressure brake, the combination with a brake pipe and a brake cylinder, of valve means having a release position and an application position and movable upon a reduction in brake pipe pressure from release position to application position for establishing a communication through which fluid under pressure is supplied to the brake cylinder and movable upon an increase in brake pipe pressure from application position to release position to establish a communication through which fluid under pressure is vented from the brake cylinder to the atmosphere, said valve means comprising a main slide valve having two quick service ports through which, in effecting an application of the brakes, fluid under pressure is adapted to be vented from the brake pipe before the first mentioned communication is established, one of said ports in the normal release position of the valve being in communication with the brake pipe and the other of said ports being in communication with a passage through which fluid vented from the brake pipe flows, said ports being out of communication with said brake pipe and passage when said valve is in application position and during the traverse of said valve toward release position being brought into full registration with the brake pipe and passage before the second mentioned communication is fully open.

218. In a fluid pressure brake, the combination with a brake pipe and a brake cylinder, of valve means having a release position and an application position and movable upon a reduction in brake pipe pressure from release position to application position for establishing a communication through which fluid under pressure is supplied to the brake cylinder and movable upon an increase in brake pipe pressure from application position to release position to establish a communication through which fluid under pressure is vented from the brake cylinder to the atmosphere, said valve means comprising a main slide valve having two quick service ports through which, in effecting an application of the brakes, fluid under pressure is adapted to be vented from the brake pipe before the first mentioned communication is established, one of said ports in the normal release position of the valve being in communication with the brake pipe and the other of said ports being in communication with a passage through which fluid vented from the brake pipe flows, said ports being out of communication with said brake pipe and passage when said valve is in application position and during the traverse of said valve toward release position being brought into full registration with the brake pipe and passage before the slide valve is returned to normal release position.

219. In a fluid pressure brake, the combination with a brake pipe, an auxiliary reservoir and a brake cylinder, of a triple valve device comprising a main valve and an auxiliary valve having a movement relative to the main valve and a piston operated upon a reduction in brake pipe pressure for moving said valves to brake application position and operated upon an increase in brake pipe pressure for moving said valves to release position, said main valve having a service port and two quick service ports, one of said quick service ports being normally in communication with said brake pipe and the other of said quick service ports being normally in communication with a passage to which fluid under pressure is adapted to be vented from the brake pipe, means operative upon movement of the auxiliary valve toward application position relative to the main valve for establishing a communication from one of said quick service ports to the other, said main valve in its traverse toward application position first closing the quick service communication from the brake pipe to said passage and then establishing, through the service port, a communication through which fluid under pressure is supplied from the auxiliary reservoir to the brake cylinder to effect an application of the brakes, and in its traverse from application position toward release position first closing off the communication from said service port to the brake cylinder, then reestablishing the communication from the brake pipe to one of said quick service ports and the communication from the other of said quick service ports to said passage, and then finally establishing a communication through which fluid under pressure is vented from the brake cylinder to effect the release of the brakes, the last mentioned communication being cracked open at substantially the same time as the quick service ports are brought into substantially full open communication with the brake pipe and passage.

220. In a fluid pressure brake, the combination with a brake pipe, an auxiliary reservoir and a brake cylinder, of a triple valve device comprising a main valve and an auxiliary valve having a movement relative to the main valve and a piston operated upon a reduction in brake pipe pressure for moving said valves to brake application position and operated upon an increase in brake pipe pressure for moving said valves to release position and for controlling a normally open feed groove through which fluid under pressure is supplied from the brake pipe to the auxiliary reservoir, said main valve having a service port and two quick service ports, one of said quick service ports being normally in communication with said brake pipe, and the other of said quick service ports being normally in communication with a passage to which fluid under pressure is adapted to be vented from the brake pipe, means operative upon movement of the auxiliary valve toward application position relative to the main valve for establishing a communication from one of said quick service ports to the other, said feed groove being closed upon the initial movement of the piston toward application position and said main valve in its traverse toward application position first closing the quick service communication from the brake pipe to said passage and then establishing, through the service port, a communication through which fluid under pressure is supplied from the auxiliary reservoir to the brake cylinder to effect an application of the brakes, and in its traverse from application position toward release position first closing off the communication from said service port to the brake cylinder, then reestablishing the communication from the brake pipe to one of said quick service ports and the communication from the other of said quick service ports to said passage, and then finally establishing a communication through which fluid under pressure is vented from the brake cylinder to effect the release of the brakes, the quick service communication and the last mentioned communication being established in advance of the piston opening said feed groove.

221. In a fluid pressure brake, the combination with a brake pipe, an auxiliary reservoir and a brake cylinder, of a triple valve device comprising a main valve and an auxiliary valve having a movement relative to the main valve and a piston operated upon a reduction in brake pipe pressure for moving said valves to brake application position and operated upon an increase in brake pipe pressure for moving said valves to release position, and for controlling a normally open feed groove through which fluid under pressure is supplied from the brake pipe to the auxiliary reservoir, said main valve having a service port and two quick service ports, one of said quick service ports being normally in communication with said brake pipe and the other of said quick service ports being normally in communication with a passage to which fluid under pressure is adapted to be vented from the brake pipe, means operative upon movement of the auxiliary valve toward application position relative to the main valve for establishing a communication from one of said quick service ports to the other, said feed groove being closed upon the initial movement of the piston toward application position and said main valve in its traverse toward application position first closing the quick service communication from the brake pipe to said passage and then establishing, through the service port, a communication through which fluid under pressure is supplied from the auxiliary reservoir to the brake cylinder to effect an application of the brakes, and in its traverse from application position toward release position first closing off the communication from said service port to the brake cylinder, then reestablishing the communication from the brake pipe to one of said quick service ports and the communication from the other of said quick service ports to said passage, and then finally establishing a communication through which fluid under pressure is vented from the brake cylinder to effect the release of the brakes, the quick service communication through the main valve being fully established in advance of the piston opening said feed groove.

222. In a fluid pressure brake, the combination with a brake pipe, an auxiliary reservoir and a brake cylinder, of a triple valve device comprising a main valve and an auxiliary valve having a movement relative to the main valve and a piston operated upon a reduction in brake pipe pressure for moving said valves to brake application position and operated upon an increase in brake pipe pressure for moving said valves to release position, and for controlling a normally open feed groove through which fluid under pressure is supplied from the brake pipe to the auxiliary reservoir, said main valve having a service port and two quick service ports, one of said quick service ports being normally in communication with said brake pipe and the other of said quick service ports being normally in communication with a passage to which fluid under pressure is adapted to be vented from the brake pipe, means operative upon movement of the auxiliary valve toward application position relative to the main valve for establishing a communication from one of said quick service ports to the other, said feed groove being closed upon the initial movement of the piston toward application position and said main valve in its traverse toward application position first closing the quick service communication from the brake pipe to said passage and then establishing, through the service port, a communication through which fluid under pressure is supplied from the auxiliary reservoir to the brake cylinder to effect an application of the brakes, and in its traverse from application position toward release position first closing off the communication from said service port to the brake cylinder, then reestablishing the communication from the brake pipe to one of said quick service ports and the communication from the other of said quick service ports to said passage, and then finally establishing a communication through which fluid under pressure is vented from the brake cylinder to effect the release of the brakes, the quick service communication through the main valve being fully established, and the communication through which fluid is vented from the brake cylinder being partially opened in advance of the piston opening said feed groove.

223. In a fluid pressure brake, the combination with a brake cylinder, of an emergency reservoir from which fluid under pressure is adapted to be supplied to the cylinder in effecting an emergency application of the brakes, an emergency valve device for controlling communication through which fluid under pressure is supplied from said reservoir to said cylinder, and a triple valve device having means for controlling delivery of fluid to the cylinder in effecting a service application of the brakes and venting fluid therefrom in releasing the brakes and having means for controlling the charging of said emergency reservoir with fluid under pressure at a restricted rate.

224. Fluid pressure brake equipment including a brake pipe; brake cylinder means; local fluid pressure storage means; brake controlling mechanism under the influence of differential pressures in the brake pipe and storage means, said mechanism including a service brake application valve structure operative upon a relatively gradual brake pipe reduction to supply fluid under pressure to said cylinder means to apply the brakes, and operative upon an increase in brake pipe pressure to vent fluid from said cylinder means to release the brakes, and said mechanism further including an emergency brake application valve structure operative upon a relatively sudden reduction in brake pipe pressure to supply fluid under pressure to said brake cylinder means; means associated with said service valve structure operative automatically to ensure continuance of a brake application up to a substantially predetermined value upon initiation of a service application; and means associated with said emergency valve structure operative automatically to ensure continuance of a brake application at a fast rate up to a substantially predetermined value upon initiation of an emergency application.

225. Fluid pressure brake equipment including a brake pipe; brake cylinder means; local fluid pressure storage means; brake controlling mechanism under the influence of differential pressures in the brake pipe and storage means, said mechanism including a service brake application valve structure operative upon a relatively gradual brake pipe reduction to supply fluid under pressure to said cylinder means to apply the brakes, and operative upon an increase in brake pipe pressure to vent fluid from said cylinder means to release the brakes, and said mechanism further including an emergency brake application valve structure operative upon a relatively sudden reduction in brake pipe pressure to supply fluid under pressure to said brake cylinder means; means associated with said service valve structure operative automatically to ensure continuance of a brake application up to a substantially predetermined value upon initiation of service application; and means associated with said emergency valve structure operative automatically to ensure continuance of a brake application at a fast rate up to a greater predetermined value upon intiation of an emergency application.

226. Fluid pressure brake equipment including a brake pipe; brake cylinder means; local fluid pressure storage means; brake controlling mechanism under the influence of differential pressures in the brake pipe and storage means, said mechanism including a service brake application valve structure operative upon a relatively gradual brake pipe reduction to supply fluid under pressure to said cylinder means to apply the brakes, and operative upon an increase in brake pipe pressure to vent fluid from said cylinder means to release the brakes, and said mechanism further including an emergency brake application valve structure operative upon a relatively sudden reduction in brake pipe pressure to supply fluid under pressure to said brake cylinder means; means associated with said service valve structure, operative automatically to ensure continuance of a brake application up to a substantially predetermined value upon initiation of service application by one brake pipe reduction, and operative upon a succeeding brake pipe reduction to supply additional fluid pressure to the cylinder means substantially under the direct control of the engineer; and means associated with said emergency valve structure operative automatically to ensure continuance of a brake application at a fast rate up to a substantially predetermined value upon initiation of an emergency application.

227. Fluid pressure brake equipment including a brake pipe; brake cylinder means; local fluid pressure storage means; brake controlling mechanism under the influence of differential pressures in the brake pipe and storage means, said mechanism including a service brake application valve structure operative upon a relatively gradual brake pipe reduction to supply fluid under pressure to said cylinder means to apply the brakes, and operative upon an increase in brake pipe pressure to vent fluid from said cylinder means to release the brakes, and said mechanism further including an emergency brake application valve structure operative upon a relatively sudden reduction in brake pipe pressure to supply fluid under pressure to said brake cylinder means; means associated with said service valve structure, operative automatically to ensure continuance of a brake application up to a substantially predetermined value upon initiation of service application by one brake pipe reduction, and operative upon a succeeding brake pipe reduction to supply additional fluid pressure to the cylinder means substantially under the direct control of the engineer; means associated with said emergency valve structure operative automatically to ensure continuance of a brake application up to a substantially predetermined value upon initiation of emergency application; and means associated with said emergency valve structure and automatically operative in timed relation to said predetermined emergency application, to increase the emergency application.

228. Fluid pressure brake equipment for cars of a train including, for each car equipped, in combination with a brake pipe, a brake cylinder, local fluid pressure storage means, and a brake controlling mechanism subject to differential pressures in the brake pipe and storage means and operative upon a decrease in brake pipe pressure to supply fluid to the cylinder to apply the brakes and upon an increase in brake pipe pressure to vent fluid from the cylinder to release the brakes, said mechanism including valve means operative upon one relatively gradual or service brake pipe reduction to supply fluid to said cylinder from the brake pipe and further to supply fluid to the cylinder from said storage means, means constantly subject to brake cylinder pressure and operative upon the build-up of a predetermined brake cylinder pressure to close off the supply of fluid from the brake pipe to said cylinder during a succeeding relatively gradual or service brake pipe reduction, and valve means operative upon a relatively rapid or emergency brake pipe reduction to locally vent the brake pipe in order to propagate quick serial action throughout the length of the train and to supply fluid under pressure from the storage means to the cylinder.

229. Fluid pressure brake equipment for cars of a train including, for each car equipped, in combination with a brake pipe, a brake cylinder, an auxiliary reservoir, an emergency reservoir, and a brake controlling mechanism subject to differential pressures in the brake pipe and at least one of said reservoirs and operative upon a decrease in brake pipe pressure to supply fluid to the cylinder to apply the brakes and upon an increase in brake pipe pressure to vent fluid from the cylinder to release the brakes, said mechanism embodying apparatus operative upon one relatively gradual or service brake pipe reduction to supply fluid to said cylinder from the brake pipe and further to supply fluid to the cylinder from said auxiliary reservoir, means operative upon the build-up of a predetermined brake cylinder pressure to close off the supply of fluid from the brake pipe to said cylinder during a succeeding relatively gradual or service brake pipe reduction, and valve means operative upon a relatively rapid or emergency brake pipe reduction to locally vent the brake pipe in order to propagate quick serial action throughout the length of the train and cooperating with said apparatus to supply fluid under pressure from both of said reservoirs to the cylinder.

230. In a fluid pressure brake, the combination with a brake pipe, of a brake cylinder, an auxiliary reservoir, an emergency reservoir, a quick action chamber, a triple valve mechanism subject to opposing pressures of the brake pipe and auxiliary reservoir to effect service operations of the brakes, an emergency valve mechanism subject to opposing pressures of the brake pipe and quick action chamber to effect emergency operations of the brakes, and mechanism for automatically raising brake cylinder pressure to a predetermined degree upon any initiation of a service application and for controlling build-up of brake cylinder pressure in a plurality of stages in any emergency application.

231. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir to effect service operations of the brakes, an emergency valve mechanism subject to opposing pressures of the brake pipe and quick action chamber to effect emergency operations of the brakes, a local service venting mechanism including means constantly subject to brake cylinder pressure and arranged to vent the brake pipe to the cylinder and to effect uniform predetermined minimum cylinder pressure on initial service reduction in brake pipe pressure, and a quick action venting mechanism operative upon emergency application of the brakes to vent the brake pipe to the atmosphere.

232. In a fluid pressure brake, the combination of a brake pipe, a brake cylinder, an auxiliary reservoir, an emergency reservoir, a quick action chamber, a triple valve mechanism subject to opposing pressures of the brake pipe and auxiliary reservoir and adapted upon service or emergency rate of reduction of brake pipe pressure to effect local quick service venting of the brake pipe and to deliver fluid from the auxiliary reservoir to the cylinder, an emergency valve mechanism subject to opposing pressures of the brake pipe and quick action chamber and adapted only upon an emergency rate of reduction of brake pipe pressure to locally vent the brake pipe and to supply fluid from the emergency reservoir to the cylinder, and quick service modifying mechanism constantly subject to brake cylinder pressure and arranged to control local venting in service according to cylinder pressure.

233. In combination, a brake pipe, a brake cylinder, local means for storage of fluid for brake operation, a quick action chamber, service brake controlling mechanism including main and auxiliary valves and operative by differential pressures of the brake pipe and storage means and having means of initiating local quick service reduction of brake pipe pressure by its movement of the auxiliary valve prior to movement of the main valve, emergency brake controlling mechanism including main and auxiliary valves and operative by differential pressures of the brake pipe and quick action chamber and having means for effecting a local emergency brake pipe reduction by its movement of the auxiliary valve prior to movement of the main valve, and means tending to prevent operation of the emergency mechanism upon normal service reductions of brake pipe pressure.

234. Fluid pressure brake equipment including, in combination, a brake pipe, a brake cylinder, means for local storage of fluid under pressure, a service application mechanism operative upon a brake pipe reduction first to initiate a local quick service brake pipe venting and then to admit fluid from the storage means to said cylinder, an emergency application mechanism operative upon an emergency rate of brake pipe reduction first to initiate a local quick action brake pipe venting and then to admit fluid from the storage means to said cylinder, yielding means of substantially fixed but light resistance opposing operation of the service mechanism to locally vent the brake pipe, yielding means of substantially fixed but light resistance opposing operation of the emergency mechanism to locally vent the brake pipe, and each of said yielding means being respectively of less resistance than the resistance of the application mechanism with which it is associated whereby the operation of the equipment is stabilized.

235. Fluid pressure brake equipment including, in combination, a brake pipe, a brake cylinder, means for local storage of fluid under pressure, a service application mechanism operative upon a brake pipe reduction first to initiate a local quick service brake pipe venting and then to admit fluid from the storage means to said cylinder, an emergency application mechanism operative upon an emergency rate of brake pipe reduction first to initiate a local quick action brake pipe venting and then to admit fluid from the storage means to said cylinder, yielding means of substantially fixed but light resistance opposing operation of the service mechanism to locally vent the brake pipe, yielding means of substantially fixed but light resistance opposing operation of the emergency mechanism to locally vent the brake pipe, and each of said yielding means being respectively of less resistance than the resistance of the application mechanism with which it is associated whereby the operation of the equipment is stabilized, and means for preventing the overcoming of the resistance of the yielding means associated with the emergency mechanism when a brake pipe reduction at a service rate is made.

236. Fluid pressure brake equipment for cars of a train, including, for each car equipped, in combination with a brake pipe, a brake cylinder, a local fluid pressure reservoir, a brake controlling mechanism under the influence of differential pressures of brake pipe and reservoir, and operative upon a reduction in brake pipe pressure to supply fluid under pressure to said cylinder to apply the brakes and upon an increase in brake pipe pressure to vent fluid from said cylinder to release the brakes and to recharge said reservoir, said mechanism incorporating brake controlling valve structure including means operative upon an intial brake pipe reduction to locally vent fluid from the brake pipe whereby to ensure rapid propagation of serial action throughout the length of the train, and valve means operative upon said initial brake pipe reduction to supply fluid under pressure from the reservoir and brake pipe to the cylinder up to a substantially predeterminedly limited cylinder pressure, means for retaining cylinder pressure during a recharge, said valve means further being operative upon a reapplication to supply additional fluid under pressure from said reservoir to the brake cylinder to increase the pressure therein, the communication between the brake pipe and the cylinder being closed during said reapplication.

237. In a fluid pressure brake equipment, the combination of a brake pipe, a brake cylinder, a local fluid pressure reservoir, a brake controlling mechanism operative upon a brake pipe reduction to admit fluid from the reservoir to the cylinder and operative upon a brake pipe increase to vent fluid from the cylinder, means operative upon an initial brake application to produce local quick service venting from the brake pipe, means operative by brake cylinder pressure to cut off the quick service venting when a predetermined brake cylinder pressure is obtained so as to prevent quick service venting upon a second brake pipe reduction in the same application of the brakes, and means operative upon a reapplication, with a predetermined pressure in the cylinder, to effect local quick service venting of the brake pipe of lesser magnitude than the first mentioned venting.

238. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means automatically operative under the influence of cylinder pressure to normally build up cylinder pressure to a predetermined limit upon an initial decrease in brake pipe pressure, said valve means being operative upon succeeding decreases in brake pipe pressure of said one brake application to admit additional fluid to the cylinder substantially without predetermined limitations, and means for retaining pressure in the cylinder to a predetermined value, and said valve means further being operative upon a decrease in brake pipe pressure to effect a succeeding brake application to supply additional fluid to the cylinder substantially without predetermined limitations.

239. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means automatically operative under the influence of cylinder pressure to normally build up cylinder pressure to a predetermined limit upon an initial decrease in brake pipe pressure, said valve means being operative upon succeeding decreases in brake pipe pressure of said one brake application to admit additional fluid to the cylinder substantially without predetermined limitations, and means for retaining pressure in the cylinder to a predetermined value, and said valve means further being operative upon a decrease in brake pipe pressure to effect a succeeding brake application to locally vent the brake pipe in order to ensure rapid propagation of serial action throughout the length of the train on said succeeding brake application and to supply additional fluid to the cylinder substantially without predetermined limitations.

240. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means automatically operative under the influence of cylinder pressure to normally build up cylinder pressure to a predetermined limit upon an initial decrease in brake pipe pressure, said valve means being movable upon succeeding decreases in brake pipe pressure of said one brake application to admit additional fluid to the cylinder substantially without predetermined limitations, means for retaining pressure in the cylinder to a predetermined value, and said valve means further being operative upon a brake decrease in pipe pressure to effect a succeeding brake application to supply additional fluid to the cylinder substantially without predetermined limitations, and means associated with said valve means providing decreased resistance to valve movement during decreases in brake pipe pressure of a succeeding application as compared to said initial decrease in brake pipe pressure.

241. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including valve means automatically operative under the influence of cylinder pressure to normally build up cylinder pressure to a predetermined limit upon an initial decrease in brake pipe pressure, said valve means being movable upon succeeding decreases in brake pipe pressure of said one brake application to admit additional fluid to the cylinder substantially without predetermined limitations, means for retaining pressure in the cylinder to a predetermined value, and said valve means further being operative upon a decrease in brake pipe pressure to effect a succeeding brake application to supply additional fluid to the cylinder substantially without predetermined limitations, and fluid pressure means associated with the valve means and providing decreased resistance to valve movement during decreases in brake pipe pressure of a succeeding brake application as compared to said initial decrease in brake pipe pressure.

242. Fluid pressure brake equipment for cars of a train including, in combination with a brake pipe, a normally charged local fluid pressure chamber, a brake cylinder, and brake controlling mechanism subject to differential pressures of the brake pipe and the chamber and operative upon decrease in brake pipe pressure to supply fluid to the cylinder to apply the brakes and upon increase in brake pipe pressure to vent fluid from the cylinder to release the brakes, said mechanism including a device automatically operative under the influence of a predetermined cylinder pressure to normally control the operation of said mechanism to build up cylinder pressure to a predetermined limit upon an initial decrease in brake pipe pressure, and means for retaining fluid in the cylinder at a pressure above said limit, and said mechanism further being operative upon a decrease in brake pipe pressure of a succeeding brake application to supply additional fluid to the cylinder substantially without predetermined limitations.

243. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including a device automatically operative under the influence of a predetermined cylinder pressure to normally control the operation of said mechanism to build up cylinder pressure to a predetermined limit upon an initial decrease in brake pipe pressure, means for retaining fluid in the cylinder at a predetermined pressure, and said mechanism having a release position and being operative upon a decrease in brake pipe pressure of a brake application after release 244. Fluid pressure brake equipment for cars of a train including, in combination with a brake pipe, a normally charged local fluid pressure chamber, a brake cylinder, and brake controlling mechanism subject to differential pressures of the brake pipe and the chamber adapted upon decrease in brake pipe pressure to supply fluid under pressure to the cylinder to apply the brakes and upon increase in brake pipe pressure to vent fluid from the cylinder to release the brakes, said mechanism including a device automatically operative under the influence of a predetermined cylinder pressure to normally control the operation of said mechanism to build up cylinder pressure to a predetermined limit upon an initial decrease in brake pipe pressure, means for retaining fluid in the cylinder at a predetermined pressure, said mechanism having a release position and being operative upon a decrease in brake pipe pressure of a brake application after release to supply additional fluid to the cylinder substantially without predetermined limitations, and said device also being operative during decreases in brake pipe pressure of said succeeding brake application to prevent flow of fluid from the brake pipe to the cylinder.

245. Fluid pressure brake equipment for cars of a train including, in combination with a brake pipe, a normally charged local fluid pressure chamber, a brake cylinder, and brake controlling mechanism subject to differential pressures of the brake pipe and the chamber and operative upon decrease in brake pipe pressure to supply fluid to the cylinder to apply the brakes and upon increase in brake pipe pressure to vent fluid from the cylinder to release the brakes, said mechanism including valve means automatically operative under the influence of cylinder pressure to normally build up cylinder pressure to a predetermined limit upon an initial decrease in brake pipe pressure, said valve means having a release position and further being movable upon a decrease in brake pipe pressure of a reapplication of the brakes after recharge first to locally vent fluid from the brake pipe to ensure rapid propagation of serial action and then to supply additional fluid to the cylinder substantially without predetermined limitations, together with means associated with said valve means providing decreased resistance to valve movement on succeeding decreases in brake pipe pressure of any brake application as compared to the initial brake pipe reductions thereof.

246. In a fluid pressure brake, the combination with a brake pipe and a brake cylinder, of a chamber, and a valve device subject to the opposing pressures of the brake pipe and the chamber and operated upon an increase in brake pipe pressure following an application of the brakes for effecting a supply of fluid under pressure from the brake cylinder to the brake pipe.

247. In a fluid pressure brake, the combination with a brake pipe, of a brake controlling valve device comprising a piston subject to brake pipe pressure, a main slide valve and an auxiliary valve operated by said piston, the auxiliary valve controlling a port communicating with the brake pipe, and means operative upon a rapid increase in brake pipe pressure for cutting off communication from the brake pipe to said port.

248. In a fluid pressure brake, the combination with a brake pipe, an auxiliary reservoir and a brake cylinder, of a brake controlling valve device comprising a piston movable its full traverse upon a reduction in brake pipe pressure, and valve means comprising a main slide valve and an auxiliary slide valve capable of movement relative to the main slide valve and operable by said piston, said main slide valve having means adapted upon the full traverse of said piston for establishing a communication through which fluid is supplied from the auxiliary reservoir to the brake cylinder, and for establishing a communication independent of the auxiliary slide valve through which fluid is vented from the brake pipe.

249. In a fluid pressure brake, the combination with a brake pipe, an auxiliary reservoir and a brake cylinder, of a brake controlling valve device comprising a piston movable its full traverse upon a reduction in brake pipe pressure, and valve means comprising a main slide valve and an auxiliary slide valve capable of movement relative to the main slide valve and operable by said piston, said main slide valve having means adapted upon the full traverse of said piston for establishing a communication through which fluid is supplied from the auxiliary reservoir to the brake cylinder, and for establishing a communication independent of the auxiliary slide valve through which fluid is vented from the brake pipe to the brake cylinder.

250. In a fluid pressure brake, the combination with a brake pipe, an auxiliary reservoir and a brake cylinder, of a brake controlling valve device comprising a piston and valve means operated by said piston from release position toward service position upon a reduction in brake pipe pressure for first establishing communication through which fluid is supplied from the auxiliary reservoir to the brake cylinder and then establishing communication through which fluid is vented from the brake pipe.

251. In a fluid pressure brake, the combination with a brake pipe, an auxiliary reservoir and a brake cylinder, of a brake controlling valve device comprising a piston and a slide valve movable by said piston from release position upon a reduction in brake pipe pressure first to a position in which communication is established from the auxiliary reservoir to the brake cylinder and then to a position in which communication is established for venting fluid from the brake pipe.

252. In a fluid pressure brake, the combination with a brake pipe, an auxiliary reservoir and a brake cylinder, of a brake controlling valve device comprising a piston and a slide valve movable from release position by said piston upon a reduction in brake pipe pressure first to a position in which communication is established from the auxiliary reservoir to the brake cylinder and then to a position in which the established communication is maintained and another communication is established for venting fluid from the brake pipe.

253. In a fluid pressure brake, the combination with a brake pipe, an auxiliary reservoir and a brake cylinder, of a brake controlling valve device comprising a piston and a slide valve movable by said piston upon a reduction in brake pipe pressure first to a position in which communication is established from the auxiliary reservoir to the brake cylinder and then to a position in which communication is established for venting fluid from the brake pipe, and means for limiting the amount of fluid vented from the brake pipe through the last mentioned communication.

254. In a fluid pressure brake, the combination with a brake pipe, an auxiliary reservoir and a brake cylinder, of a brake controlling valve device comprising a piston and a slide valve movable by said piston upon a reduction in brake pipe pressure first to a position in which communication is established from the auxiliary reservoir to the brake cylinder and then to a position in which communication is established for venting fluid from the brake pipe, and means operated upon a predetermined increase in brake cylinder pressure for limiting the flow of fluid from the brake pipe through the last mentioned communication.

255. In a fluid pressure brake, the combination with a brake pipe and a brake cylinder, of a brake controlling valve device operated upon a reduction in brake pipe pressure for supplying fluid under pressure to the brake cylinder, means operative in applying the brakes to vent fluid from the brake pipe to the brake cylinder, limiting means operated upon a predetermined increase in brake cylinder pressure for preventing the further venting of fluid from the brake pipe to the brake cylinder, and a retaining valve device adapted to be cut in to retain fluid under pressure in the brake cylinder, whereby upon a successive movement of the brake controlling valve device to brake application position with the retaining valve device cut in, said limiting means will maintain closed the communication through which fluid is vented from the brake pipe to the brake cylinder.

256. In a fluid pressure brake, the combination with a brake pipe and a brake cylinder, of a brake controlling valve device comprising a piston subject to brake pipe pressure, a main slide valve and a graduating slide valve operated by said piston, movement of the graduating valve relative to the main valve being adapted to partially open a port in the main slide valve, through which fluid is adapted to be supplied to the brake cylinder, and means carried by said piston and cooperating with the main slide valve only after said port is partially open for opposing further movement of the graduating valve by the piston to a position in which said port is fully opened by the graduating valve.

257. In a fluid pressure brake, the combination with a brake pipe and a brake cylinder, of a brake controlling valve device operated upon a reduction in brake pipe pressure for supplying fluid under pressure to the brake cylinder and comprising a piston subject to brake pipe pressure, a piston stem carried by said piston, a main slide valve and a graduating slide valve having a movement relative to the main slide valve and operable by said piston and stem, and a yielding stop carried by the piston stem, said stem, the graduating slide valve, and the stop having a movement relative to the main slide valve until said stop engages the main slide valve, and said stem and graduating slide valve having a further movement relative to the main slide valve which is opposed by said stop.

258. In a fluid pressure brake, the combination with a brake pipe, an auxiliary reservoir and a brake cylinder, of means operated upon an emergency reduction in brake pipe pressure for supplying fluid under pressure to the brake cylinder, means operated upon an increase in brake pipe pressure after an emergency reduction in brake pipe pressure for venting fluid from the brake cylinder to the brake pipe, and means operated upon an increase in brake pipe pressure for venting fluid under pressure from the auxiliary reservoir.

259. In a fluid pressure brake, the combination with a brake pipe, an auxiliary reservoir and a brake cylinder, of means operated upon an emergency reduction in brake pipe pressure for supplying fluid under pressure to the brake cylinder, means operated upon an increase in brake pipe pressure after an emergency reduction in brake pipe pressure for venting fluid from the auxiliary reservoir to the brake pipe, means operated upon an increase in brake pipe pressure for first venting fluid from the auxiliary reservoir and for then supplying fluid under pressure to the auxiliary reservoir.

260. In a fluid pressure brake, the combination with a brake pipe, an auxiliary reservoir and a brake cylinder, of a brake controlling valve device operated either upon a service or an emergency rate of reduction in brake pipe pressure for supplying fluid from the auxiliary reservoir to the brake cylinder, and operated upon an increase in brake pipe pressure to release fluid from the brake cylinder, means for venting fluid from the auxiliary reservoir to the brake pipe upon releasing the brakes after an emergency application, and means for venting fluid from the auxiliary reservoir to the atmosphere upon releasing the brakes after a service application of the brakes.

261. In a fluid pressure brake, the combination with a brake pipe, an auxiliary reservoir and a brake cylinder, of a brake controlling valve device operated either upon a service or an emergency rate of reduction in brake pipe pressure for supplying fluid from the auxiliary reservoir to the brake cylinder, and operated upon an increase in brake pipe pressure to release fluid from the brake cylinder, means for venting fluid from the auxiliary reservoir to the brake pipe upon releasing the brakes after an emergency application, and means for venting fluid from the auxiliary reservoir to the atmosphere upon releasing the brakes after either a service or an emergency application of the brakes.

262. In a fluid pressure brake, the combination with a brake pipe, an auxiliary reservoir and a brake cylinder, of a brake controlling valve device operated either upon a service or an emergency rate of reduction in brake pipe pressure for supplying fluid from the auxiliary reservoir to the brake cylinder, and operated upon an increase in brake pipe pressure to release fluid from the brake cylinder, means for venting fluid from the auxiliary reservoir to the brake pipe upon releasing the brakes after an emergency application, and means subject to the opposing pressures of the brake pipe and auxiliary reservoir and operative upon an increase in brake pipe pressure to a predetermined degree in excess of auxiliary reservoir pressure for venting fluid from the auxiliary reservoir to the atmosphere upon releasing the brakes after either a service or an emergency application of the brakes.

263. In a fluid pressure brake, the combination with a brake pipe, an auxiliary reservoir and a brake cylinder, of a brake controlling valve device operated either upon a service or an emergency rate of reduction in brake pipe pressure for supplying fluid from the auxiliary reservoir to the brake cylinder, and operated upon an increase in brake pipe pressure to release fluid from the brake cylinder, means for venting fluid from the auxiliary reservoir to the brake pipe upon releasing the brakes after an emergency application, means for venting fluid from the auxiliary reservoir to the atmosphere upon releasing the brakes after a service application of the brakes, and means included in the brake controlling valve device for closing off the flow of fluid from the auxiliary reservoir to the atmosphere when the valve device is operated toward brake releasing position.

264. In a fluid pressure brake, the combination with a brake pipe and an auxiliary reservoir, of a brake controlling valve device operated upon an emergency rate of reduction in brake pipe pressure for effecting an emergency application of the brakes and operated upon an increase in brake pipe pressure for effecting the release of the brakes, means included in said valve device operated upon a predetermined increase in brake pipe pressure in releasing the brakes to vent fluid from the auxiliary reservoir to the brake pipe, and means operated when the brake pipe pressure has been increased to a predetermined degree in excess of auxiliary reservoir pressure to vent fluid from the auxiliary reservoir to the atmosphere.

265. In a fluid pressure brake, the combination with a brake pipe, an auxiliary reservoir and a brake cylinder, of valve means operated upon an emergency rate of reduction in brake pipe pressure for supplying fluid under pressure from the auxiliary reservoir to the brake cylinder and operated upon an increase in brake pipe pressure to release fluid under pressure from the brake cylinder, means included in said valve means operated upon an increase in brake pipe pressure in excess of a predetermined amount after an emergency reduction to vent fluid under pressure from the auxiliary reservoir to the brake pipe, and means operated when the brake pipe pressure has been increased to a predetermined degree in excess of auxiliary reservoir pressure for venting fluid under pressure from the auxiliary reservoir.

266. In a fluid pressure brake, the combination with a brake pipe and a triple valve device comprising a main valve, a graduating valve having a movement relative to the main valve, and a piston operated upon a reduction in brake pipe pressure for actuating said valves, of means operative upon movement of the graduating valve relative to the main valve for venting fluid under pressure from the brake pipe, and means separate from the first mentioned means operative upon movement of the main valve by the piston for also venting fluid under pressure from the brake pipe.

267. In a fluid pressure brake, the combination with a brake pipe and a triple valve device comprising a main valve, a graduating valve having a movement relative to the main valve, and a piston operated upon a reduction in brake pipe pressure for actuating said valves, of means operative upon movement of the graduating valve relative to the main valve for venting fluid under pressure from the brake pipe, and means separate from the first mentioned means operative upon movement of the main valve by the piston for continuing the venting of fluid from the brake pipe, so that the venting of fluid from the brake pipe is substantially uninterrupted during the movement of the main valve to service application position.

268. In a fluid pressure brake, the combination with a brake pipe and a triple valve device comprising a main valve, a graduating valve having a movement relative to the main valve, and a piston operated upon a reduction in brake pipe pressure for actuating said valves, of means operative upon movement of the graduating valve relative to the main valve for venting fluid under pressure from the brake pipe, and means separate from the first mentioned means and included in the main valve operative upon movement of the main valve by said piston for also venting fluid under pressure from the brake pipe.

269. In a fluid pressure brake, the combination with a brake pipe and a triple valve device comprising a main valve, a graduating valve having a movement relative to the main valve, and a piston operated upon a reduction in brake pipe pressure for actuating said valves, of means included in the main valve and means included in the graduating valve cooperating upon movement of the graduating valve relative to the main valve for venting fluid under pressure from the brake pipe, and means included only in the main valve operative upon movement of the main valve by the piston for also venting fluid under pressure from the brake pipe.

270. In a fluid pressure brake, the combination with a brake pipe and a triple valve device comprising a main valve, a graduating valve having a movement relative to the main valve, and a piston operated upon a reduction in brake pipe pressure for actuating said valves, of means included in the main valve and means included in the graduating valve cooperating upon movement of the graduating valve relative to the main valve for venting fluid under pressure from the brake pipe and for continuing the venting of fluid under pressure from the brake pipe until after the main valve is set in motion by said piston, and means only included in the main valve operative upon a predetermined movement of the main valve for venting fluid under pressure from the brake pipe.

271. In a fluid pressure brake, the combination with a brake pipe, of a triple valve device comprising a main valve having a port in communication with the brake pipe and having another port in communication with a passage to which fluid under pressure is adapted to be vented from the brake pipe, a graduating valve movable relative to the main valve, a piston operated upon a reduction in brake pipe pressure for actuating said valves, said graduating valve having a cavity for connecting the ports in the main valve when the graduating valve is moved relative to the main valve and thereby establishing a communication through which fluid under pressure is vented from the brake pipe, and a cavity in the main valve operative upon movement of the main valve by the piston for venting fluid under pressure from the brake pipe.

272. In a fluid pressure brake equipment for cars of a train, in combination with the train brake pipe the pressure of which is controllable by the engineer, braking mechanism including for each car equipped, a local fluid storage means on the car, a brake applying device, and a brake controlling mechanism having valve means operative upon initiation of a brake pipe pressure reduction to cut off the charging connection from the brake pipe to the local storage means, to locally vent fluid under pressure from the brake pipe and to deliver fluid under pressure from the local storage means to the brake applying device and having a spring and means subject to the opposing pressures of the brake applying device and the spring and automatically operative to control the operation of the valve means to continue such delivery until a substantially fixed, uniform, predetermined braking effect is obtained, regardless of the position of the brake controlling mechanism on the train, the brevity of duration of the initial brake pipe reduction and regardless of mechanical irregularities in the brake applying device, whereby substantial uniformity of brake application on all the cars is initially attained, and means operative upon succeeding brake pipe reductions of the same application to effect additional braking action, substantially uniform as to all the cars, to any desired degree determinable at the will of the engineer.

273. In a fluid pressure brake equipment for cars of a train, in combination with the train brake pipe the pressure of which is controllable by the engineer, braking mechanism including for each car equipped, a local fluid storage means on the car, a brake applying device, and a brake controlling mechanism having means operative upon initiation of the brake pipe pressure reduction to cut off the charging connection from the brake pipe to the local storage means and to deliver fluid under pressure from the local storage means to the brake applying device and having means automatically operative and controlled by build-up of cylinder pressure to control the operation of the first mentioned means to continue such delivery until a substantially fixed, uniform, predetermined braking effect is obtained, regardless of the brevity of duration of the initial brake pipe reduction and regardless of mechanical irregularities in the brake applying device, whereby substantial uniformity of brake application on all the cars is initially attained, and means operative upon succeeding brake pipe reductions of the same application to effect additional braking action, substantially uniform as to all the cars, to any desired degree determinable at the will of the engineer.

274. Fluid pressure brake equipment for cars of a train including, for each car equipped, in combination with a brake pipe extended through the train, brake cylinder apparatus, local fluid pressure storage means, brake controlling mechanism under the influence of differential pressures of the brake pipe and storage means, and operative upon a reduction in brake pipe pressure to supply fluid under pressure to the cylinder apparatus for applying the brakes and upon an increase in brake pipe pressure to vent fluid from the cylinder apparatus for releasing the brakes, said mechanism being operative upon a relatively gradual brake pipe reduction to effect a service application of the brakes and operative upon a relatively rapid brake pipe reduction to effect an emergency application of the brakes, said mechanism having means operative upon initiation of a brake pipe reduction at either a service or an emergency rate to provide automatically an initial braking force less than the maximum available and of a predetermined cylinder pressure value, regardless of the amount of initial brake pipe reduction in initiating an application of the brakes.

275. In a fluid pressure brake, the combination with a brake pipe and a triple valve device comprising a main valve, a graduating valve having a movement relative to the main valve, and a piston operated upon a reduction in brake pipe pressure for operating said valves, of means operative upon movement of said graduating valve relative to the main valve for venting fluid under pressure from the brake pipe, means for yieldingly opposing movement of said graduating valve by said piston to its brake pipe venting position, and means for partially unloading said graduating valve to facilitate movement of said graduating valve relative to said main valve.

276. In a fluid pressure brake, the combination with a brake pipe and a triple valve device comprising a main valve, a graduating valve having a movement relative to the main valve, and a piston operated upon a reduction in brake pipe pressure for operating said valves, of means operative upon movement of said graduating valve relative to the main valve for venting fluid under pressure from the brake pipe, means for yieldingly opposing movement of said graduating valve by said piston to its brake pipe venting position, means for partially unloading said graduating valve to facilitate movement of said graduating valve relative to said main valve, and means for exerting a substantially constant pressure on said graduating valve.

277. In a fluid pressure brake, the combination with a brake pipe and a triple valve device comprising a main valve, a graduating valve having a movement relative to the main valve, and a piston operated upon a reduction in brake pipe pressure for operating said valves, of means operative upon movement of said graduating valve relative to the main valve for venting fluid under pressure from the brake pipe, means for yieldingly opposing movement of said graduating valve by said piston to its brake pipe venting position, and means for exerting a substantially constant pressure on said graduating valve to uniformize the seating pressure of said graduating valve.

278. In a fluid pressure brake, the combination with a brake pipe and a triple valve device comprising a main valve, a graduating valve having a movement relative to the main valve, and a piston operated upon a reduction in brake pipe pressure for operating said valves, of means operative upon movement of said graduating valve relative to the main valve for venting fluid under pressure from the brake pipe, means for yieldingly opposing movement of said graduating valve by said piston to its brake pipe venting position, means for partially unloading said graduating valve to facilitate movement of said graduating valve relative to said main valve, and means for partially loading said main valve to increase the resistance of said main valve to movement from release position toward application position.

279. In a fluid pressure brake, the combination with a brake pipe and a chamber charged with fluid under pressure, of an equalizing valve device subject to the opposing pressures of the brake pipe and said chamber, and movable to a brake applying position upon a reduction in brake pipe pressure and to a release position upon a subsequent increase in brake pipe pressure, the moving parts of the equalizing valve device making their full traverse in effecting either a service or an emergency application of the brakes, and valve means operated separately from the equalizing valve device upon an increase in brake pipe pressure in effecting the release of the brakes for venting fluid under pressure from said chamber for effecting movement of the equalizing valve device to release position, said equalizing valve device upon movement to brake applying position establishing communication through which fluid is vented from said chamber.

280. In a fluid pressure brake, the combination with a brake pipe, an auxiliary reservoir from which fluid under pressure is supplied in effecting an application of the brakes, and a triple valve device constantly subject to the opposing pressures of the auxiliary reservoir and brake pipe, of valve means constantly subject to the brake pipe pressure and operative separately from the triple valve device by an increase in brake pipe pressure for venting fluid under pressure from the auxiliary reservoir, said triple valve device upon movement to a brake applying position establishing communication through which the valve means vents fluid from the auxiliary reservoir.

281. In a fluid pressure brake equipment, a reservoir, a brake pipe, a brake cylinder, a brake controlling mechanism movable from application position to release position and adapted upon an increase in brake pipe pressure to charge said reservoir, said mechanism being subject to the opposing pressures of the brake pipe and the reservoir, means subject to the opposing pressures of the brake pipe and reservoir operative separately from the brake controlling mechanism upon a small differential of brake pipe pressure over reservoir pressure to open a venting communication from said reservoir and communications successively controlled as follows by said controlling mechanism during movement from application position to release position: the communication through which fluid is vented from the auxiliary reservoir is closed by said brake controlling mechanism upon its initial movement toward release position, then a communication through which fluid is released from the brake cylinder is opened by the brake controlling mechanism, then upon a further movement of the brake controlling mechanism a feed communication is opened to the auxiliary reservoir.

282. In a fluid pressure brake equipment, an auxiliary reservoir, an emergency reservoir, a brake pipe, a brake cylinder, a brake controlling mechanism movable from application position to release position and adapted upon an increase in brake pipe pressure to charge said auxiliary reservoir, said mechanism being subject to the opposing pressures of the brake pipe and the auxiliary reservoir, means operative separately from the brake controlling mechanism upon a small differential in brake pipe pressure over reservoir pressure to open a venting communication from said auxiliary reservoir, and communications successively controlled as follows by said controlling mechanism during movement of the brake controlling mechanism from application position to release position: the communication through which fluid is vented from the auxiliary reservoir is closed by said brake controlling mechanism upon its initial movement toward release position, then a communication through which fluid is released from the brake cylinder is opened by the brake controlling mechanism, then upon a further movement of the brake controlling mechanism a feed communication is opened to the auxiliary reservoir, and upon a still further movement, a communication is opened between the emergency reservoir and the auxiliary reservoir.

283. In a fluid pressure brake, the combination with a brake pipe and a brake cylinder, of a brake controlling valve device operated upon a reduction in brake pipe pressure for supplying fluid under pressure to the brake cylinder, means operative in applying the brakes to vent fluid from the brake pipe to the brake cylinder, limiting means operated upon the increase in brake cylinder pressure beyond a substantially predetermined value for preventing the further venting of fluid from the brake pipe to the brake cylinder, and a retaining valve device adapted to be cut in to retain fluid in the brake cylinder at a pressure at least as high as said predetermined value for maintaining said limiting means in position closing the communication through which fluid is vented from the brake pipe to the brake cylinder.

284. In a fluid pressure brake, the combination with a brake pipe and an auxiliary reservoir normally charged with fluid under pressure, of a valve device operative upon an increase in brake pipe pressure for effecting the supply of fluid under pressure from said reservoir to said brake pipe, valve means for preventing back flow from said brake pipe to said reservoir upon an increase in brake pipe pressure above the pressure of fluid in said reservoir, and other valve means operated by an increase in brake pipe pressure for supplying fluid under pressure to said reservoir.

285. In a fluid pressure brake, the combination with a brake pipe and an auxiliary reservoir, of valve means having communication with the brake pipe and with the auxiliary reservoir operative by auxiliary reservoir pressure upon a reduction in brake pipe pressure to effect an application of the brakes and operative upon an increase in brake pipe pressure over auxiliary reservoir pressure for effecting the release of the brakes, a strainer device interposed between the brake pipe and said valve means for cleaning fluid supplied from the brake pipe to said valve means, a by-pass communication around said strainer device extending from the brake pipe to said valve means, a check valve device normally closing the by-pass communication to prevent the flow of fluid between the brake pipe and said valve means and operable to permit such flow upon the creation of a small differential pressure due to clogging of the strainer device, and a valve mechanism subject to the opposing pressures of fluid in said check valve device and auxiliary reservoir and operative upon an increase in the pressure of fluid in said check valve device a predetermined degree in excess of auxiliary reservoir pressure for venting fluid under pressure from the auxiliary reservoir to facilitate the movement of said valve means to brake releasing position.

286. In a fluid pressure brake, the combination with a brake pipe and an auxiliary reservoir, of valve means having communication with the brake pipe and with the auxiliary reservoir operative by auxiliary reservoir pressure upon a reduction in brake pipe pressure to effect an application of the brakes and operative upon an increase in brake pipe pressure over auxiliary reservoir pressure for effecting the release of the brakes, a strainer device interposed between the brake pipe and said valve means for cleaning fluid supplied from the brake pipe to said valve means, a by-pass communication around said strainer device extending from the brake pipe to said valve means, a check valve device normally closing the by-pass communication to prevent the flow of fluid between the brake pipe and said valve means and operable to permit such flow upon the creation of a small differential pressure due to clogging of the strainer device, a valve operative to establish a communication through which fluid under pressure is adapted to be vented from the auxiliary reservoir, and a movable abutment subject to the opposing pressures of fluid in said check valve device and auxiliary reservoir and operable upon an increase in the pressure of fluid in the check valve device a predetermined degree in excess of auxiliary reservoir pressure for actuating said valve to establish the last mentioned communication.

287. In a fluid pressure brake, the combination with a brake pipe and an auxiliary reservoir, of valve means having communication with the brake pipe and with the auxiliary reservoir operative by auxiliary reservoir pressure upon a reduction in brake pipe pressure to effect an application of the brakes and operative upon an increase in brake pipe pressure over auxiliary reservoir pressure for effecting the release of the brakes, a strainer device interposed between the brake pipe and said valve means for cleaning fluid supplied from the brake pipe to said valve means, a by-pass communication around said strainer device extending from the brake pipe to said valve means, a check valve device normally closing the by-pass communication to prevent the flow of fluid between the brake pipe and said valve means and operable to permit such flow upon the creation of a small differential pressure due to clogging of the strainer device, a valve mechanism subject to the opposing pressures of fluid in said check valve device and auxiliary reservoir and operative upon an increase in the pressure of fluid in said check valve device a predetermined degree in excess of auxiliary reservoir pressure for venting fluid under pressure from the auxiliary reservoir to facilitate the movement of said valve means to brake releasing position, and means included in said valve means operable to close off the flow of fluid from the auxiliary reservoir upon movement of the valve means toward release position.

288. In a fluid pressure brake, the combination with a brake pipe and an auxiliary reservoir, of valve means having communication with the brake pipe and with the auxiliary reservoir operative by auxiliary reservoir pressure upon a reduction in brake pipe pressure to effect an application of the brakes and operative upon an increase in brake pipe pressure over auxiliary reservoir pressure for effecting the release of the brakes, a strainer device interposed between the brake pipe and said valve means for cleaning fluid supplied from the brake pipe to said valve means, a by-pass communication around said strainer device extending from the brake pipe to said valve means, a check valve device normally closing the by-pass communication to prevent the flow of fluid between the brake pipe and said valve means and operable to permit such flow upon the creation of a small differential pressure due to clogging of the strainer device, a valve operative to establish a communication through which fluid under pressure is adapted to be vented from the auxiliary reservoir, a movable abutment subject to the opposing pressures of fluid in said check valve device and auxiliary reservoir and operable upon an increase in the pressure of fluid in the check valve device a predetermined degree in excess of auxiliary reservoir pressure for actuating said valve to establish the last mentioned communication, and means included in said valve means operable to close off the flow of fluid from the auxiliary reservoir by way of the last mentioned communication upon movement of the valve means toward release position.

289. In a train brake equipment especially suited to very long trains, a fluid brake controlling mechanism for the individual car, comprising, in combination with the train brake pipe, a brake cylinder, means operative upon a relatively gradual reduction in brake pipe pressure to effect a service operation of the brakes, and means operative upon a relatively rapid reduction in brake pipe pressure for a substantially predetermined time interval to effect an emergency operation of the brakes, means operative upon initiation of a brake pipe reduction at a service rate to effect a local venting of the brake pipe at a relatively rapid rate but of a duration shorter than that predetermined for an emergency operation whereby rapid propagation of a service operation from one end of a long train to the other is assured and initiation of an emergency application is prevented, and means subject to brake cylinder pressure and operative upon the initiation of a service application to produce a braking value of a predetermined standard regardless of the position of the car in the train.

290. In a fluid pressure brake, the combination with a brake pipe, a brake cylinder, and an auxiliary reservoir, of a brake controlling valve mechanism having means operative upon a reduction in brake pipe pressure to admit fluid under pressure from said reservoir to the cylinder for applying the brakes, and means operative upon an increase in brake pipe pressure to vent fluid from the cylinder for releasing the brakes, means operative upon initiation of a reduction in brake pipe presure at a service rate to locally vent fluid under pressure from the brake pipe at a rapid rate for effecting a very high speed or quick service serial propagation of the brake pipe reduction throughout the brake pipe, means for limiting the duration of such local venting of the brake pipe at the said rapid rate to a time value shorter than would result in an emergency operation of the brakes, and means operative to effect continual admission of fluid under pressure to said cylinder until a substantially predetermined cylinder pressure is attained, the last mentioned means being operatively subject to fluid pressure in the brake cylinder, whereby a uniformity of said predetermined cylinder pressure is assured, regardless of the position of the mechanism in a train and thus irrespective of the brake pipe gradient.

291. In a fluid pressure brake, the combination with a brake pipe, a brake cylinder, and an auxiliary reservoir, of a brake controlling valve mechanism having means operative upon a reduction in brake pipe pressure to admit fluid under pressure from said reservoir to the cylinder for applying the brakes, and means operative upon an increase in brake pipe pressure to vent fluid from the cylinder for releasing the brakes, means operative upon initiation of a reduction in brake pipe pressure at a service rate to locally vent fluid under pressure from the brake pipe at a rapid rate for effecting a very high speed or quick service serial propagation of the brake pipe reduction throughout the brake pipe, a quick service reservoir into which such venting takes place and which is of such a restricted volume as to limit the duration of such local venting of the brake pipe at the said rapid rate to a time value shorter than would result in an emergency operation of the brakes, and means operative to effect a further local venting of the brake pipe at a relatively restricted rate so as to insure the admission of fluid under pressure to said cylinder until a substantially predetermined cylinder pressure is attained, the last mentioned means being operatively subject to a fluid pressure in the brake cylinder, whereby a uniformity of said predetermined cylinder pressure is assured, regardless of the position of the mechanism in a train and thus irrespective of the brake pipe gradient.

292. In a fluid pressure brake, the combination with a brake pipe, a brake cylinder, and an auxiliary reservoir, of a brake controlling valve mechanism having piston actuated valve means operative upon a reduction in brake pipe pressure to admit fluid under pressure from said reservoir to the cylinder for applying the brakes and operative upon an increase in brake pipe pressure to vent fluid from the cylinder for releasing the brakes, means operative upon initiation of a reduction in brake pipe pressure at a service rate to locally vent fluid under pressure from the brake pipe at a rapid rate for effecting a very high speed or quick service serial propogation of the brake pipe reduction throughout the brake pipe, a small quick service bulb into which said venting takes place and by which the duration of such local venting of the brake pipe at the said rapid rate is limited to a time value shorter than would result in an emergency operation of the brakes, a choked outlet from the bulb, through which a further venting of the brake pipe may take place to assure setting up such a differential pressure on the piston as to effect its full movement to service application position, means then operative to continue the local venting at a restricted rate whereby to effect continued admission of fluid under pressure to said cylinder, and valve means subject to fluid pressure in the brake cylinder and operative at a predetermined cylinder pressure to cut off local venting of the brake pipe and thus terminate admission of fluid to the cylinder, whereby an initial service application of the brakes at the said predetermined cylinder pressure is assured, regardless of the position of the mechanism in a train and thus irrespective of the brake pipe gradient.

293. In a brake system, the combination of a brake pipe; an auxiliary reservoir; a supplemental reservoir; a brake cylinder; a triple valve, said triple valve controlling a communication between the auxiliary and supplemental reservoirs; a feed back valve interposed in said communication in series with the triple valve; and means for actuating said feed back valve to its feed back position, said means being rendered operative by a reduction of brake pipe pressure and the subsequent rise thereof.

294. In a brake system, the combination of a brake pipe; an auxiliary reservoir; a supplemental reservoir; a brake cylinder; a triple valve, said triple valve controlling a communication between the auxiliary and supplemental reservoirs; a feed back valve interposed in said communication in series with the triple valve; means for actuating said feed back valve, said means comprising a balancing chamber, a piston interposed between said brake pipe and balancing chamber; and means actuated by motion of the piston for venting said balancing chamber.

295. The combination with a brake pipe, brake cylinder, auxiliary reservoir, supplemental reservoir and triple valve; of a feed back valve mechanism comprising a balancing chamber; a chamber connected with the brake pipe; a piston interposed between said chambers and controlling charging of the balancing chamber from the brake pipe; venting means for said balancing chamber actuated by said piston; and a feed back valve having a lost motion driving connection with said piston, said feed back valve serving upon restoration of brake pipe pressure after a brake pipe reduction to connect the auxiliary reservoir with the brake pipe, and serving to control in series with the triple valve, a connection between the auxiliary reservoir and the supplemental reservoir.

296. In a fluid pressure brake, the combination with a brake pipe and a brake cylinder, of a triple valve device comprising a main valve and a graduating valve having a brake releasing position and a brake applying position, said main valve having a port through which fluid under pressure is adapted to be supplied to the brake cylinder when the valve is in brake applying position, and said graduating valve, with both valves in brake releasing position, closing said port, said graduating valve being movable relative to the main valve from its brake releasing position to first uncover said port and then establish communication through which fluid under pressure is vented from the brake pipe, a piston for moving said valve, and yielding resistance means for opposing movement of the graduating valve to the brake pipe venting position before the main valve is moved from its release position.

297. In a fluid pressure brake, the combination with a brake pipe, an auxiliary reservoir and a brake cylinder, of a brake controlling valve device comprising a piston movable upon a reduction in brake pipe pressure in effecting a service application of the brakes, and valve means operable by said piston upon the initial movement of the piston for establishing communication through which fluid under pressure is vented from the brake pipe and operable upon the full traverse of the piston for establishing a communication through which fluid under pressure is supplied from the auxiliary reservoir to the brake cylinder and for establishing another communication through which fluid under pressure is vented from the brake pipe.

298. In a fluid pressure brake, the combination with a brake pipe, an auxiliary reservoir and a brake cylinder, of a brake controlling valve device comprising a piston movable upon a reduction in brake pipe pressure in effecting a service application of the brakes, and valve means operable by said piston upon the initial movement of the piston for establishing communication through which fluid under pressure is vented from the brake pipe and operable upon the full traverse of the piston for establishing communication through which fluid under pressure is supplied from the auxiliary reservoir to the brake cylinder and for establishing another communication through which fluid under pressure is vented from the brake pipe to the brake cylinder.

299. In a fluid pressure brake, the combination with a brake pipe, an auxiliary reservoir and a brake cylinder, of a brake controlling valve device comprising a piston movable upon a reduction in brake pipe pressure in effecting a service application of the brakes, and valve means operable by said piston upon the initial movement of the piston for establishing communication through which fluid under pressure is vented from the brake pipe and operable upon the full traverse of the piston for first closing said communication and for then establishing a communication through which fluid under pressure is supplied from the auxiliary reservoir to the brake cylinder and a communication through which fluid under pressure is vented from the brake pipe.

300. In a fluid pressure brake, the combination with a brake pipe, an auxiliary reservoir and a brake cylinder, of a brake controlling valve device comprising a piston movable upon a reduction in brake pipe pressure in effecting a service application of the brakes, valve means operable by said piston upon the initial movement of the piston for establishing a communication through which fluid under pressure is vented from the brake pipe and operable upon the full traverse of the piston for establishing communication through which fluid under pressure is supplied from the auxiliary reservoir to the brake cylinder and for establishing another communication through which fluid under pressure is vented from the brake pipe, and means operable upon a predetermined increase in brake cylinder pressure for closing off the flow of fluid through the last mentioned communication.

301. In a fluid pressure brake, the combination with a brake pipe, an auxiliary reservoir and a brake cylinder, of a brake controlling valve device comprising a piston movable upon a reduction in brake pipe pressure in effecting a service application of the brakes, valve means operable by said piston upon the initial movement of the piston for establishing communication through which fluid under pressure is vented from the brake pipe and operable upon the full traverse of the piston for establishing communication through which fluid under pressure is supplied from the auxiliary reservoir to the brake cylinder and for establishing another communication through which fluid under pressure is vented from the brake pipe, and valve means responsive to a chosen brake cylinder pressure for closing off the flow of fluid through the last mentioned communication.

302. Fluid pressure brake equipment including, in combination, a brake pipe, a brake cylinder, a brake controlling mechanism operative upon a reduction in brake pipe pressure to supply fluid under pressure to the brake cylinder to effect an application of the brakes and operative upon an increase in brake pipe pressure to vent fluid under pressure from the brake cylinder to effect the release of the brakes, means operative upon a reduction in brake pipe pressure for locally venting the brake pipe until a predetermined brake cylinder pressure is attained, and means operative independently of the brake cylinder pressure for producing a local venting of the brake pipe upon a succeeding brake pipe reduction with the brakes held applied.

303. Fluid pressure brake equipment including, in combination, a brake pipe, a brake cylinder, a local fluid pressure reservoir, a brake controlling mechanism operative upon a reduction in brake pipe pressure to close communication between the reservoir and the brake pipe and to supply fluid from the reservoir to the cylinder to apply the brakes, and operative upon an increase in brake pipe pressure to vent fluid from the cylinder, means operative upon a reduction in brake pipe pressure for locally venting the brake pipe until a predetermined brake cylinder pressure is attained, and means operative independently of the brake cylinder pressure for producing a local venting of the brake pipe upon a succeeding brake pipe reduction with the brakes held applied.

304. Fluid pressure brake equipment including, in combination, a brake pipe, a brake cylinder, a local fluid pressure reservoir, a brake controlling mechanism operative upon a reduction in brake pipe pressure to close communication between the reservoir and the brake pipe and to supply fluid from the reservoir to the cylinder to apply the brakes, and operative upon an increase in brake pipe pressure to vent fluid from the cylinder, means adapted to produce a local venting of the brake pipe upon a reduction in brake pipe pressure, and means operative by a predetermined brake cylinder pressure to cut off the local venting of fluid from the brake pipe to limit the extent of the local reduction in brake pipe pressure effected by a succeeding brake pipe reduction when the brakes are already applied.

305. Fluid pressure brake equipment including, in combination, a brake pipe, a brake cylinder, a local fluid pressure reservoir, a brake controlling mechanism operative upon a reduction in brake pipe pressure to close communication between the reservoir and the brake pipe and to supply fluid from the reservoir to the cylinder to apply the brakes, and operative upon an increase in brake pipe pressure to vent fluid from the cylinder, means adapted to produce a local venting of the brake pipe upon a reduction in brake pipe pressure, and means for cutting off the local venting of the brake pipe when a predetermined brake cylinder pressure is attained, whereby upon a succeeding brake pipe reduction with the brakes applied, only a limited reduction will be effected.

306. In a fluid pressure brake, the combination with a brake pipe and a triple valve device comprising a main valve, a graduating valve having a friction opposed movement relative to the main valve, and a piston operated upon a reduction in brake pipe pressure for operating said valves, of means operative upon movement of said graduating valve relative to the main valve for venting fluid under pressure from the brake pipe, and means whereby the movement of the graduating valve by said piston to its brake pipe venting position is yieldingly opposed by a graduated resistance always less than the resistance of the main slide valve.

307. In a fluid pressure brake, the combination with a brake pipe and a triple valve including a main valve, a graduating valve having a friction opposed movement relative to the main valve and a piston operated upon a reduction in brake pipe pressure for operating said valves, of means operative upon movement of said graduating valve relative to the main valve for venting fluid under pressure from the brake pipe, and yielding means opposing to movement of said piston after an initial short movement a graduated resistance whose maximum is less than the normal frictional resistance of the main valve but substantially greater than the frictional resistance of the graduating valve.

308. In a fluid pressure brake, the combination with a brake pipe, of a quick service reservoir having a volume small compared with that which would be required to produce an emergency brake application, a brake controlling valve device having a quick service position for venting fluid under pressure from said brake pipe to said reservoir at a rate exceeding a service rate upon a service reduction in brake pipe pressure to effect an actuation of the brake, said quick service reservoir having a restricted atmospheric vent, and means in said brake controlling valve device for preventing movement of the device to quick service position until the brake pipe pressure reduction is materially greater than the reduction normally necessary to overcome valve friction.

309. In a fluid pressure brake, the combination with a brake pipe, of a brake controlling device including a triple valve mechanism and an emergency valve mechanism each comprising a main valve, an auxiliary valve having movement relative to said main valve, and a piston operated upon reduction in brake pipe pressure for operating said valves, and said emergency valve mechanism having a quick action reservoir, means in said triple valve device for venting fluid under pressure from the brake pipe, means in said emergency valve mechanism for venting fluid under pressure from said quick action reservoir, and means in each of said valve mechanisms for yieldingly opposing a predetermined force to movement of its graduating valve to venting position.

310. In a fluid pressure brake, the combination with a brake pipe, an auxiliary reservoir, an emergency reservoir, and a triple valve device comprising a main valve, a graduating valve having a friction opposed movement relative to the main valve, and a piston operated upon a reduction in brake pipe pressure for operating said valves by pressure from said auxiliary reservoir, of a passage governed by said auxiliary valve for charging said emergency reservoir, means operative upon movement of said graduating valve relative to the main valve for venting fluid under pressure from the brake pipe, and means for yieldingly opposing movement of said graduating valve by said piston to its brake pipe venting position after said passage is closed.

311. In a fluid pressure brake, the combination with a brake pipe, an auxiliary reservoir, an emergency reservoir, and a triple valve device comprising a main valve, a graduating valve having a movement relative to the main valve, and a piston operated upon a reduction in brake pipe pressure for operating said valves, of a passage in said triple valve device connecting said reservoirs, means operative upon movement of said graduating valve relative to the main valve for closing said passage, and for venting fluid under pressure from the brake pipe, and means for yieldingly opposing movement of said graduating valve by said piston to its brake pipe venting position after said passage is closed.

312. In a fluid pressure brake for a vehicle, in combination, a brake pipe, a brake cylinder, a service reservoir, a brake controlling valve mechanism operative to supply fluid under pressure from said service reservoir to the brake cylinder, a local source of fluid under pressure, said brake controlling valve mechanism having means operative upon operation of said mechanism by an initial increase in brake pipe pressure to vent fluid from the brake cylinder to the brake pipe, to effect a local increase in brake pipe pressure and to vent fluid from said local source of fluid under pressure to said service reservoir.

313. In a fluid pressure brake for a train of vehicles, in combination, a brake pipe extending through the train, and each car equipped with a service reservoir, a brake cylinder, a brake controlling valve device operative to supply fluid under pressure from said service reservoir to the brake cylinder and a local source of fluid under pressure, of means for effecting an increase in brake pipe pressure at one point in the train to initiate the recharge of the brake pipe, means operative on an adjacent car upon said increase in brake pipe pressure for venting fluid from the brake cylinder to the brake pipe to effect a local increase in brake pipe pressure to assist quick serial propagation through the brake pipe by like action on successive cars throughout the train, each of the brake controlling valve devices having means operative to vent fluid under pressure from the corresponding local source of fluid under pressure to the corresponding service reservoir to further expedite quick serial propagation by delaying recharge of each of the service reservoirs from the brake pipe.

314. Mechanism for the control of the brakes of a long train including a brake pipe extending the length of the train, brake applying means on each car including a brake cylinder, fluid pressure reservoirs on each car including an emergency reservoir and an auxiliary reservoir, valve means on each car including service and emergency portions for establishing communication between said brake pipe and said reservoirs, and also for establishing communication between said brake pipe and said brake cylinder, means controlled by said emergency portion for recharging said brake pipe from said brake cylinder and said auxiliary reservoir after an emergency brake actuation to expedite the transmission of a release impulse imparted to said brake pipe at a control point, and means controlled by said service portion for releasing the brakes and for recharging said auxiliary reservoir from said emergency reservoir.

315. In a fluid pressure brake, the combination with a brake pipe, an auxiliary reservoir and a triple valve device comprising a casing containing a piston having a valve chamber at one side open to the auxiliary reservoir and a piston chamber at the other side open to the brake pipe, said piston having an application position for effecting an application of the brakes and movable from application position to a release position for effecting a release of the brakes, and valve means operative upon an increase in brake pipe pressure to vent fluid under pressure from the auxiliary reservoir for moving said piston from application position to release position, said valve means comprising a casing mounted on said triple valve casing and having a chamber communicating with the auxiliary reservoir and a passage connecting said chamber to the atmosphere, a vent valve disposed in said chamber, a spring for operating said vent valve to close communication from said vent valve chamber to said passage, a flexible diaphragm mounted between the triple valve casing and the casing of said valve means, said diaphragm having a chamber at one side in constant communication with said brake pipe and a chamber at the other side in constant communication with the vent valve chamber, and means interposed between said diaphragm and valve for operating said valve to open communication from said vent valve chamber to said passage when said diaphragm is deflected by an increase in brake pipe pressure in the chamber at one side over auxiliary reservoir pressure in the chamber at the other side.

316. In a fluid pressure brake, the combination with a brake pipe, an auxiliary reservoir, and a triple valve device subject to the opposing pressures of the brake pipe and auxiliary reservoir and movable in accordance with variations in said pressures to an application position, a lap position and a release position, and valve means operated by an increase in brake pipe pressure when said triple valve device is in lap position to vent fluid under pressure from said auxiliary reservoir for effecting movement of said triple valve device to release position, said triple valve device controlling communication through which fluid under pressure is vented from said auxiliary reservoir and being operative upon movement to release position to close said communication.

317. In a fluid pressure brake, the combination with a brake pipe and a brake cylinder, of an emergency valve device operated upon an emergency reduction in brake pipe pressure for supplying fluid under pressure to the brake cylinder and including a valve having a position in which communication is established from the brake cylinder to the brake pipe, a piston operable to position said valve, said valve being movable by said piston upon an increase in brake pipe pressure after an emergency reduction in brake pipe pressure to said position for supplying fluid from the brake cylinder to the brake pipe, and a check valve separate from said valve and piston for preventing at all times back flow from the brake pipe to the brake cylinder through said communication.

318. In a fluid pressure brake, the combination with a brake pipe and a brake cylinder, of an emergency valve device operated upon an emergency reduction in brake pipe pressure for establishing a communication through which fluid under pressure flows to the brake cylinder, and operated upon an increase in brake pipe pressure after an emergency reduction in brake pipe pressure for establishing a different communication through which fluid under pressure flows from the brake cylinder to the brake pipe.

319. In a fluid pressure brake, the combination with a brake pipe and a brake cylinder, of an emergency valve device operated upon an emergency reduction in brake pipe pressure for establishing a communication through which fluid under pressure flows to the brake cylinder, and operated upon an increase in brake pipe pressure after an emergency reduction in brake pipe pressure for establishing a different communication through which fluid under pressure flows from the brake cylinder to the brake pipe, and a check valve for preventing back flow of fluid from the brake pipe to the brake cylinder.

320. In a fluid pressure brake, the combination with a brake pipe and a brake cylinder, of an emergency valve device operated upon an emergency reduction in brake pipe pressure for establishing a communication through which fluid under pressure flows to the brake cylinder, and operated upon an increase in brake pipe pressure after an emergency reduction in brake pipe pressure for establishing a different communication through which fluid under pressure flows from the brake cylinder to the brake pipe, and a check valve interposed in the last mentioned communication for preventing back flow of fluid from the brake pipe to the brake cylinder.

321. In a fluid pressure brake, the combination with a brake pipe and a brake cylinder, of an emergency valve mechanism operated upon an emergency reduction in brake pipe pressure to a brake applying position in which fluid under pressure is supplied to the brake cylinder and operated upon an increase in brake pipe pressure in releasing the brakes for supplying fluid under pressure to the brake pipe, and means for opposing movement of said emergency valve mechanism toward the position in which it supplies fluid under pressure to the brake pipe.

322. In a fluid pressure brake, the combination with a brake pipe and a brake cylinder, of an emergency valve mechanism operated upon an emergency reduction in brake pipe pressure to a brake applying position in which fluid under pressure is supplied to the brake cylinder and operated upon an increase in brake pipe pressure in releasing the brakes for venting fluid under pressure from the brake cylinder to the brake pipe, and means for opposing movement of the emergency valve mechanism toward venting position.

323. In a fluid pressure brake, the combination with a brake pipe, a brake cylinder, and a quick service reservoir, of a triple valve device movable upon a light reduction in brake pipe pressure to a quick service position for venting fluid under pressure from said brake pipe to said quick service reservoir for effecting a preliminary quick service reduction in brake pipe pressure, said triple valve device being movable upon said preliminary quick service reduction in brake pipe pressure to an application position for supplying fluid under pressure to said brake cylinder for effecting an application of the brakes, and means for venting fluid under pressure from said brake pipe to the atmosphere, after substantial equalization of fluid under pressure from the brake pipe into said quick service reservoir at such a rate as to cause said triple valve device to move to application position, if said triple valve device does not move to application position upon said preliminary quick service reduction in brake pipe pressure.

CLYDE C. FARMER.

CERTIFICATE OF CORRECTION.

Patent No. 2,031,213. February 18, 1936.

CLYDE C. FARMER.

It is hereby certified that error appears in the printed specification of the above numbered patent requiring correction as follows: Page 6, first column, line 49, before the word "Patent" insert Ellis E. Hewitt,; page 52, first column, line 70, claim 240, strike out the word "brake" and insert the same before "pipe" in line 71, same claim; page 58, second column, line 39, claim 290, for "continual" read continued; and line 75, claim 291, after "to" strike out the article "a"; and that the said Letters Patent should be read with these corrections therein that the same may conform to the record of the case in the Patent Office.

Signed and sealed this 17th day of March, A. D. 1936.

Leslie Frazer (Seal) Acting Commissioner of Patents.